United States Patent
Hudec et al.

(10) Patent No.: US 12,437,308 B2
(45) Date of Patent: *Oct. 7, 2025

(54) SYSTEM, METHOD AND PROCESS FOR PRODUCT AUTHENTICATION AND VERIFICATION

(71) Applicant: SecureTap LLC, Sheridan, WY (US)

(72) Inventors: Richard Hudec, Naples, FL (US); Davin Young, Fort Myers, FL (US)

(73) Assignee: Secure Tap LLC, Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/218,464

(22) Filed: May 26, 2025

(65) Prior Publication Data

US 2025/0285125 A1    Sep. 11, 2025

Related U.S. Application Data

(63) Continuation of application No. 19/187,298, filed on Apr. 23, 2025, and a continuation of application No. (Continued)

(51) Int. Cl.
G06Q 30/018      (2023.01)
H04L 9/00        (2022.01)

(52) U.S. Cl.
CPC ........... *G06Q 30/0185* (2013.01); *H04L 9/50* (2022.05)

(58) Field of Classification Search
None
See application file for complete search history.

(56) References Cited

U.S. PATENT DOCUMENTS

| | | |
|---|---|---|
| 11,734,533 B1 | 8/2023 | Cohen |
| 2016/0098730 A1 | 4/2016 | Feeney |

(Continued)

OTHER PUBLICATIONS

S. S. D., M. F. M. P., S. B. S. M., S. K., R. Reshma and S. P. Sasirekha, "A Novel Decentralized Product Verification using Blockchain Technology," 2023 7th International Conference on Trends in Electronics and Informatics (ICOEI), Tirunelveli, India, pp. 642-646 (Year: 2023).

*Primary Examiner* — Sarah M Monfeldt
*Assistant Examiner* — Michael J. Monaghan
(74) *Attorney, Agent, or Firm* — Richard A. Catalina, Jr.

(57) ABSTRACT

A system, method and process for product authentication and verification using Near Field Communication (NFC) technology, blockchain technology (Hyperledger), and cryptography. A unique product identifier is generated for a unique individual product, incorporated into a data structure for that product, and the data structure is recorded to a blockchain initiating an immutable record for the unique product identifier. An NFC tag is encoded with a tap-unique URL that comprises the unique product identifier and a cryptographic output and the tag is affixed to its corresponding unique individual product. Each time the tag is tapped by an NFC proximity coupling device, a web client operating on the proximity coupling device reads and opens the URL whereupon the tag is verified using a cryptographic verification process and generating a verification result. The verification result is transmitted to and recorded on the blockchain ledger for the unique product identifier, thereby creating an immutable record of each tap interaction result of the tag affixed to the product. In embodiments, a verification certificate comprising the verification result is transmitted to the web client operating on the proximity coupling device for viewing by a user.

21 Claims, 23 Drawing Sheets

Related U.S. Application Data

19/017,891, filed on Jan. 13, 2025, now Pat. No. 12,314,963.

(60) Provisional application No. 63/716,270, filed on Nov. 5, 2024, provisional application No. 63/680,113, filed on Aug. 7, 2024, provisional application No. 63/555,458, filed on Feb. 20, 2024.

(56) References Cited

U.S. PATENT DOCUMENTS

| | | |
|---|---|---|
| 2018/0108024 A1 | 4/2018 | Greco |
| 2020/0184162 A1* | 6/2020 | Levy .................. G06K 7/10722 |
| 2020/0364817 A1 | 11/2020 | Liu |
| 2021/0089514 A1 | 3/2021 | Werner |
| 2021/0142336 A1 | 5/2021 | Suk |
| 2021/0248653 A1* | 8/2021 | McKenzie ............ G06F 21/602 |
| 2021/0326905 A1 | 10/2021 | McKinnon |
| 2022/0156753 A1 | 5/2022 | Guinard |
| 2022/0215382 A1 | 7/2022 | Chen |
| 2022/0284447 A1 | 9/2022 | Bulawski |
| 2022/0335263 A1 | 10/2022 | Balganon Canela |
| 2022/0398601 A1 | 12/2022 | Anastas |
| 2022/0405770 A1 | 12/2022 | Sun |
| 2023/0010172 A1 | 1/2023 | Myers |
| 2023/0031817 A1* | 2/2023 | Mulas .................. G06Q 20/208 |
| 2024/0160868 A1* | 5/2024 | Larsson ............. G06K 7/10297 |
| 2024/0169369 A1 | 5/2024 | Elmon |
| 2024/0412208 A1 | 12/2024 | Loreth |

* cited by examiner

260 secureTap

About Us | Markets | Technology | Logout | Dashboard

Products
Buena Vista Accessories Co.

- Account
- Brand Suite
- Dashboard
- Ledger
- Order Tags
- Products
- Tags

🔍 Products
Search and manage your products                    ⊕ Create

Search Products                                              🔍

| Photo | Product Name | Total Taps | Description | Date |
|---|---|---|---|---|
| 👓 | Glamour Glasses | 15 | Model 15A | 09/04/2024 |
| 👟 | Hi Flier Court Shoes | 82 | HF-100AA white | 07/10/2024 |
| 📱 | Jump Phone X 5+ | 7 | JZP-X-2024 5+ | 08/25/2024 |
| 💻 | Jump Pro Notebook 7 | 765 | JPN-2024 7 | 08/25/2024 |
| 🧴 | Canal No. 9 | 12 | Ca_05/1355 | 0601/2024 |

260-02 → Glamour Glasses
260-03 → Hi Flier Court Shoes
260-04 → Jump Phone X 5+
260-05 → Jump Pro Notebook 7
260-06 → Canal No. 9

< [1] >     10/page ⌄

FIG. 10

260 secureTap

About Us    Markets    Technology    Logout    Dashboard

Tags > Order
SecureTap

- Account
- Brand Suite
- Dashboard
- Ledger
- Order Tags
- Products
- Tags

⊕ Create Tag Order

Select Product — 260-09

[ Select a product ]

Tag Shape — 260-11    Tag Size

[ Select tag shape ▾ ]    [ Select tag size ▾ ]

260-10

Quantity

[ 1000 ]

260-12

Upload Design

+ Upload

Upload your design to be printed on the tags — 260-13

Additional Notes (Optional) — 260-14

[ Enter any additional notes or instructions ]

[ 💾 Place Order ]

Simplified SQL statement for the `interactions` (tap data) table:

```
CREATE TABLE interactions (
    id              VARCHAR(255) PRIMARY KEY,
    tag_id          VARCHAR(255) NOT NULL,
    date_created    TIMESTAMP NOT NULL,
    last_updated    TIMESTAMP DEFAULT CURRENT_TIMESTAMP,
    ip_address      VARCHAR(255) NOT NULL,
    metadata        TEXT,
    is_verified     BOOLEAN NOT NULL,
    is_tampered     BOOLEAN NOT NULL,
    latitude        DOUBLE PRECISION,
    longitude       DOUBLE PRECISION,
    FOREIGN KEY (tag_id) REFERENCES tags(id) ON DELETE CASCADE
);
```

FIG. 20

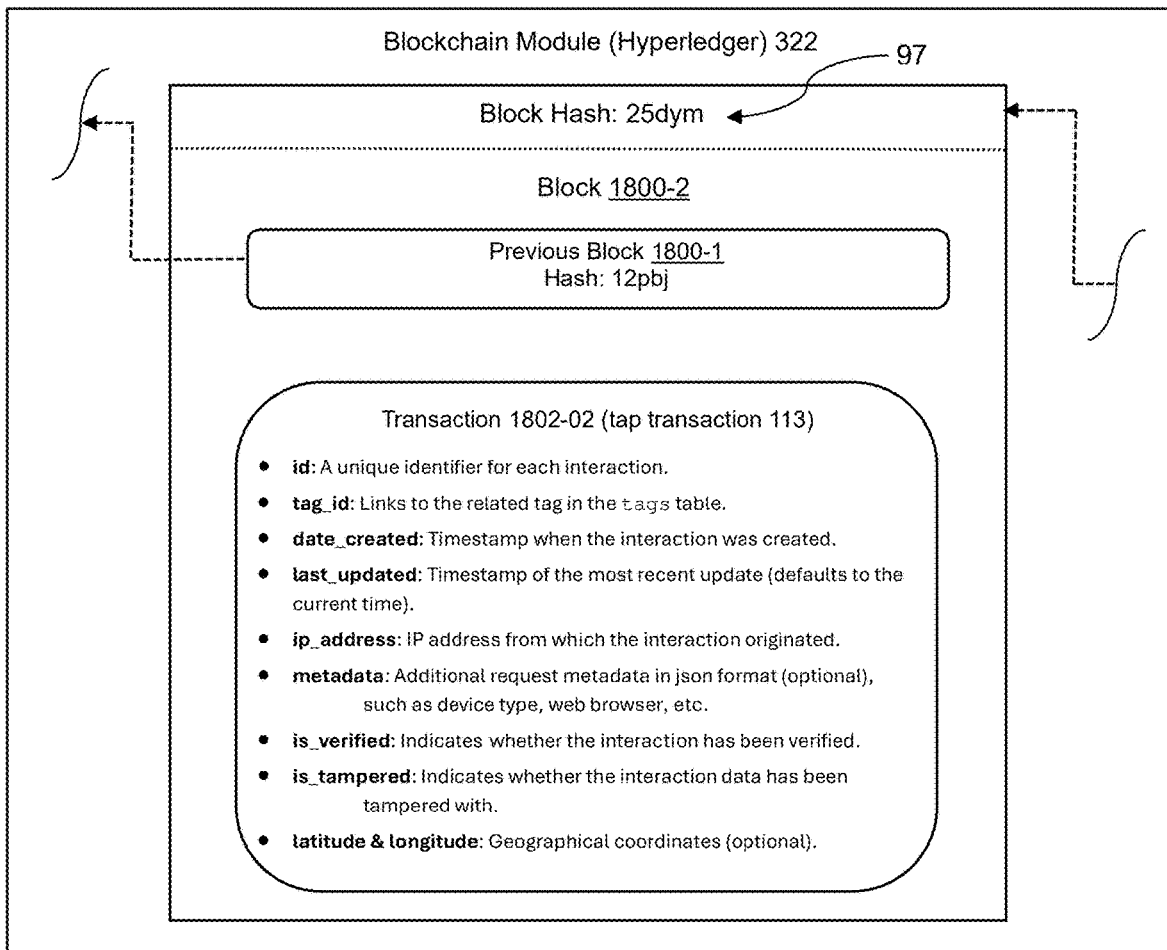

FIG. 21

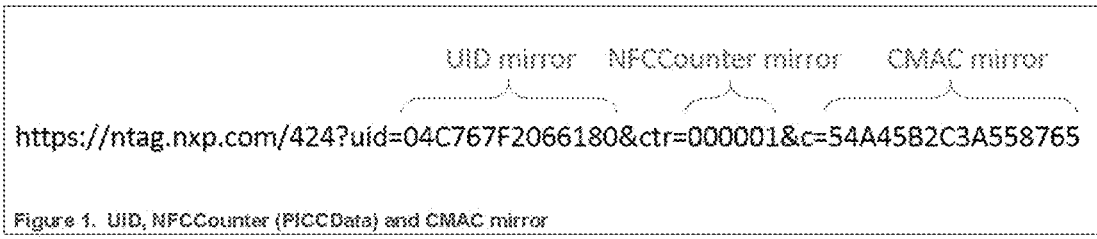
Example 1
(AN12196 NXP Document, Figure 1, page 8)
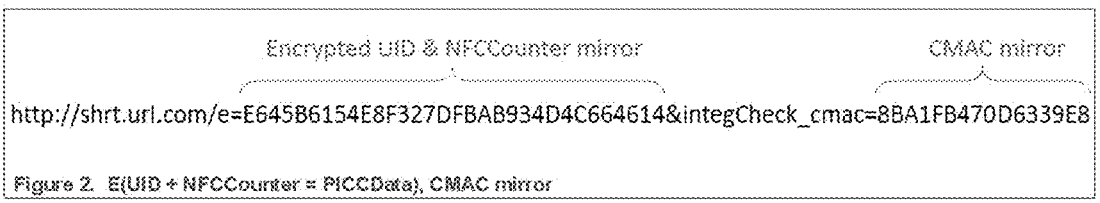
Example 2
(AN12196 NXP Document, Figure 2, page 8)
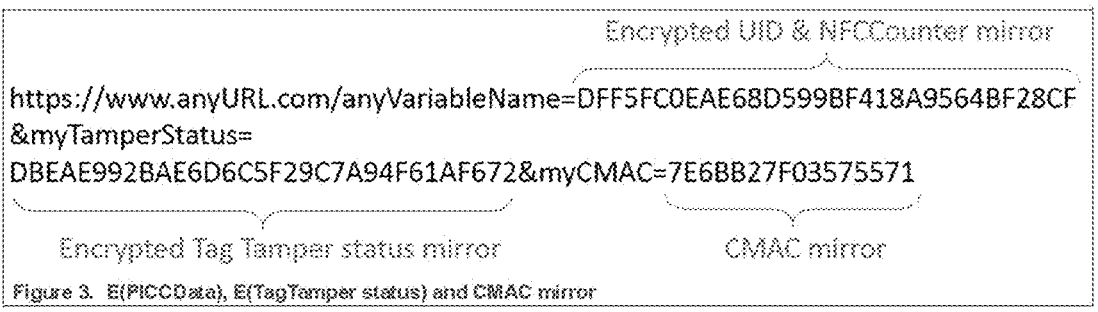
Example 3
(AN12196 NXP Document, Figure 3, page 8)
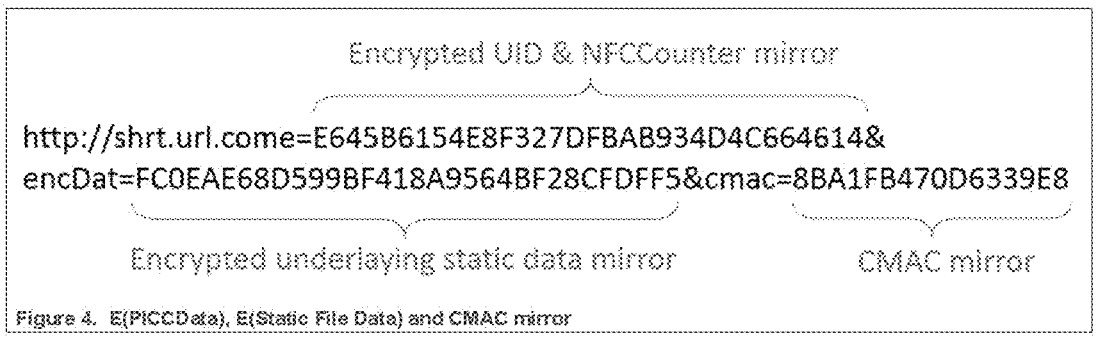
Example 4
(AN12196 NXP Document, Figure 4, page 8)
FIG. 22

Example 5
(NT4H2421Tx Document, Figure 13, page 48)

SYSTEM, METHOD AND PROCESS FOR PRODUCT AUTHENTICATION AND VERIFICATION

RELATED APPLICATIONS

This application is a Continuation of U.S. Non-Provisional application Ser. No. 19/017,891, "System, Method and Process for Product Authentication and Verification," filed on Jan. 13, 2025, and claims priority to and the benefit of that application, the entire disclosure of which is incorporated by reference herein in its entirety for all purposes, including any and all claims of priority made therein and as further made in the Application Data Sheet filed with respect to that application. U.S. Non-Provisional application Ser. No. 19/017,891 further claims the benefit of U.S. Provisional Application No. 63/555,458, "SYSTEM AND METHOD OF AUTHENTICATING GOODS AND PRODUCTS," filed on Feb. 20, 2024, U.S. Provisional Application No. 63/680,113, "SECURE AUTHENTICATION AND ASSET MANAGEMENT SYSTEM USING BLOCKCHAIN TECHNOLOGY," filed on Aug. 7, 2024, and U.S. Provisional Application No. 63/716,270, "SYSTEM, METHOD AND PROCESS FOR PRODUCT AUTHENTICATION AND VERIFICATION," filed on Nov. 5, 2024, and therefore this application claims priority to and the benefit of all those applications, the entire disclosures of which are incorporated by reference herein in their entirety for all purposes. This application further claims priority to and the benefit of U.S. Non-Provisional application Ser. No. 19/187,298, "SYSTEM, METHOD AND PROCESS FOR PRODUCT AUTHENTICATION AND VERIFICATION", filed on Apr. 23, 2025, the entire disclosure of which is incorporated by reference herein in its entirety for all purposes, including any and all claims of priority made therein and as further made in the Application Data Sheet filed with respect to that application.

FIELD OF INVENTION

The invention relates to, among other applications, a system, method and process for product authentication and verification using Near Field Communication (NFC), blockchain technology (Hyperledger), cryptography, and related technologies. More specifically, the invention relates to a secure system for authenticating and managing products using NFC technology integrated with a Java and SQL built API, and a transaction fee-free private blockchain, Hyperledger. The system ensures product authenticity, combats counterfeiting, and enhances security, transparency, and traceability in supply chains.

SUMMARY OF THE INVENTION

The invention relates to, among other applications, a system, method and process for product authentication and verification using Near Field Communication (NFC) technology, blockchain technology (Hyperledger), cryptography, and related technologies. More specifically, the invention relates to a secure system for authenticating and managing assets using NFC technology integrated with a Java and SQL built API, and a transaction fee-free private blockchain, Hyperledger. The system ensures product authenticity, combats counterfeiting, and enhances security, transparency, and traceability in supply chains. Combining NFC technology, blockchain, and a proprietary API, the invention creates a tamper-proof system for verifying product authenticity.

In embodiments, a unique product identifier is generated for a unique individual product and incorporated into a data structure for that product. In embodiments, the unique product identifier serves as a common data element that links the unique individual product to a corresponding, respective unique individual NFC tag to be encoded and affixed to the product. Upon generation of the data structure for the unique individual product, wherein the data structure comprises at least the unique product identifier, a request is transmitted to a blockchain to record the data structure. The blockchain records the data structure, thereby generating an initial unique blockchain identifier (hash) for that transaction, which is then transmitted in response to the request. The initial unique blockchain identifier is recorded to the data structure for the product, thereby updating the data structure dynamically, and in the process, directly associating the initial unique blockchain identifier with the unique product identifier. In embodiments, the data structure may be recorded to a database.

Continuing, an appropriate NFC tag is encoded with a tap-unique URL that comprises the unique product identifier, thereby connecting that specific tag with the product and further connecting the tag with the blockchain ledger established for the unique product identifier. After the tag is encoded with the tap-unique URL, wherein the URL comprises a tap-unique cryptographic output, it is affixed to its respective product. When the tag is tapped by an NFC proximity coupling device, such as, for example, an NFC-enabled cell phone, a web client operating on the device reads and opens the URL and is directed to web host whereupon the unique product identifier in the URL is read. In embodiments a verification process ensues, based on the type of cryptographic output of the URL (and the means for generating same). Based on the applicable protocols of the cryptographic verification process, a verification result is generated, wherein the tag is either verified as valid or not.

Continuing, based on the unique product identifier in the tap-unique URL, a request is transmitted to the blockchain ledger to record the verification result. In embodiments, additional tap-interaction data may be included in the request, including metadata associated with the tap interaction. The blockchain records the verification result (and other applicable data as desired), thereby generating a subsequent unique blockchain identifier (hash) for that transaction, which is then transmitted in response to the request. The subsequent unique blockchain identifier is recorded to the database from which various updated data structures for the product may be generated. In embodiments, a verification certificate comprising the verification result is transmitted back to the web client operating on the proximity coupling device for viewing by a user.

Importantly, embodiments of the invention use various appropriate NFC tags which may utilize various NFC and ISO protocols, such as, for example ISO/IEC 14443, ISO/IEC 7816, and ISO/IEC 18092, which are incorporated by reference in their entirety. It is to be understood that various NFC tags, depending on the manufacturer thereof, may utilize different cryptographic processes for encrypting portions of the tap-unique URL for the tag. Hence, while various examples of specific NFC tags and ISO standards and protocols are discussed herein, it is to be understood the invention is not dependent on any specific standard or protocol and that the invention may be implemented using any such applicable NFC, RFID or cryptographic protocol or standard, whether currently existing or that may come about in the future.

BACKGROUND

The integration of radio frequency identification (RFID) technology with databases revolutionized industries by enabling efficient tracking and management of assets and inventory in real-time. This advancement allowed businesses to enhance operational efficiencies, reduce losses, and improve data accuracy across supply chains, retail, logistics, and beyond. By attaching NFC technology to blockchains, the present invention achieves even greater security, transparency, and immutability. Blockchain's decentralized nature ensures that data related to NFC interactions (e.g., "taps" or "tap interactions") is tamper-proof and easily verifiable, thereby enhancing trust and accountability. This leap forward not only builds on the legacy of RFID and databases, but also opens new avenues for secure, transparent, and reliable authentication and asset management in various sectors. Moreover, the widespread adoption of NFC technology in smartphones allows users to seamlessly interact with NFC tags using their devices. By tapping an NFC-enabled phone to an NFC tag affixed to a product or its packaging, users may instantly access authenticated and encrypted information stored on the blockchain, providing real-time verification of product authenticity, traceability, and other valuable data. This democratizes access to secure information, making blockchain-based authentication widely accessible to consumers and businesses alike.

BRIEF DESCRIPTION OF FIGURES

A brief description of the drawings now follows.

FIG. 10 depicts a sample tenant user interface of an embodiment of the invention wherein a tenant may review one or more products to which encoded NFC tags have been affixed and the end user tap interactions for each such tag and product.

FIG. 12 depicts a sample tenant user interface of an embodiment of the invention wherein a tenant may create a request for one or more NFC tags to be encoded for one or more products.

FIG. 20 depicts a sample of code defining sample tap-transaction data compiled from a tap interaction that may be saved to a database portion in embodiments of the invention.

FIG. 21 depicts a sample subsequent block in a blockchain recording subsequent tap-transaction data from a tap interaction.

FIG. 22 depicts four (4) examples of tap-unique URLs generated by a suitable NFC tag that may be used in embodiments of the invention.

DETAILED DESCRIPTION

Figure 1:
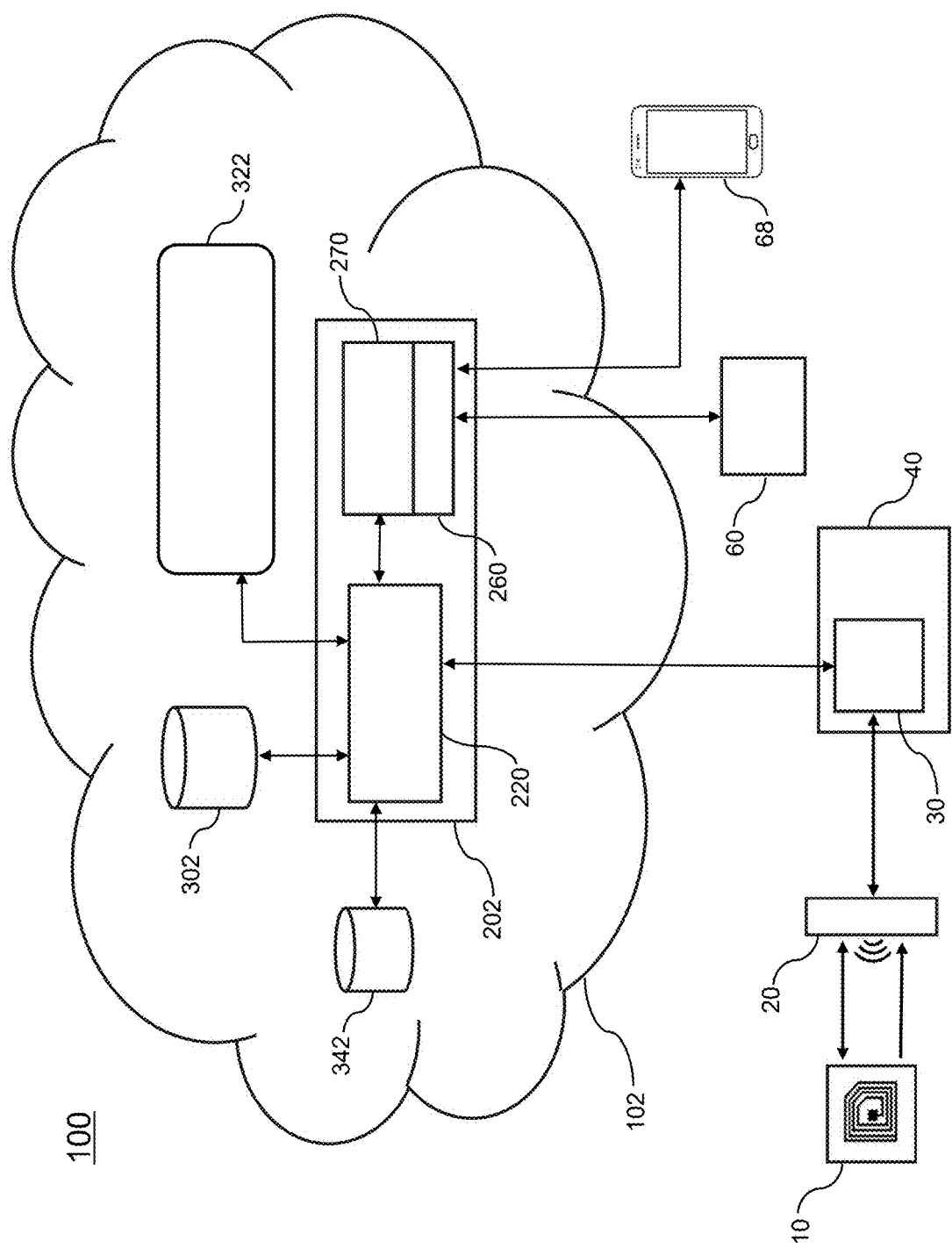
FIG. 1 is a schematic of a basic configuration 100 of an encoding portion of an embodiment of the invention.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention may be practiced without these specific details. In other instances, well-known features have not been described in detail to avoid unnecessarily complicating the description.

The terminology used herein is for the purpose of describing exemplary embodiments only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising".

As used herein, the term "tenant" means a manufacturer, producer, distributor, purveyor or seller of products, or any other party, including, for example, a certification organization, regulatory body, or governmental agency or entity, seeking to use the methods, process and systems of the present invention to track, verify, certify, or authenticate a product or any other tangible item.

As used herein, the term "product" means any tangible or intangible good, item or service and that is intended for delivery to a customer or end user, including, but not limited to, any commodity, agricultural product, cargo, ware, or shipment whether offered for sale (without regard to a specific value amount or price) or offered for no cost (i.e., free), and further including any packaging, accessories, and the like, or any other item of any kind (tangible or intangible) that a user or party, including, for example, a certification organization, regulatory body, or governmental agency or entity, may desire to track, verify, certify, or authenticate for any reason whatsoever.

It is understood that a "set" may include one or more elements. It is also understood that a "subset" of the set may be a set of which all the elements are contained in the set. In other words, the subset may include fewer elements than the set or all the elements of the set (i.e., the subset may be the same as the set). It is further understood that a set, including a subset, may be saved, modified, added to, subtracted from, processed, analyzed, read, sorted, subject to recursive and repeated steps, used, structured, deleted, re-generated, and the like.

It is understood that a "subprocess" may include one or more steps. It is also understood that a "subprocess" of a process may comprise all the steps contained in the process. In other words, the subprocess may include fewer steps than the process or all the steps of the process (i.e., the subprocess may be the same as the process). It is further understood that a process, including a subprocess, may be modified, added to, subtracted from, sorted, reorganized, subject to recursive and repeated steps, used, structured, deleted, re-generated, and the like.

It is also understood that the term "embodiment" is meant to include one or more embodiments (singular and plural) and that the term "embodiments" is also meant to include only one embodiment (singular and plural).

As used herein, the term "data structure" means a set, including any and all subsets, of one or more data (including metadata) that may be dynamically generated or created at any time, wherein the data may be obtained from any number of sources, including, but not limited to, one or more databases, devices, servers, modules, software, metadata, and the like, and wherein the data structure may be stored, recorded (including in a database, a blockchain, and the like), transmitted, saved, modified, added to, subtracted from, processed, and/or changed, and wherein the data structure may be further identified, analyzed, read, sorted, subject to recursive and repeated steps, used, structured, deleted, re-generated, and the like.

As demonstrated in this disclosure, embodiments of the invention may generally be comprised of two phases or portions: (1) an encoding phase, wherein a one or more unique individual NFC tag(s) 10 to be used or associated with, or incorporated within, a one or more respective unique individual product(s) 8, is/are encoded and encrypted for such use and then placed on, in, or within product(s) 8 for which encoded NFC tag(s) 10 was/were created, and (2) a tap interaction phase, wherein encoded NFC tag(s) 10 placed on, in, or within product(s) 8 is/are tapped or otherwise interacted with by a proximity coupling device (PCD) reading device 14, such as, for example (without limitation), an NFC enabled cell phone. Both phases or portions involve interactions with the blockchain to create an immutable transaction record for unique individual tag 10 and its corresponding, respective unique individual product 8. These phases or portions of embodiments will become apparent when reviewing the disclosure in view of the drawings. That embodiments of the invention may generally comprise or be described or disclosed according to such phases or portions, which should not be construed to limit the nature or scope of the invention.

FIG. 1 is a schematic of a configuration 100 of an encoding portion or phase of an embodiment of the invention. The schematic of FIG. 1 is one embodiment of an encoding portion, which may be configured in numerous ways as would be appreciated by those skilled in the art. The claimed methods, processes and systems of the invention are not dependent on any particular configuration, and the configuration of FIG. 1 is presented merely as an example of implementing an encoding portion embodiment.

It is to be understood that when reference is made to unique individual tag 10 and its corresponding, respective unique individual product 8, unless specifically noted otherwise, tag 10 means "one or more tag 10" and product 8 means "one or more product 8". In other words, use of the singular term "tag 10" is intended to include the plural "tags 10", with reference to the singular term "product 8", which is also intended to include the plural "products 8". It is to also be understood, unless expressly stated otherwise, that embodiments of the invention create a locked, mutual association between each unique individual tag 10 and its corresponding, respective unique individual product 8, wherein all tap transactions involving tag 10 are to be construed—unless stated to the contrary—to concomitantly involve product 8.

In FIG. 1, tag 10 is an appropriately sized and technology implemented NFC tag to be encoded with specific data relative to a specific product produced by a manufacturer, seller, retailer, distributor or any other party desiring to affix an NFC tag 10 to product 8 for purposes of tracking, verifying, authenticating, conducting inventory control, providing product data, providing marketing information with respect to a one or more product(s) (collectively, all such parties referred to herein as "tenant(s)", as that termed is defined, above). As referred to in the NFC industry, NFC tag 10 is a proximity integrated circuit card or "PICC." A PICC or smart card may be written to and/or read through contactless communication by a proximity card reader or "PCD," as described within that documentation, NFC Forum materials, and further within this disclosure.

Tag 10 communicates using near-field communication (NFC) protocols and is compatible with NFC Forum specifications and other relevant standards for contactless communication. In various embodiments, tag 10 may be an NFC card subject to the NFC standards and protocols of ISO/IEC 14443. In various embodiments, tag 10 may be an NFC card subject to the standards and protocols of ISO/IEC 7816, ISO 15693, ISO 18092 and/or ISO 29167, of which the contents of all are incorporated by reference herein in their entirety. They may be generally summarized as follows.

ISO 14443 defines the standard for proximity contactless smartcards, establishing the physical characteristics, radio frequency interface, and transmission protocols for data exchange at 13.56 MHz. It distinguishes between two communication types (A and B) and ensures reliable, short-range interactions between cards and readers, often used in identity and payment systems.

ISO 15693 addresses vicinity cards, which are designed for longer reading distances compared to proximity cards. It specifies protocols and command sets to facilitate contactless communication at similar frequencies but with extended range, supporting applications like inventory management and access control where a greater distance between tag and reader is beneficial.

ISO 18092 focuses on near field communication (NFC), providing guidelines for peer-to-peer communication between devices as well as between devices and tags. It builds on RFID principles to allow two-way, close-proximity interactions at 13.56 MHz, specifying data exchange formats, modulation techniques, and anti-collision methods to ensure seamless and secure communications.

ISO 29167 extends RFID standards by incorporating cryptographic methods to enhance security in RFID and NFC communications. It defines a framework of cryptographic protocols and cipher suites that help protect data integrity, authenticate devices and tags, and prevent unauthorized access, making the communication more robust against interception and tampering.

In various embodiments, tag 10 may be any commercially available NFC tag suitable for the methods, processes, and systems disclosed herein. Tags suitable for use in embodiments may incorporate cryptographic capabilities, such as generating unique interaction-specific data or authentication data upon each read-out by proximity coupling reading device 14, e.g., an NFC-enabled mobile device or reader, and transmitting these securely for backend verification. Examples of suitable tags include those with AES-128 cryptographic features or other equivalent technologies. However, embodiments of the invention are not tag-specific and may accommodate a variety of NFC tags with similar functionalities.

In embodiments, as discussed further within the disclosure, tag 10 is encrypted at process 600 (and verified through sub-process 718) using AES-128 cryptography (advanced encryption standard 128 using a fixed block size of 128 bits and a key size of 128, 192 or 256 bits, for example). It is specifically understood that the invention and the various encryption, decryption and verification steps and processes of embodiments thereof are not limited to AES-128 cryptography and that any suitable cryptography method may be used. See, for example, NFC standards and requirements.

Many suitable NFC tags for use in embodiments incorporate cryptographic operations to support dynamic, tap-unique authentication. These operations may include generating dynamic messages or secure unique data upon each interaction to ensure the authenticity, integrity, and confidentiality of the data exchanged. Such features provide robust solutions for product authentication, secure physical tag presence, and protected data exchange.

In embodiments, NFC tag 10 generates a secure tap-unique URL 93, which may generally comprise, for example, a tap-unique cryptographic output 94. Depending on the cryptographic methods used to encrypt various tag data 101 comprising tap-unique URL 93, tap-unique cryptographic output 94 may comprise (1) message authentication codes ("MACs") (used for tags such as NXP 424 DNA, discussed below, to ensure data integrity and authenticity during transmission), (2) one-time passwords ("OTPs") (session-specific tokens used for interaction-level security in tags such as EM4425), and (3) digital signatures (cryptographic signatures generated using on-chip ECDSA for Edge TruST25 tags, ensuring compatibility with blockchain-backed systems). Continuing, tag data 101 of tap-unique URL 93 may further comprise one or more tap-interaction data or metadata 113, such as, for example, a unique tag identifier 103, a tap interaction counter data 105 (a counter indicating the number of tap interactions), or other dynamic data, such as, for example a tag tamper status data 109 (a tamper detection feature). The tap-interaction data 113 may be transmitted to a backend system for validation in a verification process (see, e.g., process 718A within the disclosure), which verifies the data's authenticity and integrity based on cryptographic methods, including but not limited to digital signatures, message authentication codes, or one-time passwords. The validation or verification process may confirm the authenticity of tag 10, and hence, product 8 to which it was affixed, detect potential tampering, and ensure the presence of the physical tag during the interaction. In embodiments, the tap-unique URL further comprises a host server portion and unique product ID 95.

Tags 10 may also support secure data transmission protocols compliant with NFC Forum standards and ISO/IEC specifications, ensuring compatibility across various NFC-enabled devices. For example, tags 10 may encode tap-interaction specific data 113 in formats such as NFC Data Exchange Format (NDEF), which facilitates seamless interaction with NFC-enabled mobile devices without requiring dedicated applications. Dynamic or encrypted metadata encoded in tag 10 may include unique tag identifier 103, an interaction counter generating tap counter data 105, and optional tamper detection feature that generates tag tamper status data 109.

In some embodiments, tag 10 may comprise a tamper detection feature that generates a tamper status data 109. This functionality may involve a detection mechanism that monitors the integrity of the tag's physical state and triggers a flag or status change upon tampering. The tamper status data 109 may be reflected in dynamic messages generated by the tag or included in encrypted metadata transmitted during interactions.

Tags 10 supporting file-based memory structures may allocate memory for dynamic and static content, allowing flexibility in encoding secure messages, metadata, or user-defined information. Encrypted communication modes can further protect sensitive applications, ensuring compliance with modern data protection regulations.

In embodiments, tag 10 may utilize configurable features to support encrypted or plaintext communication of its dynamic data. These features may include secure randomization of unique tag identifiers or dynamic updates to interaction counters, ensuring compliance with user privacy standards and preventing replay attacks.

For tags 10 incorporating tamper detection, tamper status data 109 may include both permanent and current states, enabling real-time detection and historical tracking of tampering events. Upon a tamper event, the status may be irreversibly stored in non-volatile memory (NVM) and transmitted during subsequent interactions to alert users or backend systems of a potential compromise.

Embodiments of the invention accommodate various NFC tags with tamper detection features, dynamic messaging capabilities, and cryptographic support, ensuring flexibility in implementing the disclosed systems and processes.

An example of a suitable tag 10 is the "NT4H2421Gx" NFC tag by NXP B.V. ("NXP") (see www.nxp.com). The NT4H2421Gx NFC tag is sold under the tradename "NTAG 424 DNA" (the "424 DNA Tag"). Specific technical data concerning the 424 DNA Tag may be found on the NXP website and in the NXP product data sheet document titled "NT4H2421Gx" dated Jan. 31, 2019 (available at https://www.nxp.com/docs/en/data-sheet/NT4H2421Gx.pdf) and the application note document titled "AN12196" dated Aug. 19, 2024 (available at https://www.nxp.com/docs/en/application-note/AN12196.pdf), the contents of which both documents are incorporated herein by reference in their entirety. For clarity, the 424 DNA Tag is discussed on the basis that it is an NFC tag suitable for implementing embodiments of the invention and such embodiments of the invention are not tag specific. Other suitable NFC tags are commercially available.

The 424 DNA Tag utilizes an MAC cryptographic process resulting in an MAC cryptographic output in tap-unique URL 93; an example configuration with placeholders may be as follows:

https://choose.url.com/ntag424?e=00000000000000000000000000000000&c=0000000000000000

The tag data 101 of tap-unique URL 93 generated by the 424 DNA Tag comprises unique tag identifier 103, which may be configured to randomly generate upon a tap interaction and an interaction counter data 105.

Figure 13:
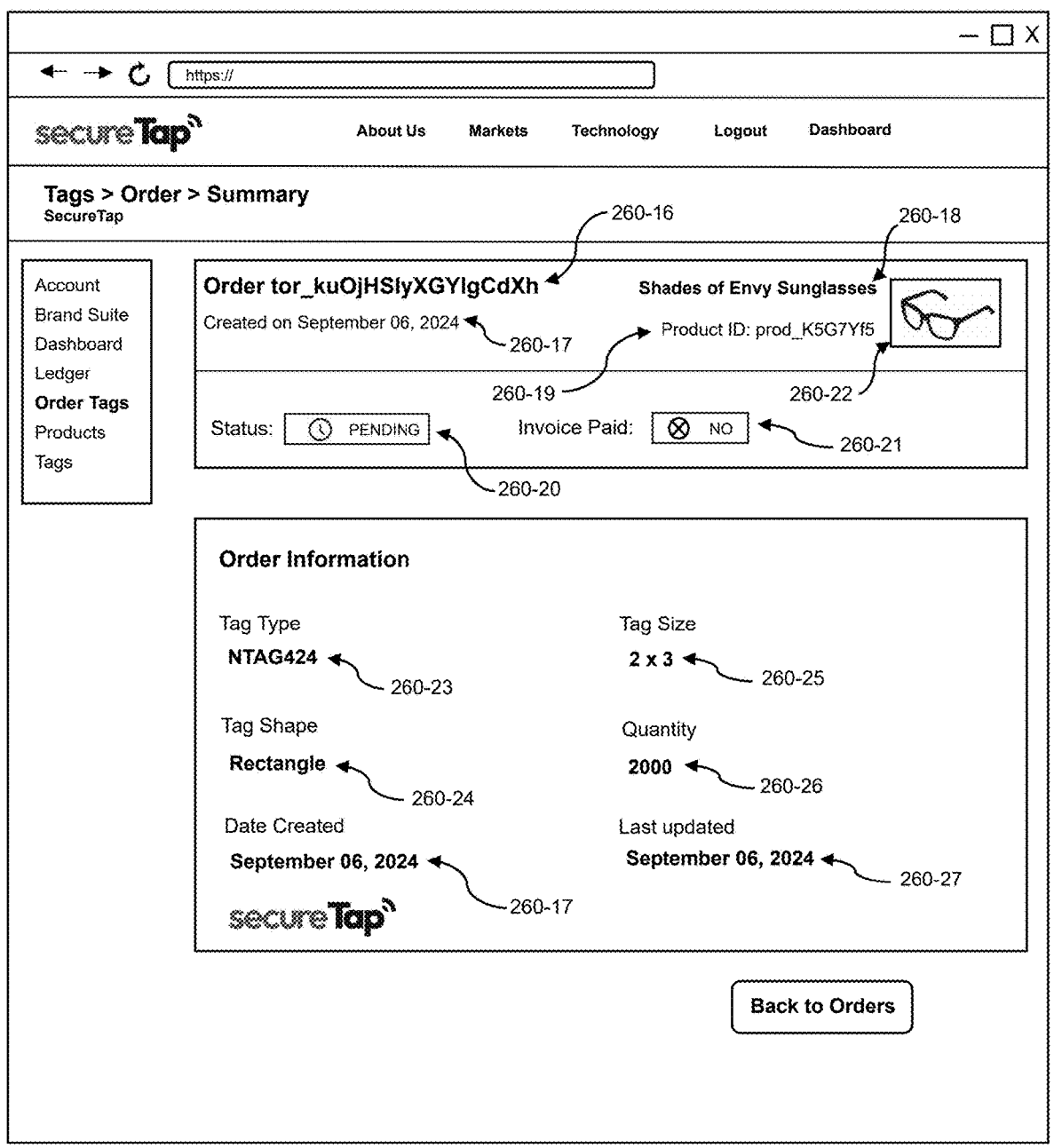
FIG. 13 depicts a sample tenant user interface of an embodiment of the invention providing order (request) confirmation details pursuant to a request by the tenant for one or more NFC tags to be encoded for one or more products.
Figure 23:
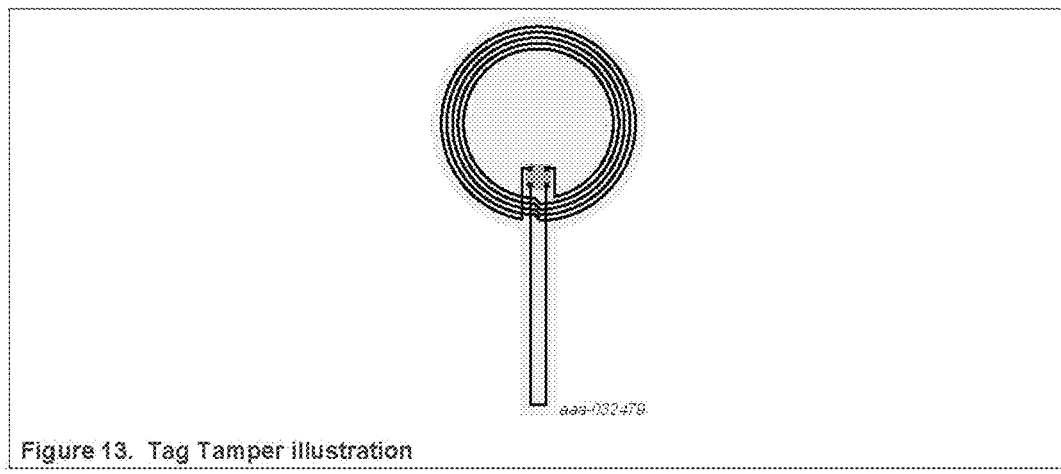
FIG. 23 depicts an example of an NFC tag with a tamper detection feature.

An example of another suitable NFC tag for embodiments of the invention is the "NT4H2421Tx" NFC tag, also by NXP and sold under the tradename "NTAG 424 DNA TT." The NXP NT4H2421Tx tag differs from the NXP NT4H2421Tx tag in that it features a smart status awareness, detecting the status of a tamper loop. Users can instantly detect the once-opened status, by just reading the tag with an NFC enabled device, such as PCD reading device 14. The chip irrevocably stores this event and mirrors it into the NDEF message during startup. Specific product and technical data concerning the tamper protection feature of this 424 Tag may be found on the NXP website and in the NXP product data sheet document titled "NT4H2421Tx" dated Jan. 31, 2019 (available at https://www.nxp.com/docs/en/data-sheet/NT4H2421Tx.pdf) ("NT4H2421Tx Document"). The NT4H2421Tx tag comprises a tamper detection wire as illustrated in FIG. 13 in the NT4H2421Tx Document. See Example 5, set forth at FIG. 23. When the tag tamper protection feature of the NT4H2421Tx tag is enabled, it is possible to mirror tag tamper status data 109 in the tag data 101 portion of tap-unique URL 93. In embodiments, tag 10 comprises a tag tamper detection feature in the same or similar form as that comprising the NT4H2421Tx tag which generates tag tamper status data 109.

Continuing with FIG. 1, encoding of tag 10 is accomplished by a PCD encoding device 20, in this example, an encoding terminal, functionally connected to NFC encoding module 30 operating on local encoding device 40, such as a laptop, desktop computer or other similar computer device, including, for example, a thin layer client device (e.g., Raspberry Pi®). PCD encoding device 20 is functionally connected to the local encoding device 40 via wired or wireless technologies. In an embodiment, for example, PCD encoding device 20 is functionally connected to encoding device 40 through a standard USB connection. By accessing encoding module 30 operating on local encoding device 40, a user may execute various commands and functions that power, communicate with, and encode various data to tag 10 from and through PCD encoding device 20. For example, with respect to the 424 Tag, various features and functions of that tag may be configured, implemented, encoded, instructed and the like according to established NFC communications protocols and data exchange formats and as per NXP documentation for that tag. PCD encoding device 20 and NFC tag 10 communicate through established NFC communications protocols and data exchange formats based on existing radio frequency identification (RFID) standards, such as, but not limited to, ISO/IEC 14443 and FeliCa. The standards also include ISO/IEC 18092 and those defined by the NFC Forum. (NFC communicating in one or both directions uses a frequency of 13.56 MHz in the globally available unlicensed radio frequency ISM band, compliant with the ISO/IEC 18000-3 air interface standard at data rates ranging from 106 to 848 kbit/s.)

In an embodiment, PCD encoding device 20 and local encoding device 40, may be a single device that performs all encoding operations, with NFC encoding module 30 operating on that single device. An example of such an embodiment includes, but is not limited to, an NFC enabled cell phone, wherein the cell phone serves as the PCD encoding device 20 (by tapping the NFC tag 10 to be encoded) and further serving as the local encoding device 40 operating encoding module 30 to provide an interface so as to allow a user to selectively determine the encoding parameters, functionality of NFC tag 10, encryption means, placeholder URL (for tap-unique URL 93), and any other configurations, functions and data selection of various embodiments.

NFC encoding module 30 may comprise an executable software, application or program functionally operating on NFC encoding device 40 that serves as an operable interface between API module 220 and PCD encoding device 20. Encoding module 30 provides the appropriate functionality to allow a user of the system to interact with tag 10 through PCD encoding device 20, configure and establish settings of tag 10 (in accordance with the manufacturer specifications for NFC tag 10 and applicable NFC standards and protocols), encode tag 10 with applicable data, for example, in accordance with embodiments disclosed herein, and encrypt tag 10 according to manufacturer specifications and applicable NFC and AES protocols, as discussed in the disclosure. Encoding module 30 may obtain and/or generate data for use with tag 10 from any number of sources, local or remote, and further including, but not limited to, API module 220 as disclosed herein. Encoding module 30 may be proprietary or obtained from third party sources, such as, for example, a manufacturer of NFC tag 10.

Continuing with FIG. 1, in embodiments, encoding module 30 operating on local encoding device 40, may be functionally connected via a wired or wireless network to API module 220 running on an at least one sever 202, which may be a local server, a dedicated server located remotely from local encoding device 40, or one or more cloud-based servers, or any combination thereof. In an embodiment, as per FIG. 1, API module 220 is functionally connected to one or more database module(s) 302, such as, for example, an SQL database, running on a server (local, remote or cloud-based). In embodiments, database module 302 and/or API module 220 may be configured to operate on the same or separate servers or on virtual machines on the same server. In yet other embodiments, database module 302 and/or API module 220 may be configured to operate on local encoding device 40. In embodiments, database module 302, API command module 220, local encoding module 30, or any combination thereof, may be configured to operate on the same device, which may comprise, in embodiments, PCD encoding device 20 and/or local encoding device 40, configured separately or as a single device.

In embodiments, API (application program interface) module 220 is a software, application or program operating on a computer or computing device, such as a server, that functions as the central operational control point and communication bridge, interfacing with NFC encoding components (e.g., NFC encoding module 30, NFC encoding device 40, and/or PCD encoding device 20), database module 302, and blockchain module 322. API module 220 may be built using Java, and employing a structured SQL database, ensures seamless management, processing, and validation of data across the authentication lifecycle as disclosed in various embodiments herein. API module 220 may operate on a server environment (local, dedicated, or cloud-based) and exposes standardized endpoints to facilitate secure communication between system modules.

In embodiments, primary functions of API module 220 may include, but are not necessarily limited to, the following:

Tag Encoding and Data Management. In embodiments, and as discussed further in the disclosure, API module 220 receives tag order requests 62 from tenants via tenant interface module 260, generates unique product IDs 95 for products 8 to be used or associated with specific NFC tags 10 for each product, and generates data structures 89 for various steps, processes and operations of embodiments, such as, for example, data structures 89 for a transaction request 83 (e.g., a JSON RPC request) or into an SQL-compatible format for use with database module 302. In embodiments, API module 220 transmits data structures 89 to the NFC encoding module 30 for tag 10 encryption and encoding processes while maintaining a secure record in database module 302.

Blockchain Integration. In embodiments, acting as the bridge between the SQL database module 302 and blockchain module 322, API module 220 commits immutable data structures 89, such as data structures 89 comprising unique product IDs 95 and related product and tenant meta data in connection with the encoding process of NFC tag 10, as well as unique tap-interaction data 113 generated from a tap interaction with a specific tag 10, to blockchain module 322. In embodiments, API module 220 ensures traceability and provides consensus-backed validation via blockchain module 322 to users of the system and methods of the invention, including tenants and consumer end users.

Verification and Authentication. In embodiments, and discussed further within, for tap interactions, API module 220 processes incoming HTTP GET requests initiated via the tag respective tap-unique URLs 93. In embodiments, and as discussed further within this disclosure, using a tenant-specific encryption key 99 (retrieved securely from a Key Management Service or KMS 342), API module 220 decrypts, validates, and verifies the authenticity of NFC tag 10 (see process 700 in FIGS. 7A-7C). In embodiments, the validation and verification steps may include re-encryption or cryptographic processing of portions of tap-unique URL 93 (e.g., authentication data or metadata within the tap-unique URL 93) to match corresponding cryptographic outputs (e.g., hashes, signatures, or other authentication data) and confirm data integrity (see process 700 in FIGS. 7A-7C).

In embodiments, technical implementation of API module 220 may comprise, but are not necessarily limited to, the following:

Languages/Framework. In embodiments, API module 220 may be built using Spring Boot, a Java-based framework optimized for creating robust, scalable RESTful services. In embodiments, API module 220 may be built using any number of languages, such as, for example, Python frameworks (e.g., Django, a high-level Python web framework that encourages rapid development and clean, pragmatic design; Flask, a lightweight WSGI web application framework that's easy to get started with and highly flexible); Node.js frameworks (e.g., Express.js, a minimal and flexible Node.js web application framework that provides a robust set of features for web and mobile applications; NestJS, a progressive Node.js framework for building efficient, reliable, and scalable server-side applications using TypeScript); and other frameworks (e.g., Ruby on Rails, a server-side web application framework written in Ruby, emphasizing convention over configuration; NET Core, a cross-platform, high-performance framework for building modern, cloud-based, and internet-connected applications).

Data Management. In embodiments, data interactions of API module 220 leverage SQL databases (comprising, for example, database module 302), ensuring efficient storage, retrieval, and indexing of tag-related data structures 89.

Security. In embodiments, API module 220 integrates with key management service (KMS) 342 for encryption key 99 generation and retrieval. API module 220 may also employ AES-128 encryption for secure data handling.

Blockchain Interaction. In embodiments, API module 220 communicates with blockchain module 322, for example, a Hyperledger blockchain, via transaction requests 83 (e.g., via JSON-RPC requests), ensuring efficient recording and validation of tag data structures 89 and tap-interaction data 113, including tag verification results 111, on the immutable ledger of blockchain module 322, all of which is discussed in greater detail with respect to process 700 at FIGS. 7A-7C.

By coordinating the flow of data and operations between tenants, local encoding modules, databases, and blockchain components, in embodiments, API module 220 ensures the systems and process of embodiments function as a cohesive, secure, and tamper-proof solution for product authentication and verification.

Continuing with FIG. 1, API module 220 is further functionally connected, via a wired or wireless network, to blockchain module 322 running on a server (local, remote or cloud-based). Alternatively, in an embodiment, API command module 220 and blockchain module 322 may be configured to operate on the same or separate servers or on virtual machines on the same server, or any combination of the foregoing.

As used herein, blockchain module 322 refers to a blockchain, an immutable ledger for recording transactions. In embodiments, API module 220 integrates and consolidates data and information from various sources as more specifically provided herein. In some embodiments, at least some of the data and information from the various sources may be stored or recorded in blockchain module 322, which may be maintained by a distributed network of nodes. In some embodiments, a consensus protocol may be used by the nodes to determine whether to allow transactions to be performed and group the transactions into blocks that are added to the blockchain comprising blockchain module 322.

Regarding blockchains, in general, there are different kinds, such as permissionless and permissioned. In a permissionless blockchain, any entity may participate without an identity. In a permissioned blockchain, each entity that participates in the blockchain is identified and known. Examples of permissioned blockchains include Hyperledger Fabric, Hyperledger Sawtooth, IBM Blockchain Platform, and Quorum. Permissioned blockchains enforce strict identity verification, allowing participating nodes to view only the transactions appropriate to their access level. Programmable logic may be implemented as rules or smart contracts that are executed by the blockchain platform.

In embodiments, blockchain module 322 may comprise or implement one of the aforementioned platforms, such as Hyperledger Fabric, Hyperledger Sawtooth, Ethereum, IBM Blockchain Platform, or Quorum, depending on the deployment requirements. Each of these platforms provides a verifiable trace of proof that the content stored on the blockchain is associated with unique individual tag 10 and its respective unique individual product 8. In embodiments, data such as, for example, unique product ID 95 and/or unique tag identifier 103 (among other data), may be recorded to blockchain module 322, creating a secure chain of record and providing verification of that information.

In embodiments, when blockchain module 322 comprises Hyperledger Fabric, it operates as a modular distributed ledger solution. Hyperledger Fabric is a permissioned blockchain infrastructure providing a modular architecture with a delineation of roles between the nodes in the infrastructure, execution of Smart Contracts (called "chaincode" in Fabric), and configurable consensus and membership services. A Fabric network comprises (1) Peer nodes, which execute chaincode, access ledger data, endorse transactions, and interface with applications; (2) Orderer nodes, which ensure the consistency of the blockchain and deliver the endorsed transactions to the peers of the network; and (3) Membership Service Providers (MSPs), each generally implemented as a Certificate Authority, managing X.509 certificates to authenticate member identity and roles. Hyperledger Fabric supports different consensus algorithms, with Practical Byzantine Fault Tolerance (PBFT) being one commonly used.

Alternatively, in embodiments, blockchain module 322 may comprise Hyperledger Sawtooth, a highly modular platform designed for non-cryptocurrency applications. Sawtooth uses a Proof of Elapsed Time (PoET) consensus mechanism, providing scalability and low energy consumption. It allows smart contracts to be written in various programming languages, making it suitable for supply chain applications and asset tracking.

For applications requiring a public or hybrid blockchain, blockchain module 322 may implement Ethereum. Ethereum provides a decentralized platform for executing smart contracts on its blockchain using the Ethereum Virtual Machine (EVM). Smart contracts on Ethereum enable automated recording of tag interactions, ensuring transparency and verifiability.

In another embodiment, blockchain module 322 may integrate with the IBM Blockchain Platform, an enterprise-grade implementation of Hyperledger Fabric. This platform provides tools for building, operating, and governing permissioned blockchain networks with enhanced security, scalability, and user management features tailored for enterprise use cases.

Finally, in embodiments, blockchain module 322 may utilize Quorum, a permissioned variant of Ethereum. Quorum provides enterprise-focused features such as private transactions, enhanced data privacy, and faster transaction processing, making it ideal for scenarios requiring selective data sharing within a consortium.

Each of these blockchain platforms offers unique advantages, allowing blockchain module 322 to be tailored to the specific requirements of the application, whether it prioritizes scalability, privacy, consensus mechanisms, or integration with existing systems.

In embodiments, API module 220 is comprised with various administrative permissions, including permissions regarding transactions with blockchain module 322. API module 220 functions as the central authority, exclusively authorized to initiate and manage transactions on blockchain module 322. By centralizing transaction authority within API module 220, embodiments of the invention establish a secure and controlled environment that mitigates the risk of unauthorized access and preserves the integrity of data and transactions recorded on blockchain module 322.

In embodiments, API module 220 employs strong authentication mechanisms generally known by those skilled in the art, such as mutual transport layer security ("TLS"), to verify identity and to ensure that only authorized actions are permitted. This approach guarantees that administrative tasks—including configuring network parameters, managing peer nodes, and overseeing overall blockchain operations—are handled with the highest level of security and precision.

Continuing with blockchain module 322, the blockchain may be a "fee-less" blockchain. Fee-less blockchains represent a unique category of blockchain technology designed to eliminate the transactional fees typically associated with traditional blockchain platforms. Unlike platforms such as Ethereum or Bitcoin, which charge fees (often referred to as "gas") for validating and processing transactions, fee-less blockchains operate without such costs, making them particularly appealing for use cases requiring high transaction throughput, microtransactions, or cost-sensitive applications.

Fee-less blockchain implementations achieve this functionality by employing alternative consensus mechanisms and network economics. For instance, certain platforms utilize Delegated Proof of Stake (DPoS) or Proof of Authority (PoA) consensus mechanisms, where a limited and pre-approved set of validators process transactions. These validators are often incentivized through alternative means, such as staking rewards or organizational funding, rather than user-imposed transaction fees.

In embodiments, blockchain module 322 may utilize fee-less blockchain platforms such as Hyperledger Fabric, IOTA, or Nano to support applications requiring frictionless interactions. Hyperledger Fabric, for instance, is inherently fee-less because it is designed as a permissioned blockchain infrastructure where all participants are pre-identified and operate under organizational governance. Instead of requiring transaction fees to incentivize or reward validators, Hyperledger Fabric relies on pre-established trust and shared goals among consortium members. This makes it particularly suitable for enterprise applications, where the cost of operating the network is shared among participants rather than imposed on individual transactions.

Hyperledger Fabric's modular architecture provides the flexibility to configure consensus mechanisms, such as Practical Byzantine Fault Tolerance (PBFT), without relying on fees to drive network participation. By centralizing control of network access and transaction validation through Membership Service Providers (MSPs), organizations leveraging Hyperledger Fabric can achieve fee-less transaction processing while maintaining robust security, scalability, and privacy.

Additionally, platforms like IOTA and Nano employ innovative designs to achieve fee-less transactions. IOTA uses a Directed Acyclic Graph (DAG) structure, known as the Tangle, where users validate two previous transactions to add their own to the ledger, eliminating the need for fees. Nano utilizes a block lattice architecture, where each account has its own blockchain, and transactions are processed through lightweight consensus mechanisms such as Open Representative Voting (ORV).

In embodiments, blockchain module 322 may also incorporate Decentralized Identifiers (DIDs) to enhance product authentication and user privacy. DIDs are a globally unique and resolvable identifier system designed for secure, verifiable, and privacy-preserving interactions. By linking DIDs to unique product IDs or tag identifiers stored in the blockchain, the system ensures that products can be authenticated without exposing sensitive user or organizational data. This approach allows for decentralized and trustless verification while maintaining data privacy and control.

The use of DIDs in blockchain module 322 also facilitates advanced privacy-preserving features, such as selective disclosure of product or authentication details. For instance, a user may verify the authenticity of a product without revealing personal data, ensuring compliance with privacy regulations like GDPR or CCPA. DIDs also enable cross-platform compatibility, allowing seamless integration of blockchain module 322 with external systems for supply chain tracking or customer engagement.

By integrating fee-less blockchains, including Hyperledger Fabric and other innovative technologies like DIDs, embodiments of blockchain module 322 provide enhanced accessibility for users and organizations by removing financial barriers to entry. Applications such as product authentication, supply chain tracking, or customer engagement can benefit from the seamless and cost-efficient nature of fee-less transactions, ensuring scalability while maintaining a secure and transparent ledger.

In some embodiments, blockchain module 322 may utilize a hybrid approach, combining fee-less blockchains like Hyperledger Fabric with traditional permissionless blockchains for specific use cases. This configuration allows applications to take advantage of the cost efficiency of fee-less systems for high-volume transactions while leveraging the public auditability and decentralized nature of permissionless blockchains for broader transparency.

Fee-less blockchains also align with sustainability goals by reducing the energy consumption typically associated with transaction validation on proof-of-work networks. This makes them an environmentally friendly choice for organizations prioritizing sustainability in their operations.

Continuing with FIG. 1, in embodiments, local tenant device 60 is a functional computing device, such as, for example, a laptop or desktop, accessible by a tenant to functionally connect, via a wired or wireless network, to tenant interface module 260 operating on server 202. Referring to FIG. 1, using the systems, methods and processes of various embodiments of the invention, a tenant may use a web browser operating on local tenant device 60 to access tenant interface module 260 which may generally comprise a website. In the embodiment of system 100, after accessing interface module 260, which may be provided as a SaaS based service, a tenant would enter appropriate account information, such as login information generally comprising a username and password, or any other required information, wherein said information is transmitted to authentication module 270. In embodiments, interface module 260 and tenant login module 270 are functionally interoperable, with interface module 260 comprising the "front end" and authentication module 270 comprising the "back end" of the tenant access system and process to allow a tenant to transmit data and information to API module 220 for further processing and transmittal in accordance with embodiments. Mobile tenant device 68 provides an alternative means by which a tenant may access interface module 260. Specifically, mobile tenant device 68 may comprise a wireless device, such as a cell phone, that is functionally connected to tenant interface module 260 operating on server 202.

Encoding NFC tag 10 with the embodiment of system 100 of FIG. 1 comprises, among other things, implementation of various NFC communications and technology. Near-field communication or NFC is a set of communication protocols that enables communication between two electronic devices over a distance of 10 centimeters or less. Regarding the present invention, in embodiments, tag 10 is encoded with specific, unique and immutable data associated with an exact product 8 that may be read by a second proximity coupling device or PCD reading device 14, such as a cell or mobile phone, to verify or authenticate product 8 associated with tag 10 (among many other potential uses). Like other proximity card technologies, NFC is based on inductive coupling between two electromagnetic coils present in an NFC-enabled device such as a smartphone. NFC communicating in one or both directions uses a frequency of 13.56 MHz in the globally available unlicensed radio frequency ISM band, compliant with the ISO/IEC 18000-3 air interface standard at data rates ranging from 106 to 848 kbit/s. NFC communications involve an initiator and a target; the initiator actively generates an RF field that can power a passive target. For example, concerning embodiments of the present invention, the initiator may be a cell or mobile phone, i.e., PCD reading device 14. The target is NFC tag 10. This enables NFC targets to take very simple form factors such as unpowered tags, stickers, key fobs, or cards.

NFC tags contain data and are typically read-only but may be writable. They may be custom encoded by their manufacturers or use NFC Forum specifications. The tags may securely store personal data such as debit and credit card information, loyalty program data, PINs and networking contacts, among other information. In this case, as demonstrated by various embodiments described herein, NFC tag 10 is encoded and encrypted with data associated with or connected to other data concerning product 8, a specific individual item. As described above, the 424 DNA Tag by NXP is an example of a suitable NFC tag 10.

Although the components of system 100 are depicted as being directly communicatively coupled to one another, this may not necessarily be the case. For example, one or more of the components of system 100 may be communicatively coupled via a distributed computing system, a cloud computing system, or a networked computer system communicating via the Internet.

Although embodiments of an encoding portion of the invention are illustrated in system 100, it should be appreciated that this system may represent many computer/networking systems, arranged in a central or distributed fashion. For example, such systems may be organized as a central cloud and/or may be distributed geographically or logically to edges of a system such as a content delivery network or other arrangement. It is understood that virtually any number of intermediary networking devices, such as switches, routers, servers, etc., may be used to facilitate communication.

Figure 2:
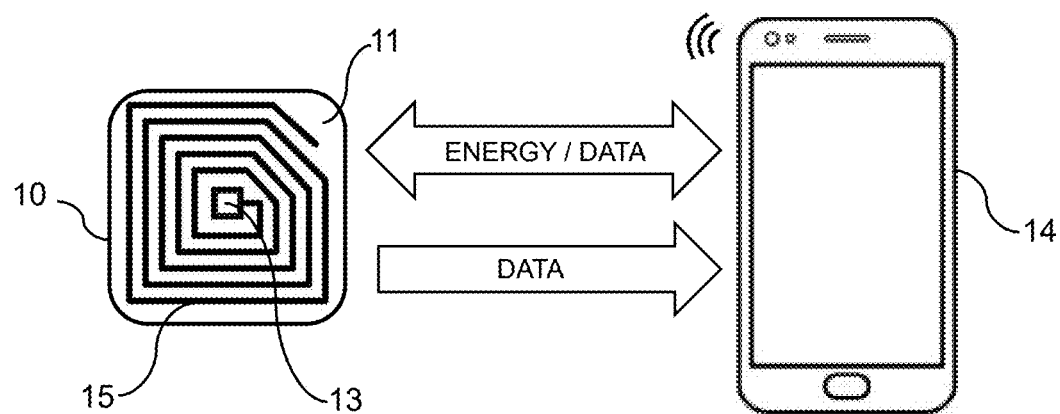
FIG. 2 is a schematic depicting a tap interaction between a proximity coupling device (PCD), in this case a cell phone, and an encoded NFC tag.

FIG. 2 is a schematic depicting a tap interaction between PCD reading device 14, in this case a cell phone, and an encoded NFC tag 10. As demonstrated in FIG. 2, PCD reading device 14 provides the requisite electromagnetic (radio frequency) energy to "power up" tag 10. In embodiments, tag 10 comprises a general substrate material 11, such as paper, plastic, composites or any combination thereof, an integrated circuit (microchip) 13 to which data may be stored (encoded), encrypted and read, and to which various executable software instructions may be embedded, and a thin wire antenna 15, typically a copper coil, for capturing the electromagnetic radiation transmitted from PCD reading device 14. In embodiments, tag 10 may comprise a tamper protection element, such as, for example, an impedance loop that signals a tampered state if broken. In this regard, see the above discussion of example tag NT4H2421Tx and FIG. 23.

While not intended to limit the scope of any embodiment of the invention, by way of background, and with reference to FIG. 2, a tap interaction between PCD reading device 14 (and/or PCD encoding device 20 since PCD reading device 14 and PCD encoding device 20 may be the same, single device) and tag 10 generally involves the following steps:

Proximity Activation: When PCD reading device 14 comes within a close range (typically 10 centimeters) of tag 10, it initiates the communication process.

Electromagnetic Induction: PCD reading device 14 emits an electromagnetic signal that is captured by copper coil antenna 15 in NFC tag 10. This signal generates a small electrical current in the coil.

Powering the Microchip 13: The generated electric current powers integrated circuit microchip 13 in tag 10. Integrated circuit microchip 13 stores data, including executable program functions. In embodiments, a suitable NFC tag 10, for example, the 424 Tag discussed above, features its own proprietary integrated circuit microchip.

Data Transmission: Integrated circuit microchip 13 uses this power to transmit its stored data, and any data processed by tag 10 according to its internal coding and functionality back to PCD reading device 14 via inductive coupling.

Data Processing: PCD reading device 14 receives the data transmitted by tag 10 and may then process it according to the specific applications discussed further within this application.

While discussed in the context of PCD reading device 14, the above steps generally apply to any applicable NFC PCD device, including, for example, PCD encoding device 20.

Figure 3:
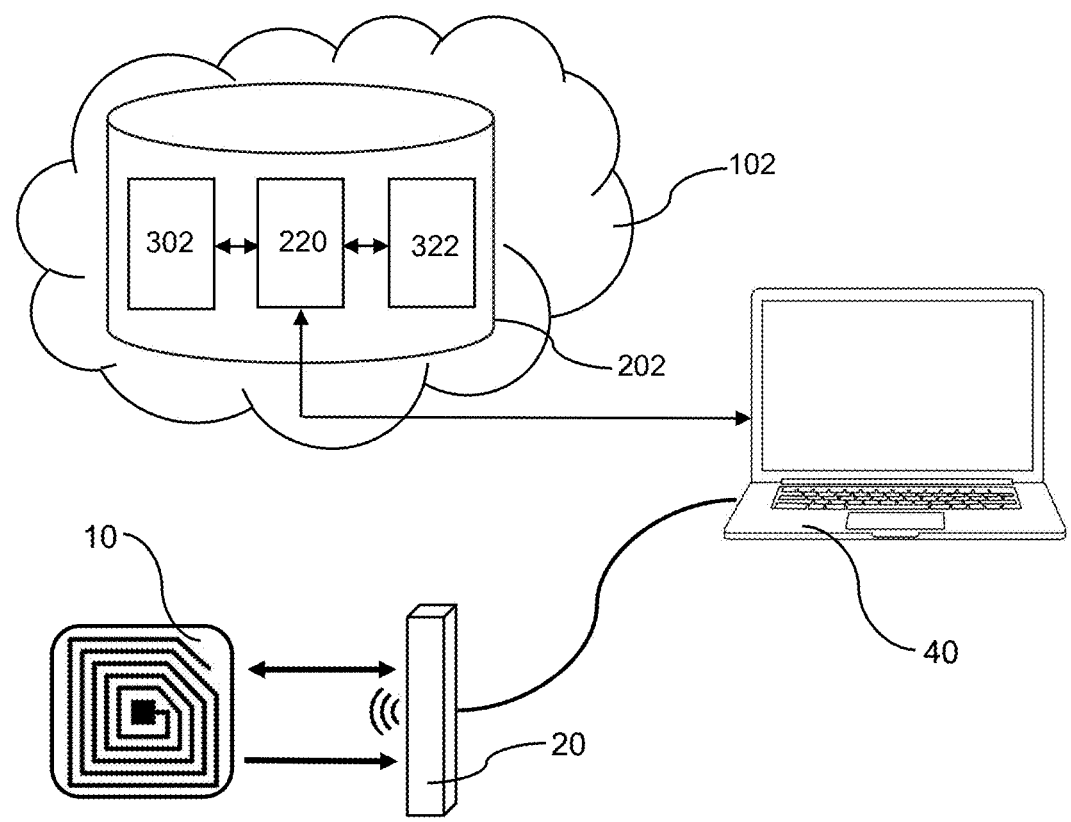
FIG. 3 is a schematic depicting an alternative basic configuration of an encoding portion of an embodiment of the invention.

FIG. 3 is a schematic depicting an alternative configuration of an encoding portion of an embodiment of the invention. In the encoding portion embodiment of FIG. 3, API module 220, database module 302 and blockchain module 322 are all operating on the same functional server 202 or on one or more virtual machines all running on the same functional server in cloud 102. Those skilled in the art would readily appreciate that the various modules comprising system 100 of FIG. 1 and the system of FIG. 3 may be configured in numerous different ways without departing from the scope of the invention. The various systems depicted in the disclosure, particularly system 100 of FIG. 1, are illustrative embodiments that demonstrate the invention and various additional features of those systems and should not be construed as limiting configurations.

Figure 6A:
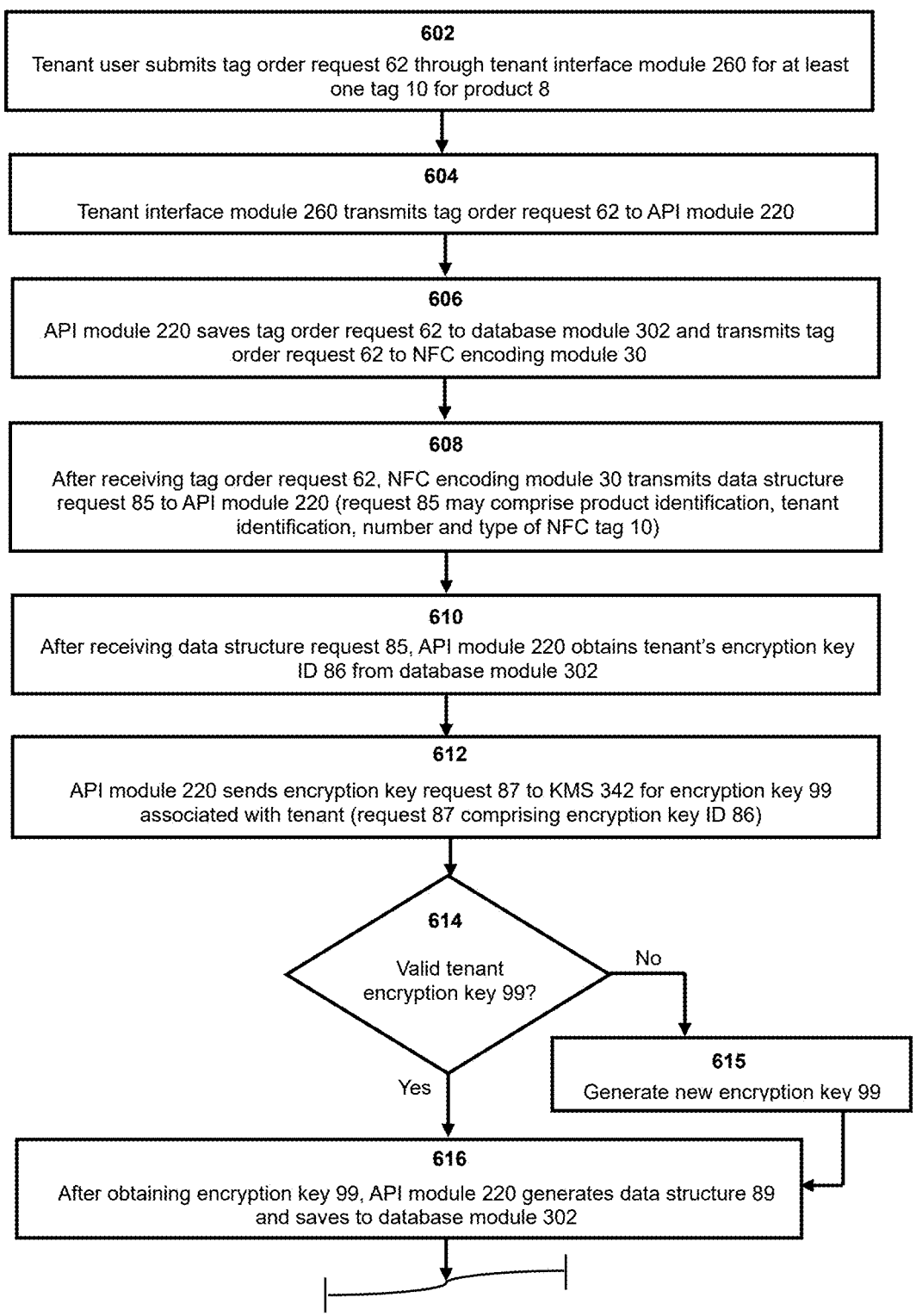
FIGS. 6A-6C depict process 600, an encoding embodiment portion of the invention.
Figure 6B:
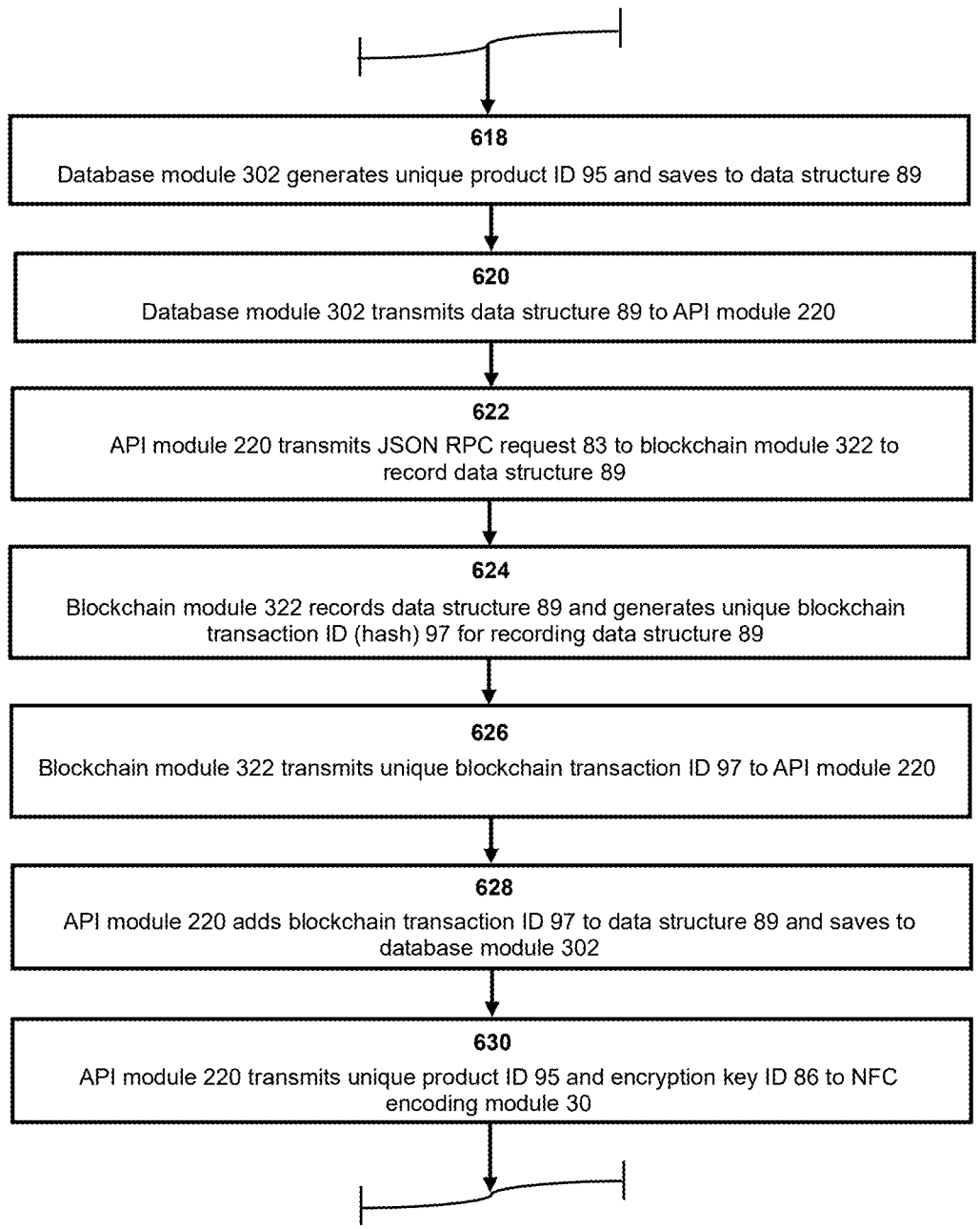
Figure 6C:
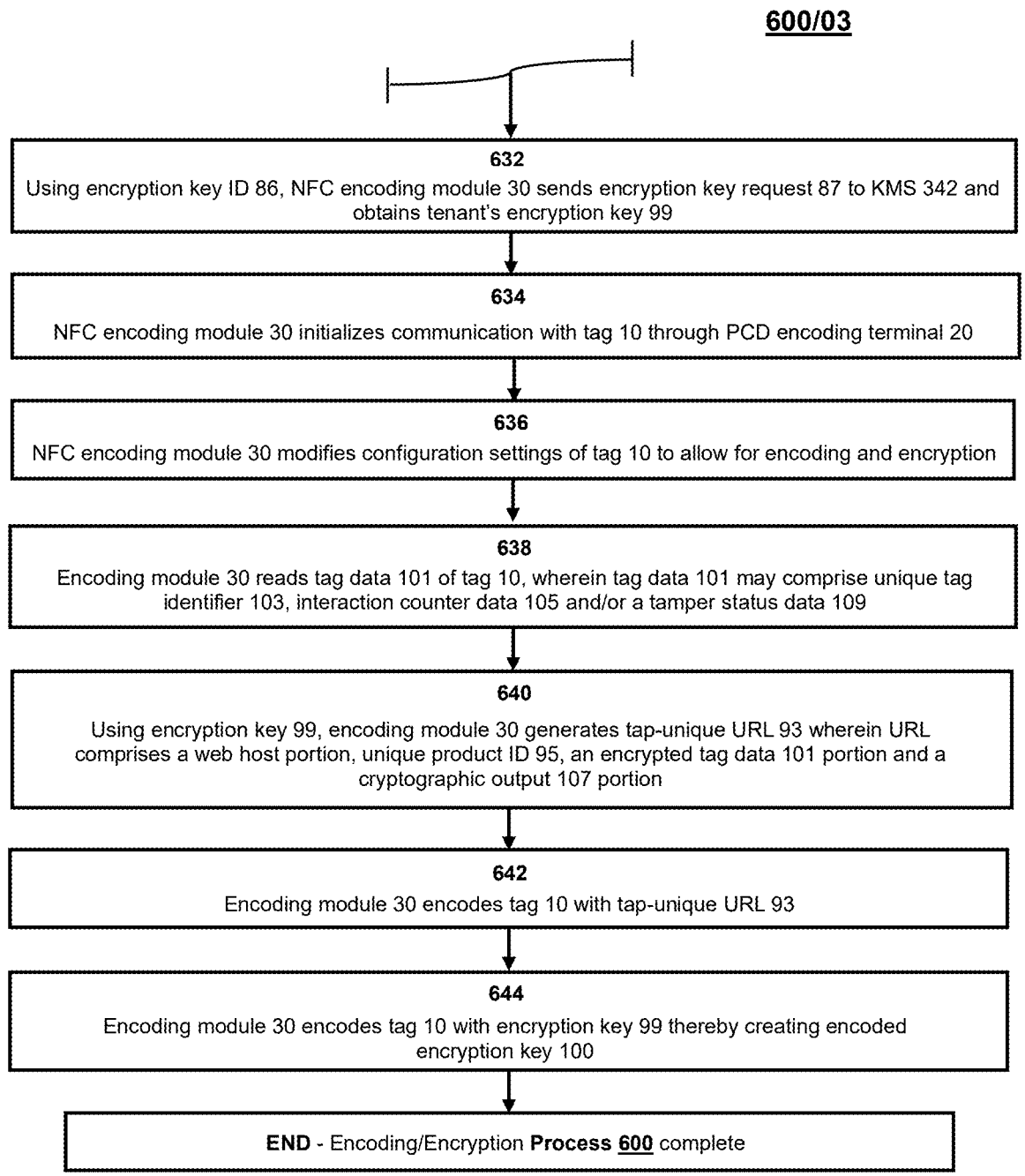

FIGS. 6A-6C depict process 600, an encoding embodiment portion of the invention. Process 600 presents an embodiment process by which unique individual tag 10 may be encoded and encrypted according to an embodiment of the invention and with reference to system 100 of FIG. 1 for use with corresponding unique individual product 8. The various steps comprising process 600 are addressed below and comprise numerous features and elements that may be combined, amended, re-organized or deleted without departing from the scope of the claimed invention.

Step 602. At Step 602, in an embodiment, a remote tenant user of system 100 desiring to encode at least one unique individual tag 10 for at least one unique individual product 8, submits tag order request 62 to a provider of encoded and encrypted tags 10 for use with products for verification thereof. Tag order request 62 may be submitted by the tenant user through tenant user interface module 260 on server 202. The tenant user may first access tenant user interface module 260 through a web client (web browser) running on tenant's local computing device 60, which may comprise a computer, laptop, or any other device functionally connected to the Internet and capable of accessing tenant user interface module 260. Alternatively, the tenant may access tenant user interface module 260 through mobile tenant device 68. In an embodiment, tenant user interface module 260 may comprise a web site running on server 202 and accessible via the Internet. Upon tenant accessing tenant user interface module 260, the tenant may login into tenant's account by means of a username and password or any other means known in the art for accessing a website or SaaS account on the Internet. If the tenant does not have an account at the time of seeking to submit tag order request 62, the tenant may create an account at that time.

Step 604. In embodiments, at Step 604, once the tenant user logs into its account, which is verified on backend tenant login/authentication module 270, tenant's tag order request 62 is submitted by tenant user interface module 260 to API module 220.

Step 606. In an embodiment, upon receiving tag order request 62, API module 220 saves tag order request 62 to database module 302. Tag order request 62 may comprise any number of features and elements desired by the tenant (see FIG. 9, discussed below). Continuing with Step 606, API module 220 transmits tag order request 62 to NFC encoding module 30, running on local device 40, for processing.

Step 608. In embodiments, at Step 608, upon receiving tag order request 62 from API module 220, NFC encoding module 30 sends a data structure request 85 to API module 220 for purposes of creating one or more sets of data associated with, concerning, directed to and/or connecting or linking unique individual tag 10 with unique individual product 8. In an embodiment, data structure request 85 may comprise a product identification (such as unique product ID 95 for each unique individual product 8), a tenant identification (such as a tenant name, identification number, account number, and/or any other indicia identifying the tenant), the total number of unique individual products 8 that the tenant desires to have respective, unique individual tags 10 encoded, the number of tags 10 sought to be encoded by tenant pursuant to tag order request 62 (based on the number of unique individual products 8 unless, in embodiments, tenant desires more than one tag 10 per product 8), and an identification of tag 10 type (for example, the 424 Tag, or any other commercially available and suitable NFC tag 10). In embodiments, data structure request 85 may include any other desired data and is not limited by the foregoing.

Step 610. In an embodiment, at Step 610, after receiving data structure request 85, API module 220 obtains tenant's encryption key ID 86 from database module 302 in order to obtain tenant's encryption key 99 for purposes of encrypting tag 10 after it has been encoded according to embodiments. In the embodiment of FIG. 1 and process 600 in FIGS. 6A-6D, tenant's encryption key 99 is stored and maintained by key management service (KMS) 342, an encryption key storage server. In the disclosed embodiment, tenant's encryption key 99 is not stored in database module 302; only tenant's encryption key ID 86 is stored in database module 302. However, those skilled in the art would appreciate that in embodiments, tenant's encryption key 99 may be stored in database module 302 or in any other suitable fashion to maintain the integrity of encryption key 99. In an embodiment, tenant's encryption key ID 86 (or in alternative embodiments, encryption key 99) may be stored in database module 302 in association with various data and data structures related to the tenant. Those skilled in the art would appreciate the various means and ways that databases, including, but not limited to, SQL databases, may be structured or configured to associate such data associated with a tenant and one or more tenant products 8, including, where appropriate, tenant's encryption key ID 86 and/or (if applicable) tenant's encryption key 99.

Step 612. In an embodiment, at Step 612, after obtaining tenant's encryption key ID 86, from database module 302, API module 220 sends encryption key request 87 to KMS 342 to obtain tenant's encryption key 99. In an embodiment, encryption key request 87 comprises tenant's encryption key ID 86 in order to obtain the encryption key 99 belonging to the tenant. In embodiments, encryption key request 87 may comprise additional tenant data necessary for obtaining tenant's encryption key 99 from KMS 342.

Step 614. At Step 614, in embodiments, upon receiving encryption key request 87, KMS 342 verifies whether tenant's encryption key 99 is valid (e.g., whether it may have expired, etc.). If tenant's encryption key 99 is expired or not valid for other acceptable reasons based on permissions, KMS 342 generates a new encryption key 99 for tenant. Upon securing tenant's encryption key 99, KMS 342 transmits encryption key 99, whether an existing, valid encryption key 99 or a newly generated encryption key 99, to API module 220.

Step 616. In embodiments, after obtaining tenant's encryption key 99, API module 220 generates a data structure 89 for tag 10 and saves it to database module 302. At Step 616, in an embodiment, a separate data structure 89 is generated by API module 220 for each unique individual tag 10 to be encoded. Data structure 89 is dynamic and may be modified as necessary by API module 220 and/or the SQL database in database module 302 based on specific data associated with tag 10 as may be required according to various steps and process requirements in embodiments of the invention. In an embodiment, in instances where multiple tags 10 are to be encoded, API module 220 may generate multiple, separate data structures 89, wherein each specific data structure 89 is uniquely associated for each individual tag 10 to be encoded.

Step 618. Continuing with process 600, in embodiments, at Step 618 database module 302 generates unique product ID 95 for each individual tag 10 and adds it to data structure 89 for the tag 10. In an embodiment, unique product ID 95 serves as the primary identifier linking unique individual product 8 with its respective, unique individual tag 10. In various drawings of the attached figures, unique product ID 95 may be referenced therein using a different term for purposes of implementing the illustrated embodiment. As is noted in the disclosure, regardless of how any such implementing embodiment may refer to unique product ID 95 (as illustrated in a drawing), it is to be understood that the referenced feature is intended to comprise unique product ID 95 as specifically discussed herein. Continuing, in embodiments, database module 302 may save unique product ID 95 to the database in association with one or more data comprising data structure 89. In an embodiment, in instances where multiple specific tags 10 are to be encoded each for a specific product 8, database module 302 generates multiple separate unique product IDs 95, a specific unique product ID 95 for each tag 10 to be encoded for the respective product 8.

Step 620. In embodiments, at Step 620, database module 302 transmits data structure 89 with unique product ID 95 for each tag 10 to be encoded to API module 220. In an embodiment, in instances where multiple tags 10 are to be encoded (with each unique individual tag 10 being encoded for each unique individual product 8), database module 302 transmits multiple separate unique data structures 89 (each with its own unique product ID 95) for each respective tag 10 to API module 220. The transmittal of more than one data structure 89 from database module 302 to API module 220 at Step 620, as with all process steps in all embodiments of the invention as presented in the flowcharts, may be performed serially or in parallel. While the various steps in the flowcharts are presented and described sequentially, one of ordinary skill would also appreciate that some or all of the steps may be executed in different order(s) and some or all of the steps may be executed in parallel. In addition, encoding and encrypting multiple NFC tags 10 according to a single operation or as may be directed by a user may be referred to as a "batch encoding," which is discussed further within the disclosure.

It is to be understood that data structure 89 may be comprised of any number of various discrete data items concerning unique individual product 8 and its corresponding unique individual tag 10. In embodiments, for example, various product identifying information or indicia may comprise data structure 89 concerning unique individual product 8. Examples may include, for example (and are not limited to), such identifying product indicia as universal product codes or UPC codes, bar codes, quick response or QR codes (or any other type of two-dimensional matrix barcode), electronic product or electronic product codes (EPC codes), GS1 DataMatrix codes, GS1 DataBars, ITF-14 codes, Code 128, RFID tag data and/or European Article Number or EAN codes. It is to be further understood that any suitable, appropriate and applicable metadata associated with any of the foregoing, unique individual product 8 and/or its corresponding unique individual tag 10, or the tenant may also comprise, in whole or in part, data structure 89. Various embodiments of the invention allow for numerous options and possibilities of data that may comprise a specific data structure 89 for a unique individual product 8. Importantly, data structure 89 is directly associated with its unique individual product 8 and provides a link to tag 10 to be used with product 8 after tag 10 undergoes encoding.

Step 622. At Step 622, in an embodiment, API module 220 sends a transaction request 83 to blockchain module 322 to record data structure 89 to blockchain module 322. In embodiments, a separate transaction request 83 is transmitted from API module 220 for each data structure 89 created for each unique individual product 8 and its respective unique individual tag 10. In alternative embodiments, transaction request 83 may comprise more than one data structure 89. In each case, each individual unique data structure 89 comprising transaction request 83 corresponds to a unique specific tag 10 and its unique individual and corresponding product 8. In embodiments, transaction request 83 may comprise a JSON-RPC request.

As used herein, the term 'blockchain module" 322 refers to any suitable blockchain or blockchain platform and/or any other suitable immutable ledger for recording transactions as is generally known in the art. In embodiments, API module 220 integrates and consolidates data and information from various sources and entities as more specifically provided in the disclosure. In some embodiments, at least some of the data and information from the various sources and entities may be stored or recorded on the blockchain. The blockchain may be maintained by a distributed network of nodes. In some embodiments, a consensus protocol may be used by the nodes to determine whether to allow transactions to be performed and groups the transactions into blocks that are added to the blockchain.

Generally, a blockchain is a distributed ledger with growing lists of records (i.e., "blocks") that are securely linked together via cryptographic hashes. Each block contains a cryptographic hash of the previous block, a timestamp, and transaction data (generally represented as a Merkle tree, where data nodes are represented by leaves). Since each block contains information about the previous block, they effectively form a "chain" with each additional block linking to the ones before it. Consequently, blockchain transactions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although blockchain records are not unalterable, since blockchain forks are possible, blockchains may be considered secure by design and exemplify a distributed computing system with high Byzantine fault tolerance.

There are different kinds of blockchains, such as permissionless and permissioned. In a permissionless blockchain, any entity may participate without an identity. In a permissioned blockchain, each entity that participates in the blockchain is identified and known. Examples of permissioned blockchains include Hyperledger Fabric, Hyperledger Sawtooth, IBM Blockchain Platform, and Quorum, while permissionless blockchains include public systems like Ethereum. Permissioned blockchains enforce strict identity verification, allowing participating nodes to view only the transactions appropriate to their access level. Programmable logic may be implemented as rules or smart contracts executed by the blockchain platform.

Permissioned blockchains such as Hyperledger Fabric, IBM Blockchain Platform, and Quorum provide a verifiable trace of proof that the content stored or recorded on the blockchain is associated with specific, unique individual tag 10 and its respective unique individual product 8. In embodiments, data such as data structure 89 which comprises unique product ID 95 (among other possible data, such as unique tag identifier 103) is recorded to blockchain module 322, creating a secure chain of record and providing verification of that information.

Hyperledger Fabric is a modular distributed ledger solution providing a permissioned blockchain infrastructure. A Hyperledger Fabric network comprises the following components:

(1) Peer nodes, which execute chaincode (Smart Contracts), access ledger data, endorse transactions, and interface with applications;

(2) Orderer nodes, which ensure the consistency of the blockchain and deliver the endorsed transactions to the peers of the network; and (3) Membership Service Providers (MSPs), generally implemented as Certificate Authorities managing X.509 certificates to authenticate member identities and roles.

Hyperledger Fabric supports configurable consensus and membership services, with Practical Byzantine Fault Tolerance (PBFT) being one of the most commonly used consensus algorithms. Its modular architecture allows for customization and flexibility in various enterprise use cases.

Hyperledger Sawtooth is another permissioned blockchain platform that may be used in embodiments. Sawtooth is optimized for non-cryptocurrency applications, providing features such as dynamic consensus mechanisms (e.g., Proof of Elapsed Time (PoET)) and support for smart contracts in multiple programming languages. Its scalability and efficiency make it suitable for supply chain and asset tracking applications.

IBM Blockchain Platform is an enterprise-grade implementation of Hyperledger Fabric. It offers advanced tools for building, operating, and governing blockchain networks, ensuring robust security and scalability. This platform is particularly well-suited for enterprises seeking seamless integration with existing systems.

Quorum, a permissioned variant of Ethereum, supports private transactions and enhanced data privacy. Quorum utilizes smart contracts to enable selective data sharing within a consortium, making it ideal for industries requiring confidentiality alongside blockchain transparency.

Ethereum, a permissionless blockchain, provides a decentralized platform for executing smart contracts using the Ethereum Virtual Machine (EVM). Smart contracts on Ethereum enable automated recording and verification of tag interactions, ensuring transparency and immutability on a public or hybrid ledger.

As used herein, the term "Hyperledger" may refer to Hyperledger Fabric specifically or more broadly to Hyperledger's suite of blockchain technologies, including Sawtooth. However, blockchain module 322 is not limited to Hyperledger and may implement other platforms such as Ethereum, IBM Blockchain Platform, or Quorum. These platforms are discussed for illustrative purposes, and embodiments of the invention are intended to comprise any suitable blockchain technology capable of fulfilling the described functions.

Continuing with Step 622, in an embodiment, transaction request 83 comprises a JSON-RPC request 83 (JavaScript Object Notation-Remote Procedure Call), a remote procedure call (RPC) protocol encoded in JSON. It is similar to the XML-RPC protocol, defining only a few data types and commands. JSON-RPC allows for notifications (data sent to the server that does not require a response) and for multiple calls to be sent to the server which may be answered asynchronously. JSON-RPC works by sending a request to a server implementing this protocol. The client (in an embodiment, API Module 220) is typically software intending to call a single method of a remote system. Multiple input parameters can be passed to the remote method as an array or object, whereas the method itself can return multiple output data as well.

Hereinafter, the term "transaction request 83" may be referred to as "JSON-RPC request 83". It is to be understood that the JSON-RPC request protocol/format is an embodiment of transaction request 83 and that the use of the term "JSON-RPC request 83" does not limit the term "transaction request 83" specifically to the JSON-RPC request format and protocol. Other remote procedure calls, such as, for example, the XML-RPC protocol, may be suitable. Those skilled in the art would appreciate any suitable remote procedure call protocols and formats for embodiments of the invention. As such, while an embodiment of the invention as illustrated in Step 622 et seq. comprises JSON-RPC request

83, it should be understood that any applicable remote procedure call request may be implemented for carrying out the step. Those skilled in the art would appreciate any such suitable requests, methods and protocols.

Step 624. At Step 624, in an embodiment, upon receiving transaction request 83, blockchain module 322 records data structure 89 in an initial unique blockchain transaction and generates an initial unique blockchain transaction ID 97, i.e., a block hash, for data structure 89. Specifically, blockchain module 322 initiates the recording of data structure 89 by generating a unique blockchain transaction ID (hash) 97. This transaction is then broadcast to the blockchain network, where it undergoes validation through the consensus mechanism employed by the network. Depending on the architecture of the blockchain module, validation may involve mechanisms such as endorsement policies, proof of elapsed time, or other consensus protocols.

Once the initial blockchain transaction is initiated, an asynchronous listener service—a dedicated process external to the blockchain network—monitors the transaction's status within blockchain module 322. Upon successful validation and commitment to the ledger, the listener service receives a notification confirming the transaction. At this point, in embodiments, the listener service relays the verified initial blockchain transaction ID 97 and associated data from data structure 89 to database module 302 via API module 220, ensuring the database accurately reflects the state recorded on the blockchain. This architecture ensures secure, immutable record-keeping while allowing external systems to persistently store verified data without compromising blockchain integrity.

As used herein, the term "initial unique blockchain transaction" or "initial blockchain transaction" refers to the first transaction recorded on blockchain module 322 wherein data structure 89 is recorded in the initial block. Similarly, the term "initial unique blockchain transaction" or "initial blockchain transaction" with respect to ID 97 refers to the first block hash (i.e., blockchain transaction ID 97) generated for the initial unique blockchain transaction. With reference to the figures, in embodiments, an initial blockchain transaction ID may be referred to as 97-01. In accordance with blockchain functionality, there is only one initial unique blockchain transaction and one initial blockchain transaction ID 97-01 for unique individual product 8 and its associated unique individual tag 10.

Figure 18:
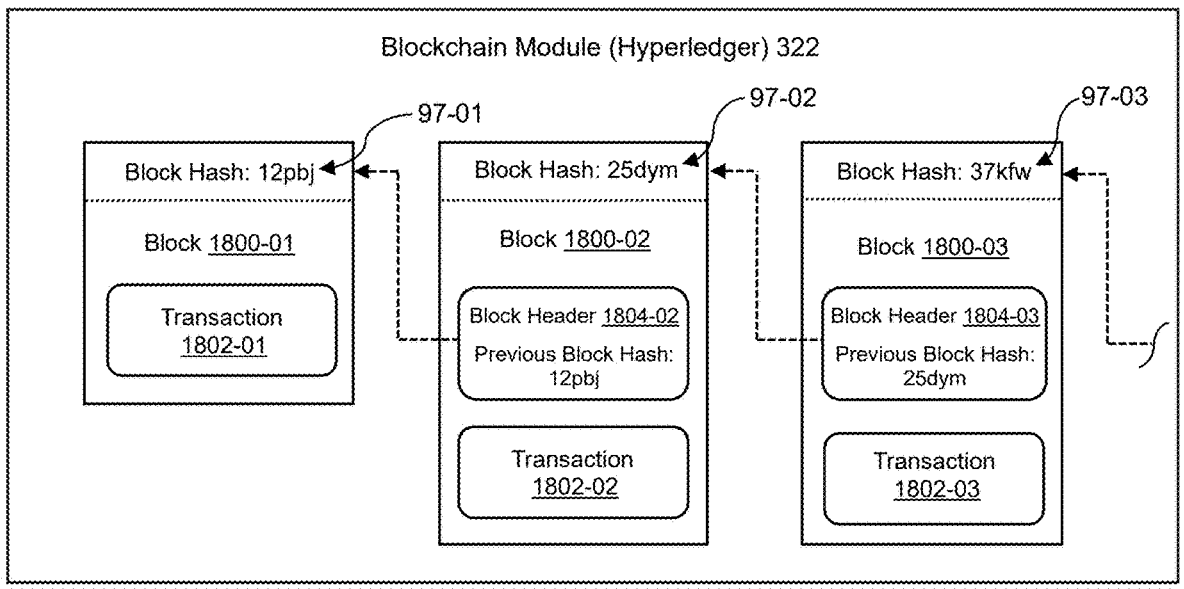
FIG. 18 depicts sample blocks of a blockchain recording an initial encoding transaction and subsequent tap interaction transactions.
Figure 19:
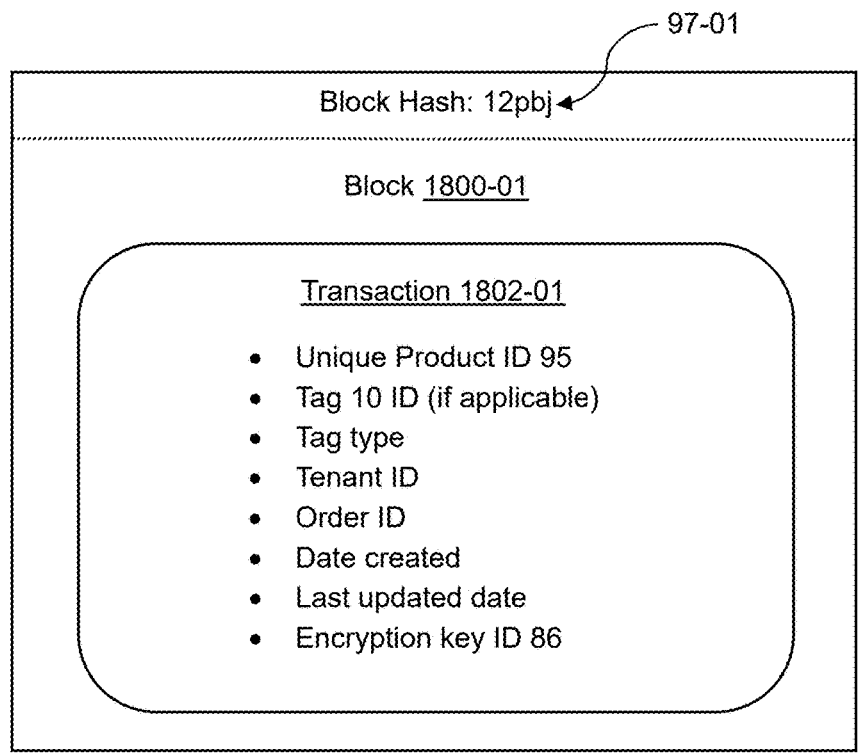
FIG. 19 depicts a sample block of a blockchain wherein an initial encoding transaction is recorded in the first block.

Reference is now made to FIGS. 18 and 19.

FIG. 18 shows an example of blockchain module 322, in accordance with various embodiments. Blockchain module 322 may be implemented using various permissioned or permissionless blockchain platforms, such as Hyperledger Fabric, Hyperledger Sawtooth, IBM Blockchain Platform, Quorum, or Ethereum. In this example, blockchain module 322 comprises three blocks: 1800-01, 1800-02, and 1800-03. Each block is cryptographically linked to the previous block, except block 1800-01, which serves as the initial block in the chain and is not linked to any previous block. Each block 1800 includes a unique blockchain transaction ID (block hash) 97 for that block, determined using a suitable hash function. For example, block 1800-01 has block hash 97-01 "12pbj," block 1800-02 has block hash 97-02 "25dym," and block 1800-03 has block hash 97-03 "37kfw."

The blocks are cryptographically linked together by including a block header with the block hash (unique blockchain transaction ID 97) of the previous block. For example, block 1800-02 includes block header 1804-02, which includes the previous block hash 97-01 from block 1800-01 with the value "12pbj." Continuing with FIG. 18, block 1800-03 includes block header 1804-03, which includes the previous block hash 97-02 from block 1800-02 with a value "25dym." The examples of block hashes in FIGS. 18 and 19 are provided for illustrative purposes.

Transaction Structure. In embodiments, each block 1800 may include one or more transactions 1802. For example, block 1800-01 comprises a single transaction 1802-01; block 1800-02 comprises a single transaction 1802-02; and block 1800-03 comprises a single transaction 1802-03. In some embodiments, blocks 1800 may store multiple transactions 1802. The scope of the invention is not limited to a single transaction per block. Transactions 1802 may be grouped and added to a block 1800 upon satisfying the consensus requirements of the blockchain module 322. These requirements may vary depending on the underlying blockchain platform. For example:

Hyperledger Fabric uses endorsement policies and practical Byzantine Fault Tolerance (PBFT) for consensus.

Hyperledger Sawtooth employs proof of elapsed time (PoET) for scalable and energy-efficient transaction validation.

IBM Blockchain Platform leverages a customized implementation of Hyperledger Fabric for enterprise-grade blockchain services.

Quorum implements private transactions with support for enterprise-focused consensus mechanisms.

Ethereum, though permissionless by default, may be configured as a private or consortium blockchain, using proof-of-stake or proof-of-work for transaction validation.

Cryptographic Linking and Validation. As shown in FIG. 18, blocks 1800 are cryptographically linked through their headers. Each transaction 1802 undergoes validation before being committed to the ledger. For example, a transaction may be verified by peer nodes in a Hyperledger Fabric network or through validator nodes in a Sawtooth network. Once validated, the transaction is added to the chain, ensuring an immutable record of all interactions associated with the unique individual tag 10 and its respective unique individual product 8.

Continuing with FIG. 18, in embodiments, each block 1800 includes one transaction (1802). For example, block 1800-01 comprises singe transaction 1802-01; block 1800-02 comprises single transaction 1802-02; and block 1800-03 comprises single transaction 1802-03. In embodiments, however, blocks 1800 may comprise multiple transactions 1802 and the scope of the invention is not limited to a single transaction per block. In some embodiments, blocks 1800 storing multiple transactions 1802 may be added to blockchain module 322 after it is determined that the one or more rules and/or consensus between nodes of the Hyperledger Fabric are satisfied. In embodiments, transactions 1802 in a given transaction request 83 may be grouped and added as a block 1800 to blockchain module 322, or different transactions 1802 from different requests 83 may be grouped and added as a block 1800.

Continuing with FIG. 18, in embodiments, transaction 1802-01 is an initial unique blockchain transaction and block 1800-01 is an initial block, the first block comprising the chain. The blockchain transaction ID 97 for that transaction, "12pbj", is an initial unique blockchain transaction ID and designated 97-01. In the initial unique blockchain transaction of FIG. 18, data structure 89 is recorded in the initial block, as discussed below with regard to FIG. 19. In FIG. 18, subsequent unique blockchain transactions 1802-02 and 1802-03, and their respective unique subsequent blockchain transaction IDs 97-02 and 97-03 (respectively, "25dym" and "37kfw") are discussed further within the disclosure. For simplicity, subsequent unique blockchain transactions 1802-02 and 1802-03 are referred to herein simply as "subsequent blockchain transactions" in view of and in relation to the initial unique blockchain transaction of FIG. 18.

Referring to FIG. 19, in an embodiment, an example of initial transaction 1802-01 is illustrated in greater detail. Initial transaction 1802-01 of FIG. 19 is viewed with respect to Step 624, wherein, in an embodiment, upon receiving transaction request 83, blockchain module 322 records data structure 89 and generates initial unique blockchain transaction ID 97-01, i.e., a block hash, for the initial transaction recording data structure 89. In the embodiment of FIG. 19, initial blockchain transaction 1802-01 comprises the recordation of data structure 89 in block 1800-01 for unique individual tag 10 for unique individual product 8. In an embodiment, as illustrated in FIG. 19, data structure 89 recorded in transaction 1802-01 may comprise one or more of the following data: unique product ID 95, unique tag identifier 101, (if applicable), tag type (e.g., the 424 Tag), tenant ID, order ID, date created, last updated date, and/or tenant's encryption key ID 86. In embodiments, multiple tag structures 89, each for a specific unique individual tag 10 for unique individual product 8 may be recorded in transaction 1802-01 based on one or more transaction requests 83. In the example of FIG. 19, initial blockchain transaction ID 97-01 for transaction 1802-01 is "12pbj". In addition, in the example of FIG. 19, block 1800-01 does not comprise a block header, as transaction 1802-01 is an initial transaction for tag 10 and represents the first recording of data (data structure 89) associated with unique individual tag 10 and unique individual product 8.

As noted above, data structure 89—the subject of an initial blockchain transaction of embodiments as illustrated in FIG. 19—is specifically not limited to the example data structure 89 illustrated therein. In embodiments, for example, various product identifying information or indicia may comprise data structure 89 concerning unique individual product 8 and/or unique individual tag 10 for product 8. Examples may include, for example (and are not limited to), such identifying product indicia as universal product codes or UPC codes, bar codes, quick response or QR codes (or any other type of two-dimensional matrix barcode), electronic product or EPC codes, GS1 DataMatrix codes, GS1 DataBars, ITF-14 codes, Code 128, RFID tag data and/or European Article Number or EAN codes. It is to be further understood that any suitable, appropriate and applicable metadata associated with any of the foregoing, unique individual product 8 and/or its corresponding unique individual tag 10, or the tenant may also comprise, in whole or in part, data structure 89 to be recording in initial blockchain transaction 1802-01. The are numerous options and possibilities of data that may comprise a specific data structure 89 for a unique individual product 8. Any of the foregoing examples of product-based data or metadata may comprise data structure 89, the recording thereof in blockchain module 322 comprising initial blockchain transaction 1802-01 in initial block 1800-01.

Step 626. In accordance with the above, in an embodiment, at Step 626 (and with reference to FIGS. 18 and 19) blockchain module 322 transmits unique initial blockchain transaction ID 97-01 for initial blockchain transaction 1802-01 recording data structure 89 to API module 220. Recording of data structure 89 in initial blockchain transaction 1802-01 in blockchain module 322, and the generation and transmittal of unique initial blockchain transaction ID 97-01 to API module 220, results from and is in response to transaction request 83 made by API module 220 at Step 622.

Step 628. In an embodiment, at Step 628, API module 220 receives unique initial blockchain transaction ID 97-01 from blockchain module 322 (generated by blockchain module 322 for recording data structure 89) and records initial blockchain transaction ID 97-01 to database module 302. In embodiments, initial blockchain transaction ID 97-01 saved to database module 302 is associated with data structure 89 generated for and recorded on blockchain module 322 at Step 624 for unique individual tag 10 and unique individual product 8 and any other data comprising database module 302 concerning tag 10 and product 8.

Step 630. As Step 630, in embodiments, API module 220 transmits unique product ID 95 (for tag 10 and product 8) and encryption key ID 86 to encoding module 30 for use in the encoding and encrypting of tag 10 for use with unique individual product 8. In some embodiments, API module 220 may obtain tenant's encryption key 99 in similar fashion to that disclosed at Steps 610-616 and transmit encryption key 99 to encoding module 30 with unique product ID 95 (for tag 10 and product 8). In yet other embodiments, at Step 630, API module 220 may further transmit data structure 89 in the same form or with the same data items or parameters, in whole or in part, as recorded on blockchain module 322 at Step 624 (initial blockchain transaction 1802-01) or an alternative data structure 89 concerning product 8 for encoding on tag 10 or for saving to encoding device 40 running encoding module 30. In embodiments, other data associated with product 8, as discussed herein, may be transmitted by API module 220 to encoding module for encoding on tag 10 or for saving to encoding device 40 running encoding module 30.

Step 632. In embodiments, at Step 632, using tenant's encryption key ID 86, encoding module 30 sends encryption key request 97 to KMS 342 to obtain tenant's encryption key 99. In embodiments, Step 632 may be performed in substantial or similar fashion to that disclosed at Steps 610-616.

Step 634. At Step 634, in an embodiment, upon obtaining tenant's encryption key 99, encoding module 30 initializes communication with tag 10 through functionally connected PCD encoding device 20. This may be referred to as "powering up" tag 10 by the functionally connected PCD encoding device 20. In alternative embodiments, the encoding steps of encoding process 600, including the powering up of tag 10, may be carried about by one or more alternative PCD devices, such as, for example, PCD reading device 14 (e.g., a cell phone). This step initiates the encoding process of tag 10 for use with unique individual product 8. The protocols for communicating and encoding tag 10 are established according to industry and tag manufacturer specifications as previously disclosed.

Step 636. In an embodiment, and if required, at Step 636 encoding module 30 modifies configuration settings of tag 10 to allow for encoding and encryption of tag 10.

Step 638. In embodiments, at Step 638, encoding module 30 reads tag data 101 of tag 10, as previously defined. Tag data 101 may include, for example, a unique tag identifier 103, an interaction counter data 105, and/or a tamper status data 109. Depending on the specific tag type, such as NXP 424 DNA, EM4425, or Edge TruST25, tag data 101 may also include cryptographic elements or metadata relevant to the tag's configuration, such as message authentication codes (MACs), one-time passwords (OTPs), or digital signatures. These components are essential for generating and verifying tap-unique URLs 93.

Step 640. In embodiments, at Step 640, using tenant-specific encryption key 99 retrieved securely from KMS 342, encoding module 30 encrypts tag data 101 of tag 10. Upon encrypting tag data 101, encoding module 30 generates a tap-unique URL 93 that incorporates encrypted tag data 101 and one or more cryptographic outputs 107 based on the tag type. Examples of cryptographic outputs include:

Message Authentication Codes (MACs): Used for tags such as NXP 424 DNA to ensure data integrity and authenticity during transmission.

One-Time Passwords (OTPs): Session-specific tokens used for interaction-level security in tags such as EM4425.

Digital Signatures: Cryptographic signatures generated using on-chip ECDSA for Edge TruST25 tags, ensuring compatibility with blockchain-backed systems.

Additionally, tag data 101 may include elements such as interaction counter 105 and tamper status 109, depending on the tag type and configuration. For instance, upon powering up tag 10 at Step 634, a random unique identifier may be generated to replace the existing tag identifier 103. In addition, in embodiments, interaction counter data 105 may increment by one with each tap, ensuring a sequential interaction record.

Step 642. In embodiments, at Step 642, encoding module 30 encodes tag 10 with initial tap-unique URL 93. The URL includes encrypted or plain tag data 101, one or more cryptographic outputs 107, and a unique product identifier 95. Additionally, the URL includes a host website portion operating on host web server 230 to direct web client 16 operating on a proximity coupling device (PCD) 14 for interaction verification and authentication, as further detailed in process 700.

Example Tap-Unique URLs. By way of example, tap-unique URL 93 encoded on tag 10 may take the following forms.

MAC Example (NXP 424 DNA)

https://securetap.io/authenticate/tag_MAdxxoGkIdgrrrjwmCYnxBpqqEKBqp37azFouZLBG?picc=063792A3AC712E6C7DA789D98BF9CA43&cmac=BEB842FD38CBD9B8

Wherein, "picc" comprises encrypted tag data 101 including the unique identifier and interaction counter, and "cmac" comprises cryptographic output 107, i.e., the message authentication code (MAC) ensuring data authenticity and preventing replay attacks.

OTP Example (EM4425)

https://securetap.io/authenticate/tag_MAdxxoGkIdgrrrjwmCYnxBpqqEKBqp37azFouZLBG?uid=AAAAAAAAAAA&token=AAAA&f=A&sig=AAAAAAAAAAAAAAAAAAAAAAA Wherein, "uid" comprises a unique identifier 103 for the tag, "token" comprises a one-time password providing session-specific security, and "sig" comprises cryptographic output 107.

Digital Signature Example (Edge TruST25)

https://securetap.io/authenticate/tag_MAdxxoGkIdgrrrjwmCYnxBpqqEKBqp37azFouZLBG?uid=063792A3AC712E6C7DA789D98BF9CA43&counter=56789&tamper=T&sig=ABCDEFGHIJKLMNopqrstuvwxyz012345

Wherein, "uid" comprises a unique identifier for the tag 103, "counter" comprises interaction counter 105, incremented to ensure sequential validation, "tamper" comprises a tamper status flag 109 indicating physical compromise (T for tampered), and "sig" comprises cryptographic output 107, i.e., an ECDSA digital signature for compatibility with blockchain-based systems.

Tap-Unique URL Regeneration. In embodiments, tap-unique URL 93 is unique to each tap or powering up of tag 10 and is based on NFC standards and protocols. Each tap or powering up of tag 10 by a PCD device, whether a PCD encoding device 20 or PCD reading device 14, results in the generation of a new tap-unique URL 93 prior to being read by PCD reading device 14. For example:

For tags with a random unique identifier feature enabled, a new unique tag identifier 103 is generated for each interaction.

For tags using an interaction counter, tap counter data 105 increments with each tap, ensuring sequential integrity.

By dynamically updating tag data 101 and incorporating it into tap-unique URL 93—whether encrypted or plain—a secure, unique URL is generated for every interaction.

It is to be understood that when referring to tap-unique URL 93 in embodiments of the invention at various steps in the systems, methods and processes disclosed, tap-unique URL 93 is a dynamic feature or element and may comprise different data and elements at various times. Tap-unique URL 93, therefore, should be construed and considered in the context of which it is being utilized or discussed. For example, "initial tap-unique URL" 93 (as that term is used herein) is the tap-unique URL that is generated at encoding steps of embodiment process 600. It comprises the first—and, hence, initial—tap-unique URL 93 encoded on unique individual tag 10 during the encoding process and readies tag 10 to be affixed to its corresponding, respective unique individual product 8. Afterwards, all subsequent tap-unique URLs 93 (discussed with reference to embodiments of process 700) are referred to collectively as "subsequent tap-unique URLs" unless noted otherwise.

Step 644. In embodiments, at Step 644, encoding module 30 encodes tag 10 with encryption key 99, thereby providing tag 10 with the ability to generate encrypted tag data 101 upon each tap interaction for a tap-unique URL 93.

This concludes the encoding steps of embodiment process 600.

Figure 4:
FIG. 4 is a perspective view of an encoded NFC tag affixed to a product.

After encoding and encrypting tag 10, as demonstrated in process embodiment 600, tag 10 may be affixed to unique individual product 8 for which it was created. FIG. 4 depicts tag 10 affixed to product 8, a pair of brand sneakers. More specifically, tag 10 is affixed to the box of product 8 (sneakers). In embodiments, tag 10 may be affixed to the product or packaging for the product. In embodiments, tag 10 may be manufactured within or otherwise directly inserted within or into, or directly affixed upon, product 8. For example, with respect to brand sneakers, tag 10 may be inserted or internally affixed to a tongue, side or sole of a shoe. With respect to clothing, tag 10 may be affixed directly upon the clothing or otherwise embedded in a suitable location. Precise placement of tag 10 on product 8 is only limited by the limits or range of NFC technology; otherwise, tag 10 may be placed anywhere on or within product 8.

Figure 5:
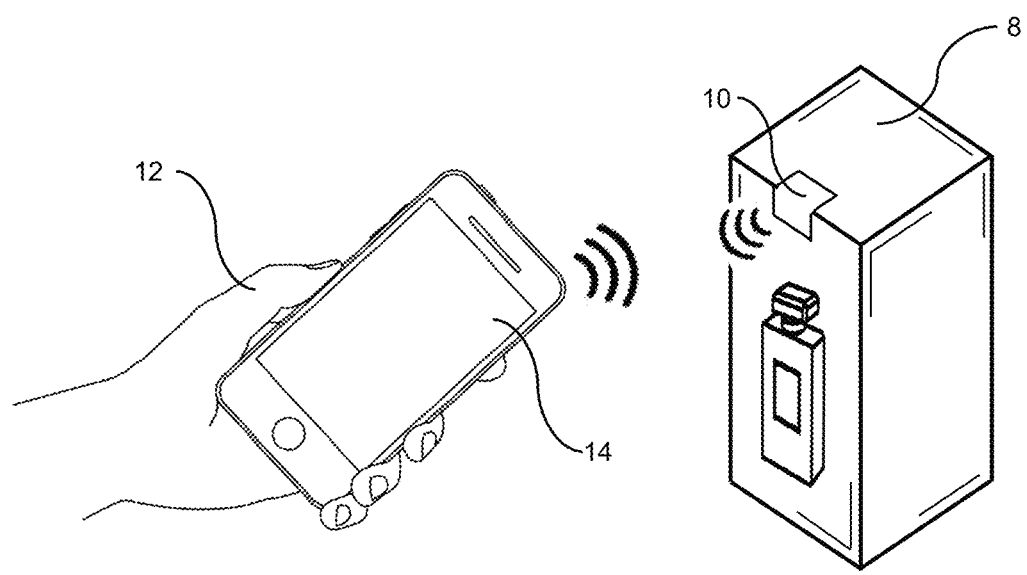
FIG. 5 is a perspective view of an end user interacting with an encoded NFC tag affixed to a product by tapping a PCD reading device, in this case a cell or smart phone, to the encoded NFC tag.

FIG. 5 depicts tag 10 affixed to product 8, brand perfume. In FIG. 5, tag 10 is affixed over a product packaging seam to serve as monitoring device or seal against tampering. Should the box or packaging of product 8 be opened or otherwise tampered with (e.g., attempting to remove or peel away tag 10 from the box or packaging of product 8)—thereby breaking the tamper protection feature of tag 10—monitoring wires in the tag are broken and the tampering event will be recorded according to the tamper feature of tag 10 and reflected in tag tamper status data 109. When tag 10 is powered up and read by PCD reading device 14 (e.g., a cell phone as depicted in FIG. 5), tag tamper status data 109 will be read and processed as explained in greater detail, below. In embodiments, tag tamper status data 109 will read that tag 10 has been tampered with, thereby drawing into question the authenticity or integrity of product 8.

Continuing with FIG. 5, a perspective view is presented of a consumer end user 12 interacting with encoded NFC tag 10 affixed to the packaging of product 8 by tapping PCD reading device 14 (e.g., a cell phone) close enough to encoded NFC tag 10 to initiate NFC communications with tag 10 in accordance with NFC protocols. Tapping PCD cell phone 14 to encoded tag 10 establishes communication between PCD reading device 14 and encoded NFC tag 10 and verification of product 8 according to embodiments of the invention is initiated.

Figure 7A:
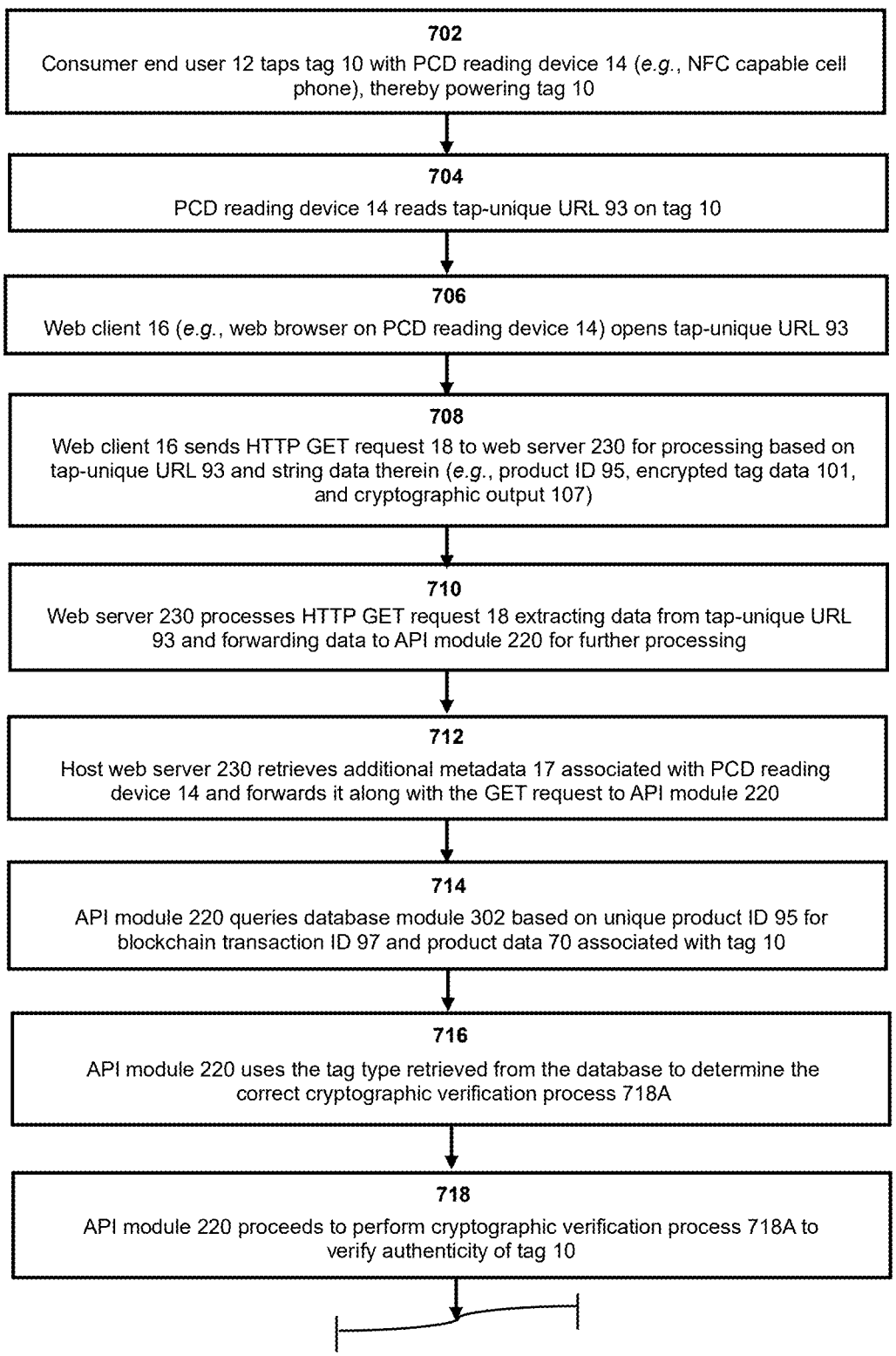
FIGS. 7A-7C depict process 700, a tap interaction/verification embodiment portion of the invention, including cryptographic verification process 718A.
Figure 7B:
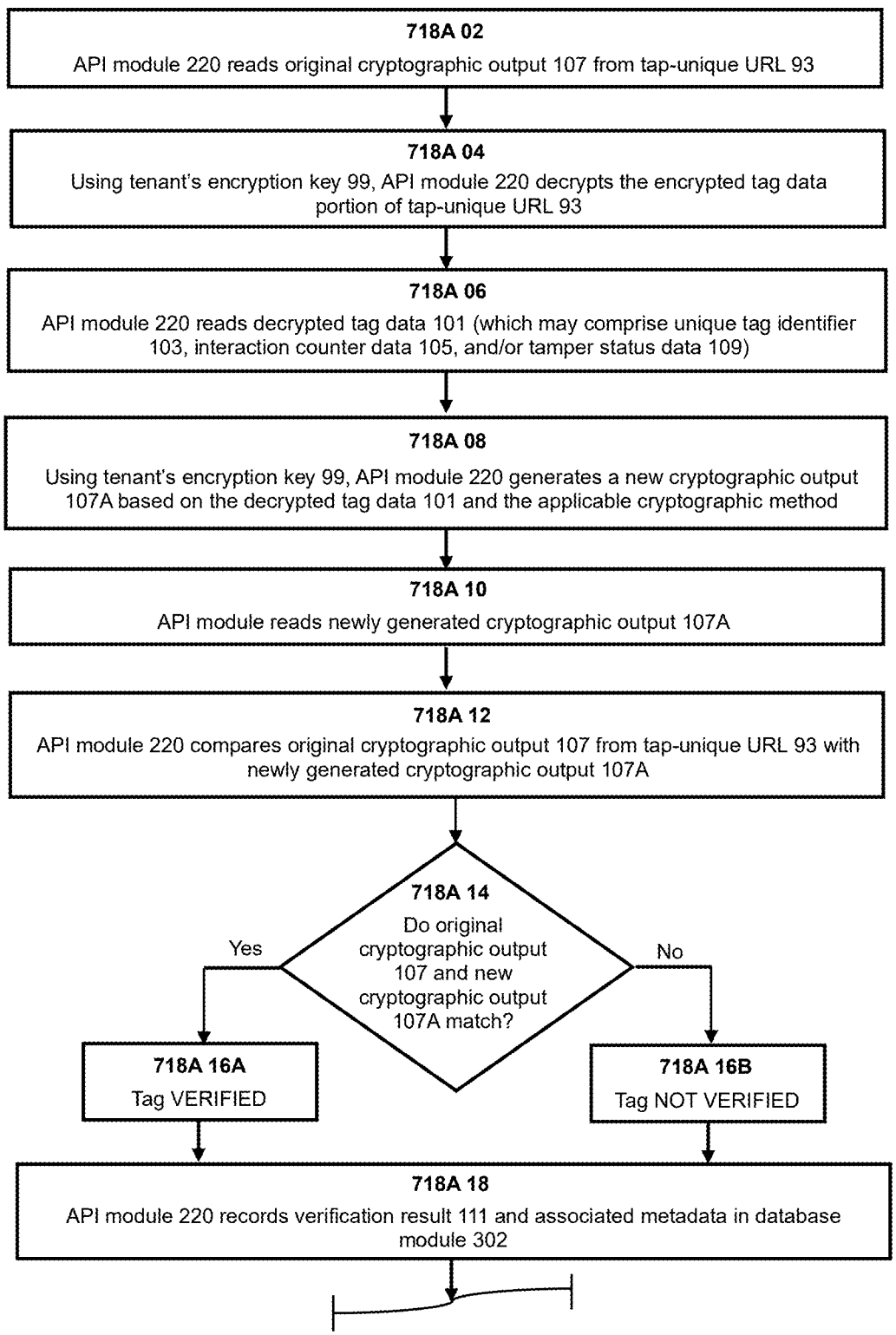
Figure 7C:
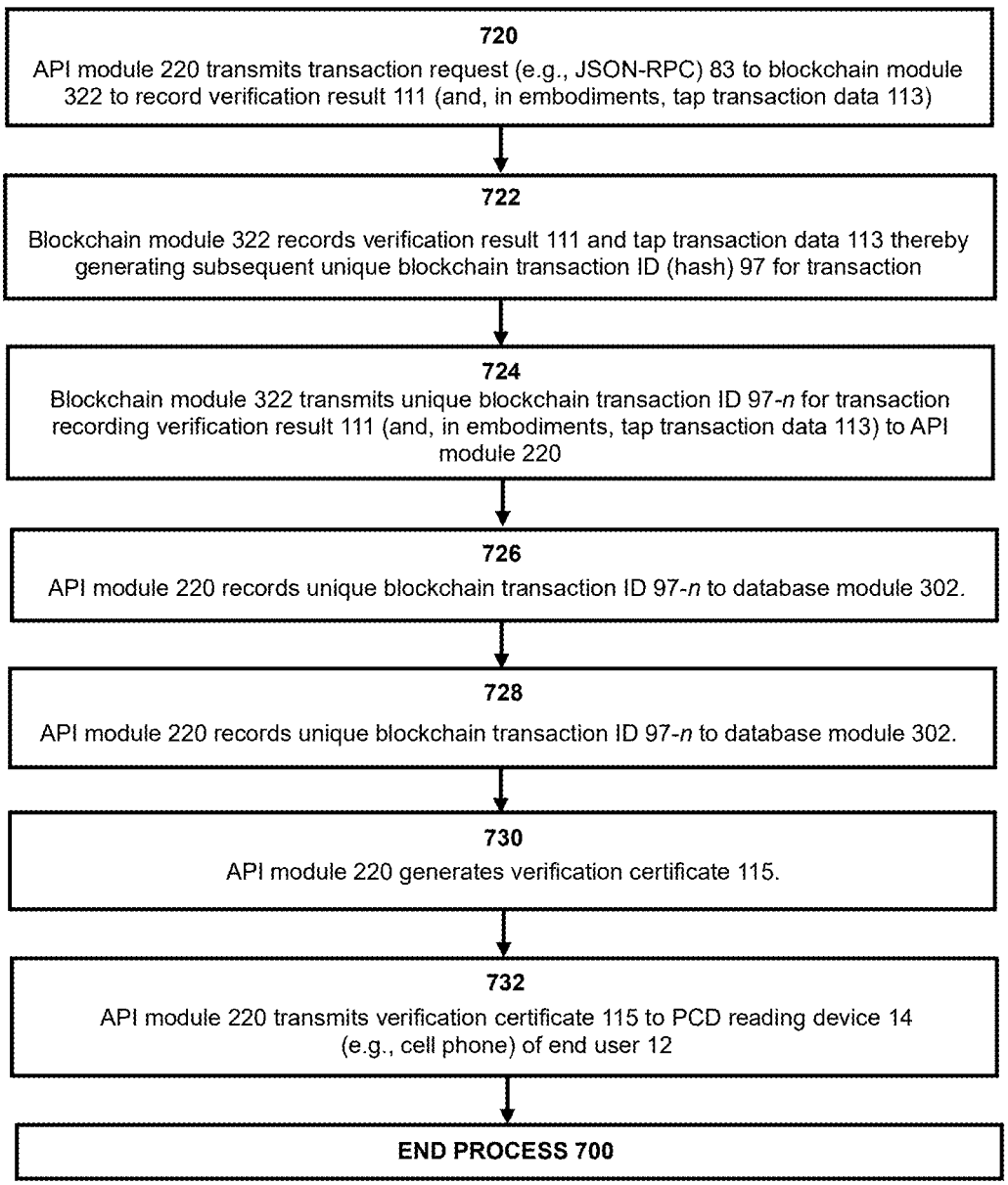

FIGS. 7A-7C depict process 700, a tap/verification embodiment portion of the invention.

Step 702. In embodiments, at Step 702, consumer end user 12 taps encoded tag 10 with an NFC-capable PCD reading device 14, such as a smartphone, in accordance with initialization and communication protocols and standards previously discussed. In embodiments, any suitable PCD reading device may perform the steps of process 700. Consumer end user 12 may include, for example, a certifying body, governmental agency, manufacturer, distributor, or other party seeking to verify the authenticity, tamper status, or metadata of product 8.

Step 704. At Step 704, in an embodiment, PCD reading device 14 powers tag 10 and reads tap-unique URL 93 encoded on tag 10. Upon powering tag 10, in embodiments, and as previously discussed with respect to process 600, tag 10 generates a new tap-unique URL 93 specific to the powering up of the tag and the unique individual tap interaction. This regeneration ensures the URL is unique for each interaction, i.e., tap-unique URL 93 is specific to the powering up of tag 10 by the unique individual tap interaction (hereinafter, each unique individual tap interaction simply referred to as the "tap interaction").

Step 706. At Step 706, in embodiments, upon reading tap-unique URL 93, a web client 16 (e.g., a web browser) operating on PCD reading device 14 opens tap-unique URL 93. In some cases, web client 16 may prompt the end user 12 for authorization before proceeding. Upon authorization (e.g., tapping a confirmation button), web client 16 opens tap-unique URL 93 and is directed to the web host portion embedded within the URL in accordance with known protocols.

Step 708. At Step 708, in embodiments, opening tap-unique URL 93 triggers web client 16 operating on PCD reading device 14 to send an HTTP GET request 18 to API module 220. This request includes all data embedded in the URL, such as unique product ID 95, encrypted tag data 101, and cryptographic output 107 (e.g., MAC, OTP, or digital signature). In embodiments, examples of tap-unique URLs 93 based on different cryptographic outputs and verification processes, may comprise the following:

NXP 424 DNA URL Example (MAC):

```
https://securetap.io/authenticate/tag_MAdxxoGkIdgrrrjwmCYnxBpqq
EKBqp37azFouZLBG?picc=063792A3AC712E6C7DA789D98BF9CA43&
   cmac=BEB842FD38CBD9B8
```

EM4425 URL Example (OTP):

```
https://securetap.io/authenticate/tag_MAdxxoGkIdgrrrjwm
CYnxBpqqEKBqp37azFouZLBG?uid=AAAAAAAAAAA&
token=AAAA&f=A&sig=AAAAAAAAAAAAAAAAAAAAAA
```

Edge TruST25 URL Example (Digital Signature):

```
https://securetap.io/authenticate/tag_MAdxxoGkIdgrrrjwmCYnxBpqqEKBqp37
   azFouZLBG?uid=063792A3AC712E6C7DA789D98BF9CA43&
   counter=56789&tamper=T&sig=ABCDEFGHIJKLMNopqrstuvwxyz012345
```

Step 710. At Step 710, in embodiments, host web server 230 processes the GET request, extracting data from tap-unique URL 93, such as, for example, unique product ID 95, encrypted tag data 101, and cryptographic output 107. This data is forwarded to API module 220 for further processing and verification. This step, as with all steps of the various process embodiments disclosed herein, need not necessarily be performed immediately after Step 708. For example, without departing from the spirit and scope of the invention, in an embodiment, Step 710 may be performed after Step 712 or simultaneously therewith. Those skilled in the art will readily appreciate this.

Step 712. In embodiments, host web server 230 retrieves additional metadata 17 associated with PCD reading device 14 (e.g., geolocation, device IP, or timestamp) and forwards it along with the GET request to API module 220.

Step 714. At Step 714, in embodiments, API module 220 queries database module 302 using unique product ID 95 to retrieve stored data associated with unique individual tag 10 and its corresponding unique individual product 8. Such data may include, for example, and not by way of limitation: tag type (e.g., NXP 424 DNA, EM4425, Edge TruST25), cryptographic configuration (e.g., MAC, OTP, or digital signature), associated unique blockchain transaction IDs 97 for prior interactions (e.g., initial unique blockchain transaction ID 97-01, subsequent unique blockchain transaction ID 97-n (see below)).

In this regard, blockchain transaction ID 97 would comprise blockchain transaction ID 97 of the immediately preceding blockchain transaction 1802. Referring to FIG. 18, for example, if tap-unique URL 93 is generated as a result of the first tap transaction following encoding of tag 10 in accordance with process 600, blockchain transaction ID 97 as per Step 714 would comprise initial blockchain transaction ID 97-01 for initial blockchain transaction 1802-01, as discussed above in reference to FIGS. 18 and 19. Continuing with reference to FIGS. 18 and 19, if tap-unique URL 93 is generated as a result of a second tap transaction following encoding of tag 10 in accordance with process 600, blockchain transaction ID 97 as per Step 714 would comprise subsequent blockchain transaction ID 97-02 for subsequent blockchain transaction 1802-02. The process continues to repeat in the same fashion, with each transaction 1802 of a block 1800 being cryptographically linked to a previous block other than block 1800-01 which serves as an initial block in the chain and is not linked to any previous block (as no block exists). Upon each tap transaction of PCD device 14, blockchain module 302 continues to grow with the addition of a new subsequent transaction 1802-n as recorded in a newly added block 1800-n to the chain and the generation of a new subsequent blockchain transaction ID 97-n (where n is an integer representing the next numeric value (number) of the transaction, block and blockchain ID).

Step 716. At Step 716, API module 220 uses the tag type retrieved from the database to determine the correct cryptographic verification process 718A. For instance, in embodiments, for tags configured with MACs, the stored encryption key 99 is retrieved for validation in cryptographic verification process 718A. In embodiments, for tags configured with OTPs, the stored token is matched against the one-time password in the URL in cryptographic verification process 718A. Alternatively, in an embodiment, for tags using digital signatures, the corresponding public key is retrieved for signature validation in the cryptographic verification process 718A.

In embodiments, and as may be necessary (e.g., for tags 10 configured with MACs using tenant's encryption key 99), API module 220 sends an encryption key request 87 (with tenant encryption key ID 86) to KMS 342 to obtain tenant's encryption key 99 to perform tag 10 cryptographic verification process 718A. In embodiments, API module 220 may obtain tenant's encryption key 99 from database module 302. In embodiments, API module 220 may obtain encryption key 99 from other suitable and appropriate sources, for example, from encoding module 30. Encryption key 99 may further be stored within API module 220 according to known methods and processes by those of skill in the art.

FIG. 7B illustrates an embodiment of cryptographic verification process 718A. Cryptographic verification process 718A is intended to comprise tags 10 configured with MACs, as well as tags 10 configured with OTPs and digital signatures. When required, in embodiments, tenant's stored encryption key 99 is retrieved for validation in cryptographic verification process 718A. To be clear, cryptographic verification process 718A illustrated in FIG. 7B is an embodiment of the process, and the invention is not limited to any specific tag type or cryptographic output.

Step 718A-02. At Step 718A-02, in embodiments, API module 220 reads the cryptographic output (e.g., MAC, OTP, or digital signature) from tap-unique URL 93.

Step 718A-04. In embodiments, at Step 718A-04, using tenant-specific encryption key 99, API module 220 decrypts the encrypted tag data portion of tap-unique URL 93. For example, in an embodiment, for tags configured with MACs, the decryption verifies the MAC tied to tag data 101. In embodiments, for tags configured with OTPs, the decryption confirms the session-specific token's validity. In embodiments, for tags configured with digital signatures, the decryption validates the signature against the public key.

Step 718A-06. In an embodiment, at Step 718A-06, after decryption, in embodiments, API module 220 reads the decrypted tag data 101, including, where applicable, unique tag ID 103, interaction counter data 105, and tamper status data 109.

Step 718A-08. In embodiments, at Step 718A-08, API module 220 generates a new cryptographic output 107A based on the decrypted tag data 101 and the applicable cryptographic method. For example, in embodiments, for tags configured with MACs, API module 220 generates a new MAC using the updated tag data and tenant-specific encryption key 99 to ensure the integrity of the interaction. In embodiments, for tags configured with OTPs, API module 220 validates the session-specific token from the decrypted tag data 101 against the expected OTP and issues a new OTP for future interactions. In embodiments, for digital signature-based tags, API module 220 validates the decrypted digital signature using the public key associated with the tag to ensure the authenticity of the tag data 101.

Step 718A-10 to 718A-12. In embodiments, at Steps 718A-10 to 718A-12, API module 220 verifies original cryptographic output 107 from tap-unique URL 93 against newly computed cryptographic output 107A by comparing the original output 107 with the newly computed cryptographic output 107A. If output 107A matches original output 107, the verification is successful, confirming that unique individual tag 10 is authentic, and its data is untampered. If the outputs do not match, API module 220 determines that tag 10 may have been tampered with or is otherwise invalid.

Steps 718A-14 to 718A-16. In embodiments, at Steps 718A-14 through 718A-16, API module 220 generates verification result 111. If the cryptographic outputs match, API module 220 verifies that tag 10 is authentic. If the cryptographic outputs do not match, unique individual tag 10 may be deemed invalid, tampered with, or compromised.

Step 718A-18. In an embodiment, at Step 718A-18, API module 220 records verification result 111 and associated metadata 17 in database module 302 for future reference. This data is associated with or linked to unique individual tag 10 and its respective unique individual product 8 for comprehensive traceability.

In embodiments, at Step 718A-18, in addition to recording tag verification result 111 to database module 302, API module 220 may further record to database module 302 various other tap interaction data 113, such as, tag tamper status data 109, cryptographic output data 107, various metadata 17 associated with PCD reading device 14 and web client 16 operating on PCD reading device 14. In embodiments, such additional data transmitted by API module 220 to database module 302 would be associated with unique individual tag 10 and may be used to generate one or more updated data structures 89 from database module 302. Collectively, all such data associated with a unique tap transaction, including data generated in the verification process, may be collectively referred to as tap-interaction data 113. It is understood that that tap-interaction data 113 may be modified, added to, deleted from, processed, recorded, stored, and the like and may comprise different data or sets of data (with respect to a unique tap transaction) at different steps in embodiments.

Step 720. In an embodiment, at Step 720 API module 220 transmits verification result 111 to blockchain module 322 to record the transaction. In an embodiment, for example, a JSON RPC request or other similar remote procedure call request as previously discussed is transmitted to blockchain module 322 to record tap-interaction data 113. In embodiments an additional one or more tap-interaction data 113 is also transmitted by API module 220 to blockchain module 302 for recording in connection with the unique tap transaction.

Step 722. In embodiments, at Step 722, blockchain module 322 records verification result 111 thereby generating subsequent unique blockchain transaction ID (hash) 97 for the transaction. In an embodiment, tap-interaction data 113 may also be recorded in the same transaction. Recording of verification result 111 and, in embodiments, tap-interaction data 113, to blockchain module 322 is performed in the same or substantially similar fashion as that previously presented with respect to recording data structure 89 at Step 624 (in that case, an initial transaction 1802-01). With regard to the process disclosed at Step 624, and with reference to FIGS. 18 and 19 (as previously discussed), recording verification result 111 and, in embodiments, tap-interaction data 113, on blockchain module 322 would comprise a subsequent transaction 1802-n recorded in a newly added block 1800-n to the chain, thereby generating a new subsequent blockchain transaction ID 97-n and updating the blockchain ledger.

Step 724. In embodiments, at Step 724, blockchain module 322 transmits unique blockchain transaction ID 97-n for recording verification result 111 (and, in embodiments, a one or more tap-interaction data 113) to API module 220. Transmittal of blockchain transaction ID 97-n for subsequent transaction 1802-n is in response to transaction request 83 transmitted by API module 220 at Step 720.

Step 726. In an embodiment, at Step 726, API module 220 receives unique blockchain transaction ID 97-n from blockchain module 322.

Step 728. At Step 728, in embodiments, API module 220 updates database module 302 with unique blockchain transaction ID 97-n and verification details. This ensures an immutable and verifiable record of all tag interactions. In embodiments, at Step 726, API module 220 records unique blockchain transaction ID 97 for recording verification result 111 (and, in embodiments, tap-interaction data 113) to database module 302. As with all data transmitted by API module 220 to database module 302 with respect to unique individual tag 10 and unique individual product 8, all subsequent unique blockchain transaction IDs 97 may be stored, saved and incorporated into database module 320 in connection or association with unique individual tag 10 and its unique individual product 8. Importantly, in embodiments, each time unique individual tag 10 is tapped or read by PCD reading device 14, the steps of process 700 are initiated and repeated, with specific verification result 111 and tap-interaction data 113 arising or generated from each individual tap transaction recorded to blockchain module 322. In addition, a unique subsequent blockchain transaction ID 97-n is generated for each tap transaction, thereby creating an immutable record of every tag tap transaction and its associated tap-interaction data 113.

Step 730. At Step 730, in an embodiment, API module 220 may generate a verification certificate 115. Verification certificate 115 may comprise data including, but not limited to verification result 111, unique blockchain transaction ID 97-n, cryptographic details (e.g., MAC, OTP, or digital signature), and various metadata 17 associated with PCD reading device 14, unique individual tag 10, unique individual product 8, and/or the unique tap interaction. Additional tap-interaction data 113 may further comprise interaction counter data 105 and tag tamper status data 109.

Verification certificate 115 may take various forms. For example, verification certificate may comprise a digital graphic file (e.g., jpeg, png, etc.), a PDF file, a hyperlink linked to a web page using HTML or other suitable format. The objective of verification certificate 115 is to provide an end user 12, tenant, or a certificate issuing authority, such as a governmental agency seeking to verify the authenticity of goods or products, with visually readable evidentiary indicia as to the authentication of the good or product. In embodiments, verification certificate 115 may be downloaded and/or otherwise saved to PCD reading device 14, emailed from a web client 16 interface operating on PCD reading device 14, transmitted via text (e.g., SMS communication) or saved, communicated and transmitted in any number of ways for use with digital files that are generally known among cell phone users and those skilled in the art.

Step 732. Continuing, in embodiments, after generating verification certificate 115, API module 220 transmits verification certificate 115 to PCD reading device (e.g., cell phone) 14 of end user 12, thereby providing end user 12 verification regarding unique individual tag 10 and unique individual product 8 to which tag 10 is affixed. In all cases, end user 12 is to be construed as any individual or party seeking to verify the authenticity of product 8 for any reason whatsoever.

FIGS. 6-7 (processes 600 and 700, respectively, and inclusive of cryptographic verification process 718A) illustrate flowcharts of various methods and processes for functionality associated with portions of embodiments of the invention based on the schematic of FIG. 1. While the various steps in the flowcharts are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 6-7 should not be construed as limiting the scope of the invention. This is particularly so as the schematic of FIG. 1 may be amended and modified numerous ways without departing from the scope of the invention. The schematic of FIG. 1 and the processes and methods of FIGS. 6-7 are illustrative of embodiments and comprise various features and elements that may not be necessary to carry out the claimed invention.

Figure 8:
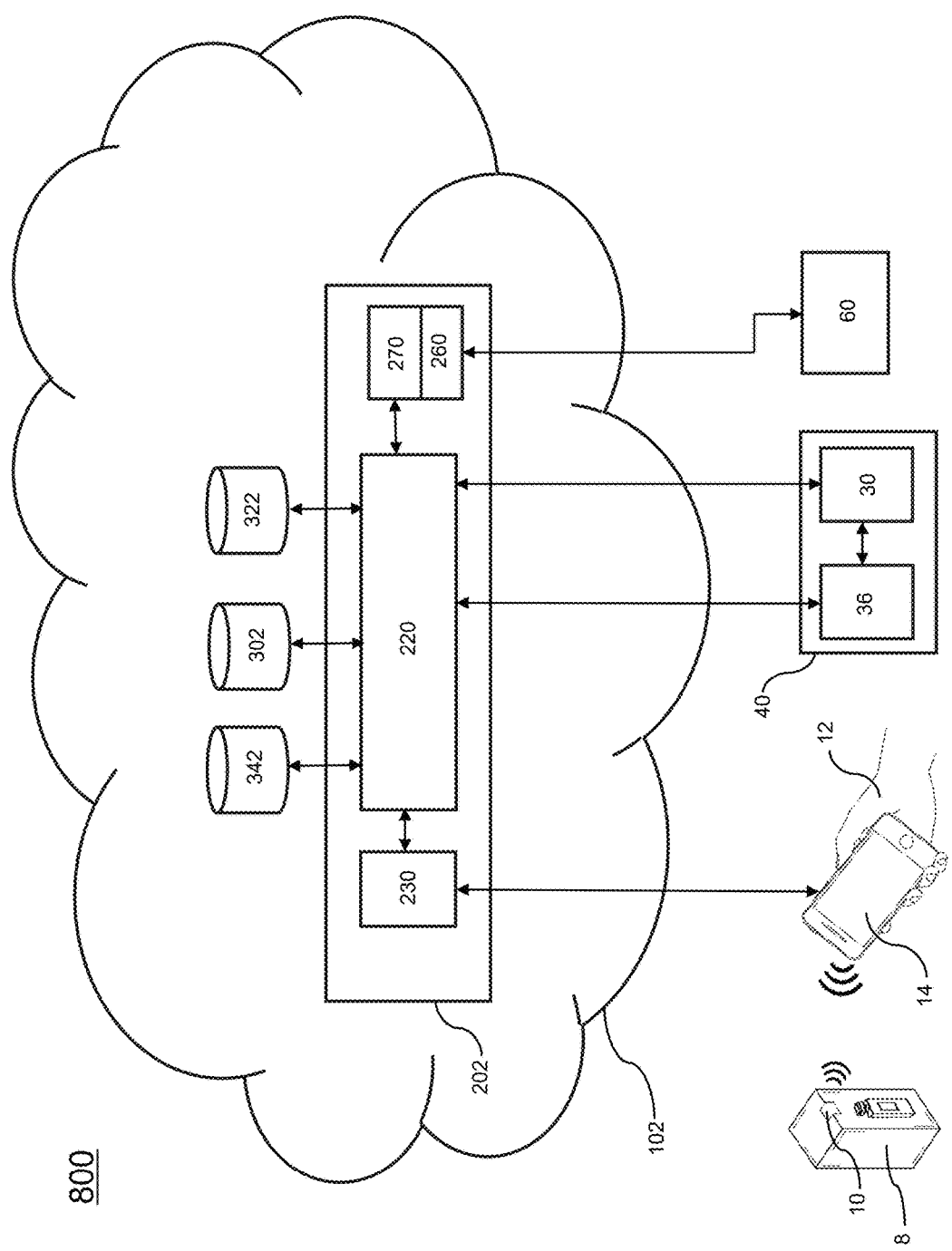
FIG. 8 is a schematic of a basic tap interaction/verification configuration 800 of a portion of an embodiment of the invention.

FIG. 8 is a schematic of a tap/verification configuration 800 of a portion of an embodiment of the invention depicting the various component parts and steps utilized in process 700 and the interconnectivity of those components, elements and steps. FIG. 8 is to be viewed with the discussion of process 700. To avoid repetition, the steps comprising process 700 will not be repeated.

In an embodiment, with reference to FIG. 8, local encoding device 40 comprises encoding module 30 operating thereon as well as tracking module 36 also operating thereon. As discussed further within, tap-interaction data 113 generated with each tap and collected, compiled or organized by API module 220 may be transmitted by API module 220 to one or more devices functionally connected to API module 220 and capable of receiving tap-interaction data 113 for use, analysis or processing. In embodiments, tap-interaction data 113 may be transmitted to tracking module 36, in this case, operating on the same device 40 as encoding module 30. In embodiments, API module 220 may transmit tap-interaction data 113 to local tenant device 60 where a tenant may view that data. Tap-interaction data 113 may comprise valuable information concerning a tap transaction, such as, for example (in addition to tag verification result 111), the geographic location of the tap transaction, the precise date and time of the transaction, various metadata 17 associated with PCD reading device 14, web client 16 operating thereon, and/or of user 12, and other logistic and marketing-based information that may be of value to the tenant. Such other forms of data will be apparent in view of further discussion of the drawings.

FIG. 20 is an example of tap-interaction data 113 compiled for use and storage to database module 302. In the example of FIG. 20, tap-interaction data 113 comprises unique tag identifier 103, unique product ID 95, date of creation of tag 10, date of tap transaction, the IP address of PCD reading device 14, various metadata 17 collected from web client 16 operating on PCD reading device 14, tag verification result 111, tag tamper status data 109, and latitude and longitude of the tap interaction. The above list is not exhaustive and is intended to present examples of data comprising tap-interaction data 113 and should not be construed as limiting the scope of the invention. (For clarity, various software code terms as demonstrated in FIG. 20 may not be identical to the terminology used herein. For example, the software code term "tag_id" is not to be construed as tag UID 103 as used in this disclosure; rather, that software code term may equate with the term "unique product ID 95" as used herein.)

FIG. 21 (to be viewed with FIGS. 18 and 19) depicts an example of subsequent blockchain transaction 1802-02 for tap-interaction data 113 in accordance with various embodiments. Transaction 1802-02 is recorded in subsequent block 1800-02 and tap-interaction data 113 is recorded in block 1800-02. In the example of FIG. 21, tap-interaction data 113, as recorded in block 1800-02 for transaction 1802-02, comprises the following data features or elements: id (a unique identifier for each tap interaction); tag_id (links to the related tag in the tags table); date_created (timestamp when the tap interaction was created); last_updated (timestamp of the most recent update (defaults to the current time); ip_address (IP address from which the interaction originated); metadata (additional request metadata in json format (optional), such as device type, web browser, etc.); is_verified (indicates whether the tap interaction for tag has been verified); is_tampered (indicates whether the tag has been tampered with); latitude & longitude (geographical coordinates (optional)). In the example of FIG. 21, a unique identifier for each tap transaction may be generated by API module 220 upon reading of each tap-unique URL 93 resulting from its corresponding tap interaction (hereinafter, the "tap-unique ID" 91). It is to be understood that in embodiments, tap-unique ID 91 may comprise tap-unique data 113. The above is not exhaustive of examples comprising tap-interaction data 113 that may be recorded to blockchain module 320 for a tap interaction and should not be construed as limiting the scope of the invention.

Figure 9:
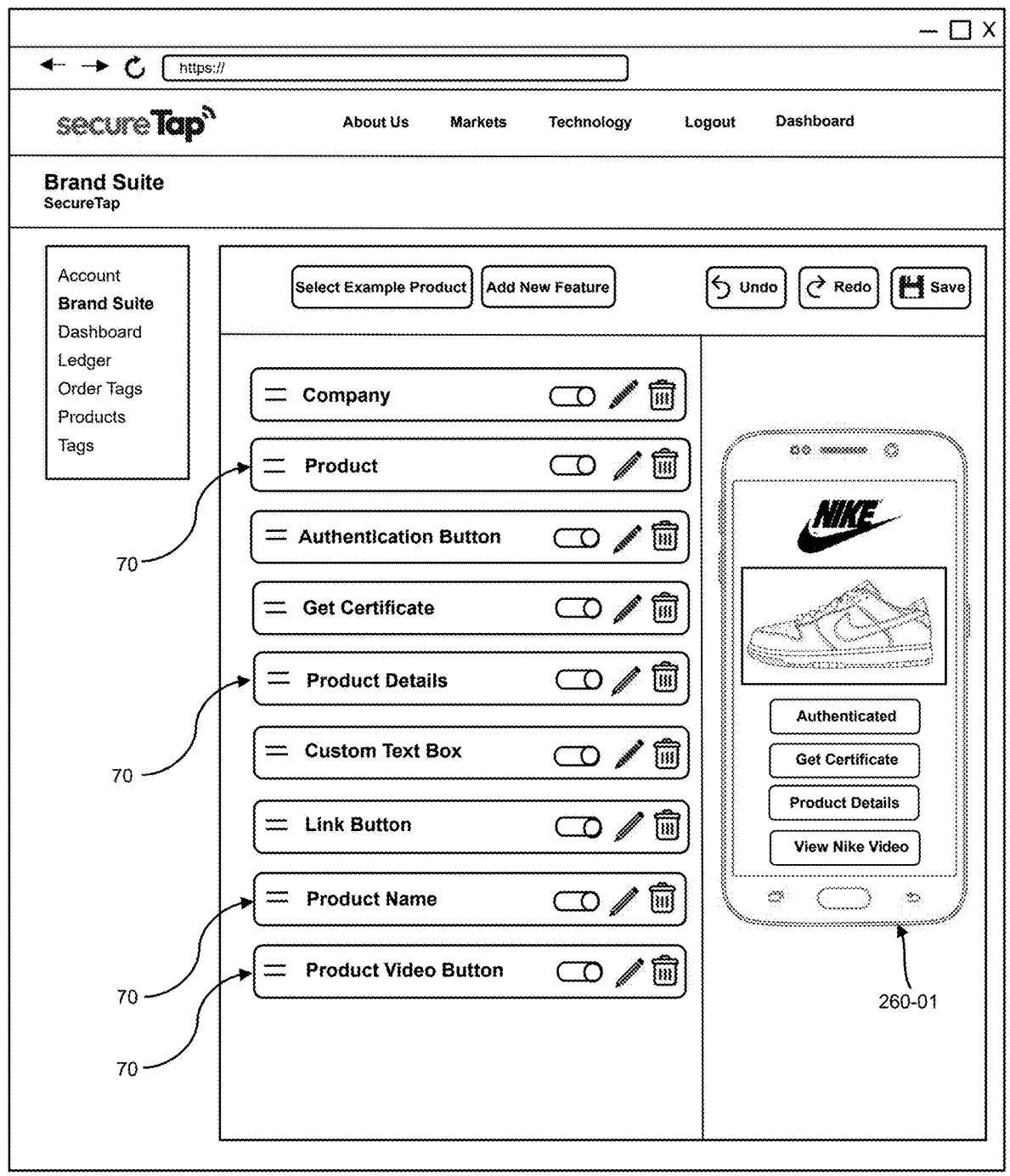
FIG. 9 depicts a sample tenant user interface of an embodiment of the invention wherein a tenant may request or order one or more encoded NFC tags for one or more products.

FIG. 9 depicts a sample tenant user interface of an embodiment of the invention wherein a tenant may request one or more unique individual encoded tags 10 for one or more unique individual products 8. In an embodiment, referring to Step 602 of process 600, a tenant user may submit a tag order request 62 through tenant interface module 260 for at least one unique individual tag 10 (for authentication or other purposes, such as, for example, obtaining product information) for at least one unique individual product 8. The tenant interface module 260 of FIG. 9 is feature packed and provides the tenant with numerous options to customize various product data 70 to be made available to end user 12 upon tapping unique individual tag 10 associated with unique individual product 8. In an embodiment, tenant interface module 260 may provide a projected view 260-01 of a tag tap for a brand shoe product that may be viewed by end user 12 when tapping respective unique individual tag 10 for that product. In the embodiment illustrated, projected tap review 260-01 allows the tenant to preview and customize an interface view of a tag verification result 111 that may be generated by API module 220 and read by end user 12 on end user's PCD reading device 14. While not specifically discussed in the steps comprising process 700, it is understood that upon completion of the verification Steps 718A 14 through 718A 18, API module 220 may generate and return to PCD reading device 14 (through for example, web host server 230) a tag verification result interface or display using HTML or any suitable format or protocol (a "verification display 92"). It is understood that that the transmittal of verification display 92 for viewing by end user 12 on PCD reading device 14 may apply to all embodiments of the invention. Note that verification display 92 is not the same as verification certificate 115, discussed below. Verification display 92 provides end user 12 with immediate access to and viewing of verification result 111. It is to be further understood that that generation and transmittal of verification display 92 may take place in embodiments at any time subsequent to Step 718A 16, when API module 220 verifies unique individual tag 10 and generates tag verification result 111.

Continuing with FIG. 9, the illustrated interface allows tenant user to configure a consumer tap interface, which, in embodiments, may generate a verification display 92 and/or a corresponding verification certificate 115. In embodiments, customizable product verification display options (based on various product data 70) available to a tenant for use with an end user 12 for use in verification display 92 and/or verification certificate 115 may include: company information, product image and identification, authentication request button, obtain certification button (for example, to download the certificate to the user's cell phone), product details, link to company's website for product, product video, or any other relevant information that a tenant may desire end user 12 to view when tapping tag 10 affixed to product 8.

FIG. 10 depicts a sample page or tab of a website embodiment of tenant user interface module 260 wherein a tenant may review one or more products 8 to which encoded tags 10 have been affixed and further depicting various end user 12 tap-interaction data 113 for each such unique individual tag 10 and its respective unique individual product 8. As depicted in FIG. 10, an embodiment of tenant user interface module 260 allows the tenant to view discrete, unique individual products 8 that have unique individual encoded tags 10 affixed thereto for monitoring by tenant: Glamour Glasses, serial no. 15A (15 total taps) (260-02); Hi Flier Court Shoes, serial no. HF-100AA white (82 total taps) (260-03); Jump Phone X 5+, serial no. JZP-X-2024 5+ (7 total taps) (260-03); Jump Pro Notebook 7, serial no. JPN-2024-7 (765 total taps) (260-04); and Canal No. 9 perfume, serial no. Ca_05/1355 (12 total taps) (260-05). Each of the example products 8 are specific, individual items to which a unique tag 10 has been affixed. Data displayed in the embodiment of interface module 260 may comprise, in whole or in part, tap-interaction data 113 for each tag 10/product 8 combination, the substance of which may be recorded, in whole or in part, to blockchain module 322 in embodiments as described earlier herein. Unique blockchain transaction IDs 97 may also be displayed in the interface embodiment of FIG. 10, along with any other data concerning each blockchain transaction 1802 and one or more data structures 89 associated with each unique individual tag 10 and its associated unique individual product 8. It is to be understood that that the webpage or tab of the embodiment of interface module 260 is not limited to the data depicted therein. This understanding applies to all of FIGS. 9-16. In embodiments, through the interfaces depicted in FIGS. 9-16, the tenant may access tap-interaction data 113, product data 70, data structures 89, tag-based data, and any other data comprising database module 302 and blockchain module 322, in whole or in part, with respect to unique individual tag 10 and its respective unique individual product 8 and tap-interactions associated therewith.

Figure 11:
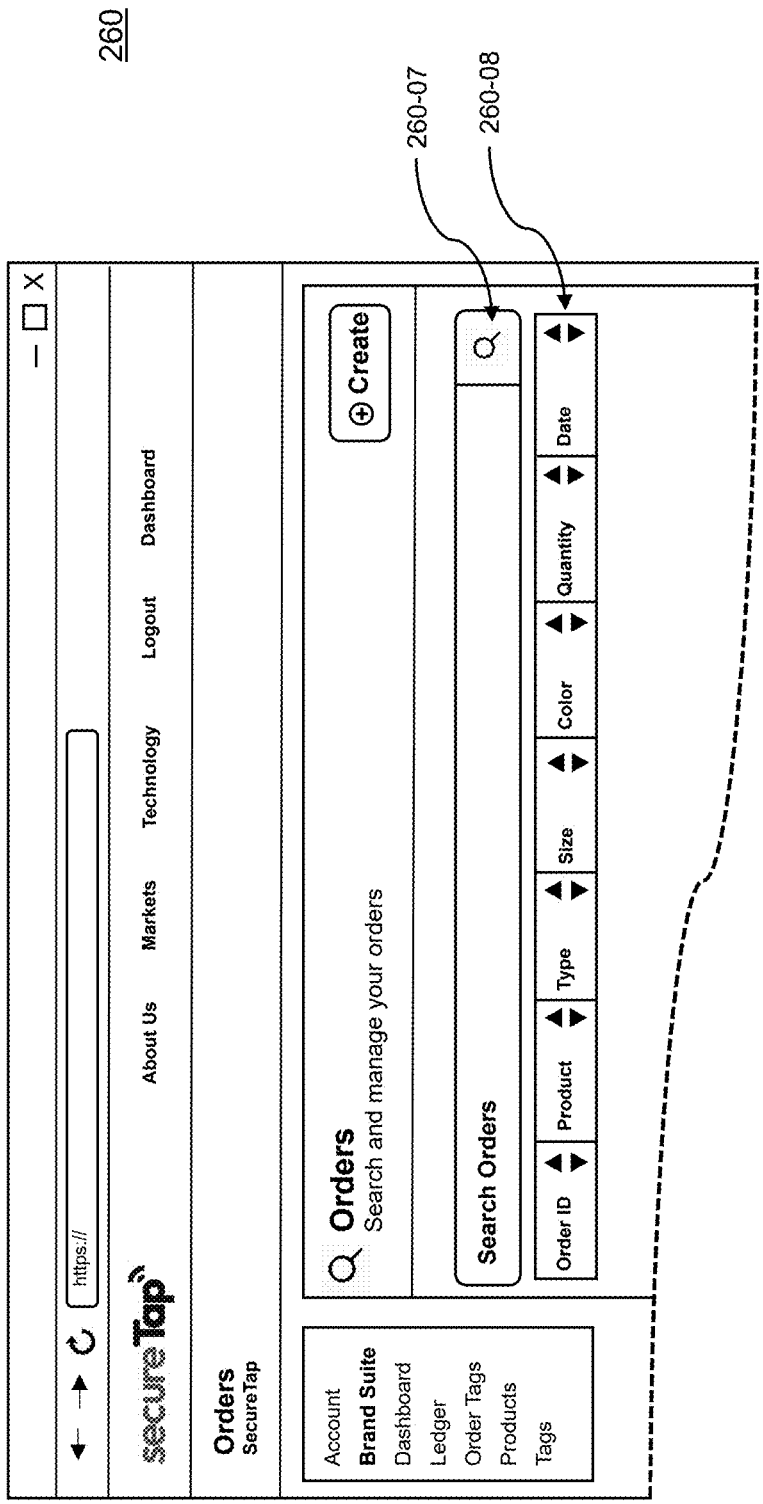
FIG. 11 depicts a sample tenant user interface of an embodiment of the invention wherein a tenant may search for one or more tag encoding requests for one or more products.

FIG. 11 depicts a sample page or tab of a website embodiment of tenant user interface module 260 wherein a tenant may search for one or more tags order requests 62 for one or more tags 10 to be used for one or more products 8 according to embodiments of the invention and discussed previously in the disclosure. In the interface embodiment of FIG. 11, a tenant user may perform a free form text search for one or more tag order requests 62 by entering various data associated with the one or more orders into search box 260-07. Such data may comprise any data associated with an order, for example and not by way of limitation, tag order request 62 number or other identifier of a particular tag order request 62, a product identifier (e.g., universal product codes or UPC codes, bar codes, product serial number, quick response or QR codes (or any other type of two-dimensional matrix barcode), electronic product or EPC codes, GS1 DataMatrix codes, GS1 DataBars, ITF-14 codes, Code 128, RFID tag data and/or European Article Number or EAN codes, or any such other product identifier that may be used by a tenant with respect to product 8), product name, or any other product data that a tenant may use with respect to product 8. In addition, in embodiments of the interface 260 of FIG. 11, one or more drop-down buttons or menus 260-08 may be implemented for use by the tenant to review data associated with the drop-down menu name or variable. In the interface embodiment of FIG. 11, depicted are drop-down menus 260-08 for the parameters: order ID, product name, tag (or product) type, tag (or product) size, tag (or product) color, number of tags (or products) and date of the order. In embodiments, drop-down menus 260-08 of interface 260 may be customized by the tenant to include numerous related parameters that may be used in association with tag order requests 62 and tags 10 and products 8 associated therewith.

FIG. 12 depicts a sample page or tab of a website embodiment of tenant user interface module 260 wherein a tenant may create a tag order request 62 for one or more unique individual tags 10 to be encoded for one or more unique individual products 8. In the interface embodiment of FIG. 12, a tenant user may select product 8 from a previous tag order request 62 as illustrated at 260-09. In embodiments, interface 260 may directly interface with a catalog of one or more products 8 previously defined by the tenant and submitted to API module 220 through interface module 260 or as may be defined and catalogued by tenant on local tenant device 40. In embodiments, selection of product 8 may be performed by entering text in box 260-09 or selecting from a drop-down menu. Continuing with FIG. 12, in embodiments, tenant may select tag 10 shape via drop-down menu 260-10 and tag size via drop-down menu 260-11. The available shapes and sizes of tags 10 may vary according to tag manufacturer. In an embodiment, the tenant may enter the exact number of tags 10 to be encoded depending on the number of products 8 for a batch encoding in box 260-12. In embodiments of tag order request 62 interface 260, the tenant may upload one or more graphic designs to be printed on the tags 10 via the graphic design upload box 260-13. File types that may be uploaded may include any type of graphic or image file commonly used for such purposes (e.g., jpeg, jpg, png, pdf, etc.). In embodiments, the graphic design may be printed prior or subsequent to the tag encoding process as illustrated in an embodiment at 600. In an embodiment of tag order request 62 interface 260, an "additional notes or instructions" box 260-14 may be included wherein the tenant may provide additional notes or instructions concerning tag order request 62. Finally, in an embodiment, when satisfied that all data fields of tag order request 62 interface 260 are accurate, tenant may submit the tag order request by clicking or executing the "place order" button or function 260-15. Upon clicking or executing place order button 260-15, tenant's tag order request 62 is submitted to the creator or manufacturer of tags 10 for tenant's products 8.

As previously discussed, embodiments of the invention need not necessarily require that the tenant of products 8 and the manufacturer of tags 10 be separate and distinct entities. It is to be understood that the tenant and the creator or manufacturer of the tags may be the same entity or party. A large brand producer of products, for example, may desire to create its own tags. In such cases, the brand producer may implement the various functions, features and elements of interface 260 directly to the encoding process without using any third party and without need for tag order request 62 to that party. Those of skill in the art would appreciate that embodiments of the invention may be implemented in numerous ways and that specific embodiments disclosed herein may be deviated from without departing from the scope of the invention. This is just one example.

FIG. 13 depicts a sample page or tab of a website embodiment of tenant user interface module 260 depicting an order confirmation generated by the interface in response to a tag order request 62 submitted by a tenant, for example, with respect to the embodiment of FIG. 12. A tag order confirmation may be in response to tag order request 62 for one or more unique individual tags 10 for use with one or more unique individual products 8. In the interface 260 embodiment of FIG. 13, the order confirmation depicts various information concerning tag order 62 for viewing by the tenant. In embodiments, for example, tag order confirmation of interface web page may comprise or include: a tag order number (tor_kuOjHSlyXGYlgCdXh) (in embodiments, generated, for example, by API module 220) 260-16; order date (Sep. 6, 2024) 260-17; product name (Shades of Envy Sunglasses) 260-18; product ID (as per tenant, not to be confused with unique product ID 95) (prod_K5G7Yf5) 260-19; tag order status (pending) 260-20; invoice payment status (by tenant on invoice by tag provider for tag order) (no) 260-21; product image 260-22; tag type (NTAG424) 260-23; tag shape (rectangle) 260-24; tag size (2×3) 260-25; tag quantity (2,000) 260-26; last updated (Sep. 6, 2024) 260-27. In embodiments, various other information may be displayed in the tag order confirmation of interface web page 260 of FIG. 13 and the embodiment of FIG. 13 is not limited to any specific order data. In embodiments, the tag order confirmation interface of FIG. 13 may be generated by API module 220 upon receipt of tag order request 62. Alternatively, in embodiments, the tag order confirmation may be generated by a module or software running or operating on local device 40 or any other computing device, e.g., a server, etc., that may require approval of order request 62 by a manufacturer or producer of the tags in response to order request 62.

Figure 14:
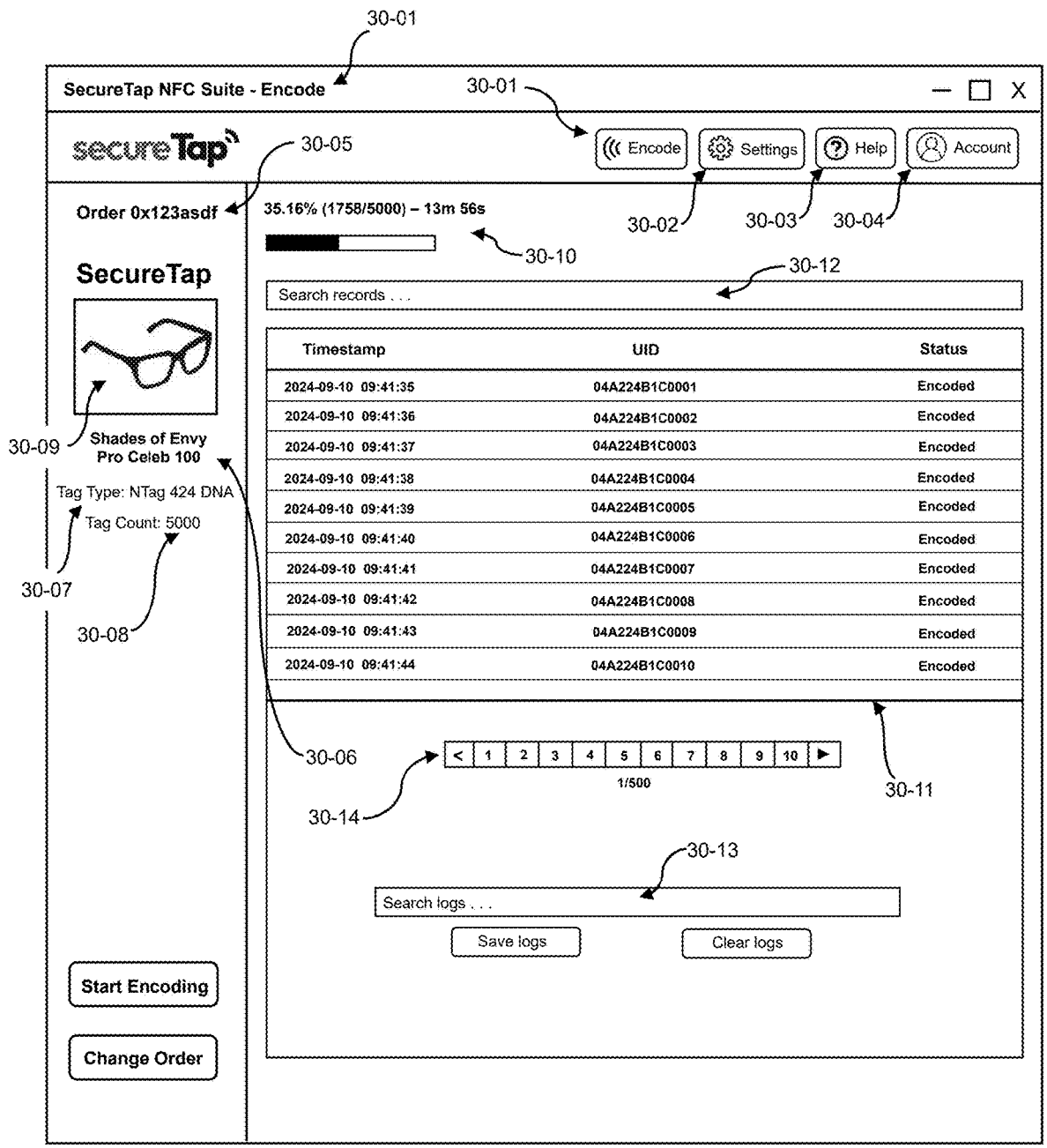
FIG. 14 depicts a sample encoding and tracking interface of an embodiment of the invention depicting end user tap interactions with one or more encoded NFC tags for one or more products.

FIG. 14 depicts a sample encoding interface of an embodiment of encoding module 30 depicting a batch encoding in progress of one or more unique individual encoded tags 10 for one or more unique individual products 8. The interface embodiment of FIG. 14 depicts a batch encoding of 5,000 unique individual tags 10 in progress in accordance with, as an example, process embodiment 600. The interface page of encoding module 30 in FIG. 14 is the "encode" page 30-01. Additional tabs or pages of the interface of encoding module 30 may comprise, but are not limited to: settings page 30-02, help page 30-03 and account page 30-03. A user of encoding module 30 may toggle and move about the various tabs or pages comprising the interface according to the needs and requirements at the time. For example, by accessing account page 30-03, a user may view, obtain, enter, edit, modify, amend or delete various account information relative to the tenant. Settings page 30-02 may comprise various settings and administrative controls for use in encoding tags, interacting with API module 220, and any other control aspect for implementing or executing embodiments of the invention according to specific needs, desires and requirements based on tag type, size, encoding, encryption, and the like.

Continuing with the interface embodiment of encoding module 30 depicted in FIG. 14, additional information that may be displayed with respect to the tag order include but is not limited to: product 8 name (Shades of Envy Pro Celeb 100) 30-06; tag type (NTag 424 DNA) 30-07; batch tag number count (5,000) 30-08; and product 8 image 30-09. The encoding interface embodiment of encoding module 30 further comprises various status data 30-10, which, in the embodiment illustrated, depicts that 1,758 tags of the 5,000 batch have been encoded (and encrypted, according to embodiments), representing 35.16% of the batch job having been completed. In addition, status data 30-10 comprises a timer which shows that batch encoding job has been running for 13 minutes, 56 seconds. Lastly, batch encoding status data 30-10 depicts a status bar presenting a graphic representation of the amount of batch encoding job completed and the amount remaining.

The interface embodiment of encoding module 30 depicted in FIG. 14 may present or display additional information concerning each of the 5,000 tags undergoing batch encoding 30-10. Included in that data is unique product ID 95 assigned to each tag 10 (depicted as "UID" in the illustration), the timestamp as to when each unique individual tag 10 was encoded (depicted as "timestamp" in the illustration), a status indicator, which, in the embodiment depicted, shows that each tag was properly "encoded" (depicted as "status" in the illustration). In embodiments, the tag encoding status indicator may indicate "fail" or other similar term in the event a particular tag 10 failed (for any reason) to be encoding during the encoding process. Continuing with the interface embodiment of FIG. 14, concerning the tag appearing at the top of the list in the illustration, the timestamp of encoding tag 10 is "2024-09-10 09:41:35" meaning the tag was encoded on Sep. 10, 2024 at 09:41:35. Time may be UTC time or it may be adjusted by a user of encoding module 30 by accessing the settings page or tab 30-02 to set according to any desired time zone. Continuing with the tag appearing at the top of the list in the illustration, the unique product ID 95 assigned to tag 10 is "04A224B1C0001" and the status of the tag is "encoded", meaning that tag 10 has been properly encoded and is functioning properly.

Further included in the interface embodiment of encoding module 30 is a "search records" tool 30-12 allowing a user of encoding module 30 to search data and records as to all encoding functions performed through the module. For example, a user may be able to search for a specific order number (see, e.g., 30-05) or tag type (see, e.g., 30-07) or unique product ID 95 (see, e.g., identifiers listed under UID). These are but a few examples of the many variables that may be searched with search tool 30-12. Also depicted in the interface embodiment of FIG. 14 is a "search logs" tool 30-13 and a page display find function 30-14 where a user may toggle forward and backward through the page displays of all tags 10 undergoing batch encoding. For example, in FIG. 14, the total number of tags undergoing batch encoding is 5,000. In the embodiment, each page display shows the ten (10) most recently encoded tags. A user may desire to locate a tag undergoing encoding in the batch encoding operation that is not displayed on the current display page. By selecting a specific display page, the user may locate the tag information as desired.

Figure 15:
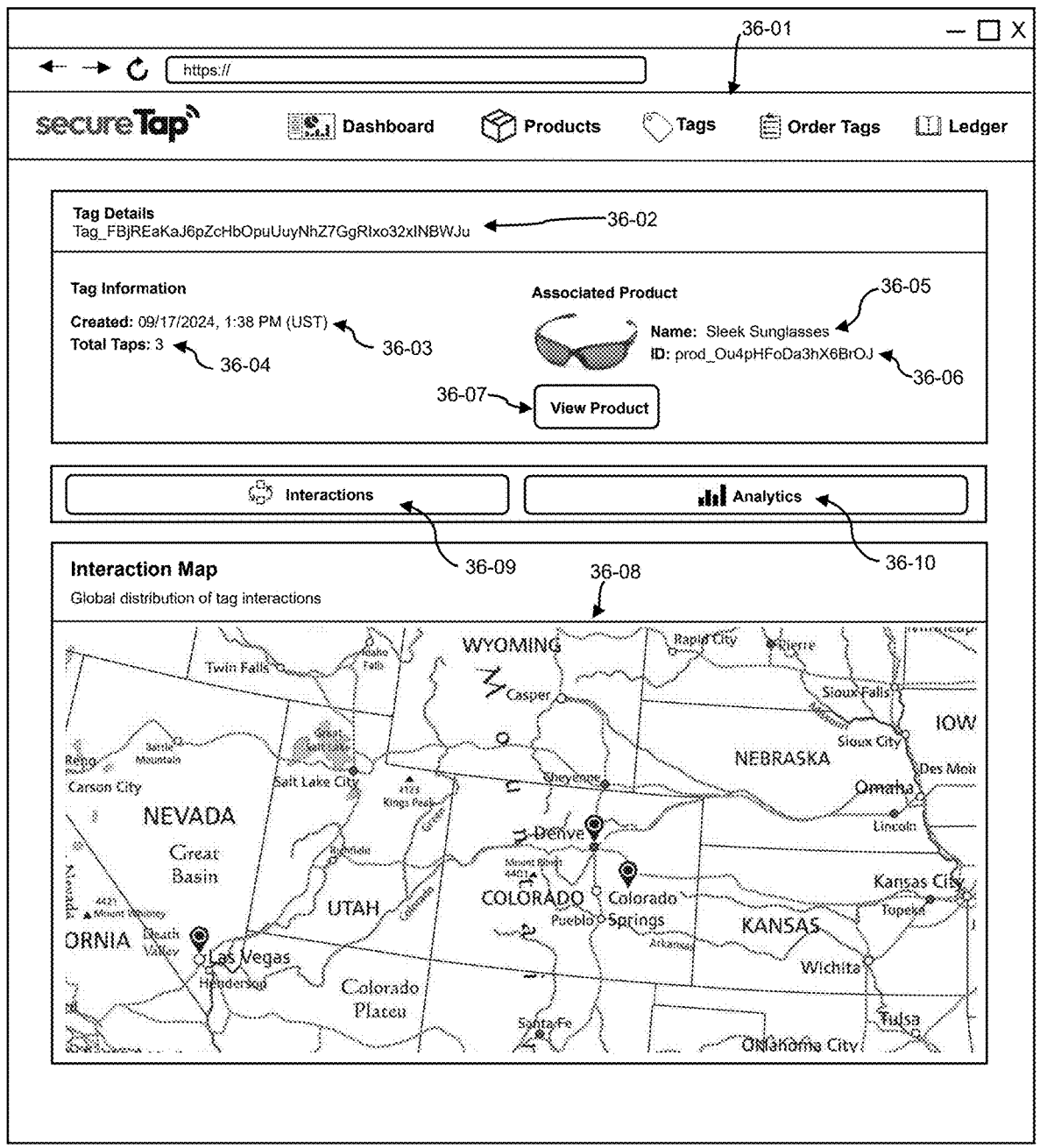
FIG. 15 depicts a sample user interface of an embodiment of a tracking module portion of the invention depicting one or more tap interactions by end users including precise geolocation(s) for each tap as displayed on a map.

FIG. 15 depicts an interface of a tracking module 36 depicting tap interactions by end users 12 with one or more unique individual encoded tags 10 for one or more unique individual products 8 including precise geolocation(s) for each tap as displayed on a map. In the embodiment of FIG. 15, tracking module 36 comprises a portion of tenant interface module 260. In embodiments, tracking module may be combined with tenant interface module 260. In embodiments, tracking module 36 may be operable on local tenant device 60, mobile tenant device 68 or any combination thereof. In embodiments, tracking module 36 may be combined with encoding module 30 or may otherwise be operable on encoding module device 40. In embodiments, tracking module may be combined with any interface module or otherwise accessible by any combination of the foregoing.

Continuing with FIG. 15, in embodiments, tracking module 36 provides various tap-interaction data 113 with respect to a particular tag 10 affixed to product 8. In the tracking module 36 interface embodiment of FIG. 15, numerous data is provided for tag 10. The interface of tracking module 36 in FIG. 15 comprises a navigation bar 36-01 with interface tabs: Dashboard, Products, Tags, Order Tags, and Ledger. The interface tab displayed in FIG. 15 is that of a specific tag 10 that was selected from the Tags tab. Continuing, under the heading "Tag Details" 36-02, unique product ID 95 or tag UID 103 may be displayed depending on the configuration setting as established by a user. In the embodiment illustrated, unique product ID 95 is displayed under "Tag Details" and reads "Tag_FBjREaKaJ6p ZcHbOpuUuyNhZ7GgRIxo32xINBWJu". Under the heading "Tag Information," information regarding unique individual tag 10 is provided in the embodiment depicted: "Created" (date and time created) (09/17/2024, 1:38 PM (UST)) 36-03 and "Total Taps" (number of tap interactions) (3) 36-04. That is, in the interface embodiment depicted in FIG. 15, unique individual tag 10 for unique individual product 8 has been tapped or subject to tap interactions a total of three (3) times as of the time the data is accessed. Under the heading "Associated Product" various information regarding unique individual product 8 is depicted: "Name" (product name) (Sleek Sunglasses) 36-05; "ID" (tenant's product identifier, which may comprise a serial number, UPC, etc. as previously discussed) (prod_Ou4pHFoDa3hX6BrOJ) 36-06; and "view product" button 36-07, wherein an embedded link, when accessed or clicked by a user, will open a web page, box, pop-up, a further page of interface module 260, and the like, where additional information may be viewed, accessed or obtained for product 8. In embodiments, any data comprising product data 70 may be presented in the interface of FIG. 15.

Continuing with FIG. 15, in the depicted tap tracking interface, the three (3) tag interactions are geographically depicted on a portion of map 36-08 (Interaction Map). In the depiction, the locations of the three tap interactions are Denver and Colorado Springs, Co, and Las Vegas, NV. As demonstrated above, geographic location of a tap interaction (e.g., longitude and latitude) comprises, in part, tap-interaction data 113 and may be obtained from PCD reading device 14 based on the device's GPS location, cell-based location (as per known cell tower triangulation methods and processes) or any other method, technique or process known in the art for determining cell phone locations. The tap interactions plotted on interaction map 36-08 appear under the heading "Global distribution of tag interactions" and in an embodiment all tap interactions with specific unique individual tag 10 may be plotted on interaction map 36-08. In embodiments of the interface, a user may select or toggle between an "interactions" view 36-09 or an "analytics view" 36-10 to view more detailed information regarding one or more tap interactions for specific unique individual tag 10.

Figure 16:
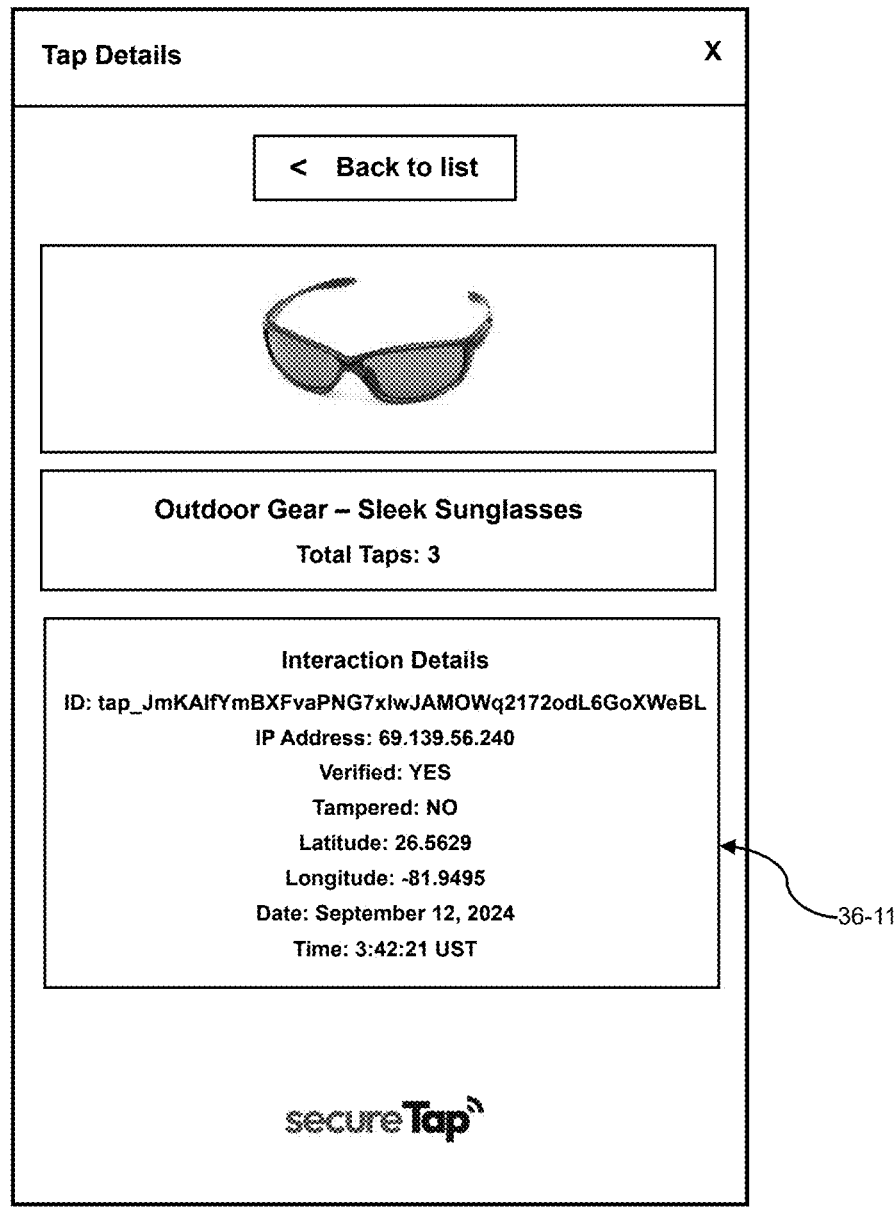
FIG. 16 depicts a sample tenant user interface of an embodiment of the invention providing details of an end user tap interaction for an encoded tag affixed to a product.

FIG. 16 depicts a sample tenant user interface of an embodiment of the invention providing details of an end user tap interaction for an encoded tag 10 affixed to a product 8. In embodiments, the tap interaction details interface may be accessed, for example, by selecting or clicking the "analytics view" 36-10 of embodiment interface depicted in FIG. 15. Or, in an embodiment, the tap interaction detail interface may be accessed, for example, by selecting or clicking a pin plotted on interaction map 36-08 of FIG. 15. Alternatively, in embodiments, specific tap interaction detail may be accessed by any number of common means and methods that would be known to those skilled in the art concerning detailed information regarding a cell phone tap interaction occurring at a geographic location. In the embodiment of FIG. 16, tap interaction details 36-11 include, but are not necessarily limited to, the following data: tap-unique ID 91 ("tap_JmKAIfYmBXFvaPNG7xlwJAMOWq2172odL6GoXWeBL"); IP Address (IP address of PCD reading device 14 at the time of the tap interaction) ("69.139.56.240"); Verified (tag verification result 111) ("YES"); Tampered (tag tamper status data 109) ("NO"); Latitude (geographic latitude of PCD reading device 14 at the time of tap interaction) ("26.5629"); Longitude (geographic longitude of PCD reading device 14 at the time of tap interaction) ("−81.9495); Date (date of tap interaction) ("Date: Sep. 12, 2024"); and Time (time of tap interaction) ("3:42:21 UST"). In embodiments, tap-unique ID 91 may be generated by API module 220 as discussed in the disclosure or tap-unique ID 91 may comprise of unique blockchain transaction ID 97 generated by blockchain module 322 at the time tap-interaction data 113 is recorded to the blockchain in accordance with embodiments discussed herein. In embodiments, tap-unique ID 91 may be generated by API module 220 upon receiving GET request 18 from PCD reading device 14. In embodiments, tap-unique ID 91 may be transmitted by API module 220 to database module 302 and saved therein with respect to unique individual tag 10 and unique individual product 8. In embodiments, tap-unique ID 91 may comprise tap-interaction data 113 and provided in transaction request 83 for recording in blockchain module 322 in connection with the tap transaction and in accordance with embodiments previously discussed. Note that the latitude and longitude data of the tap interaction the subject of FIG. 16 is to a location in Cape Coral, FL.

Embodiments of tenant user interface may comprise additional visualizations of tap interactions as follows:

Time Series Analysis: Implement visualizations to display the number of interactions over different time periods (hourly, daily, weekly, monthly) to identify peak usage times and seasonal trends.

Geographic Distribution: Utilize choropleth and cluster maps to illustrate the density of interactions or asset locations across various regions.

Product Movement Tracking: Integrate Sankey diagrams and flow maps to visualize the flow of products through different stages or locations.

Customer Interaction Insights: Use demographic breakdowns and customer retention rate charts to tailor marketing strategies and improve customer engagement.

Performance Metrics: Develop visualizations for tag authentication success rates and response time analysis to ensure optimal performance and customer satisfaction.

Inventory and Asset Management: Display current inventory levels and asset lifecycle stages to aid in effective management and lifecycle planning.

User Engagement Metrics: Illustrate stages of user engagement and interaction heatmaps to optimize user journeys and enhance user experience.

Comparative Analysis: Implement charts to compare interactions across different products, regions, or time periods for better performance evaluation.

Predictive Analytics: Develop forecasting models and tools to identify and visualize emerging trends in interactions or asset movements.

Anomaly Detection: Use visual tools to highlight unusual interaction patterns or locations, enabling timely interventions and risk management.

Figure 17:
FIG. 17 depicts a sample verification certificate issued in response to a tap interaction by an end user verifying the authenticity of the product to which an encoded tag has been affixed.

FIG. 17 depicts a sample verification certificate 115 issued in response to a tap interaction by end user 12 verifying the authenticity of product 8 to which an encoded tag 10 has been affixed. In embodiments, as depicted and described in Steps 730 and 732, upon verification or authentication of tag 10 at cryptographic verification process 718A, verification certificate 115 may be transmitted to PCD reading device 14 (or other devices, such as, for example, local tenant device 60 or local encoding device 40 or any combination thereof). Alternatively, in embodiments, verification display 92 may be transmitted. Sample verification certificate 115 of FIG. 17 is illustrative of an embodiment and of various tap-interaction data 113 and/or various product data 70 that may comprise verification certificate 115. In an embodiment, the sample verification certificate 115 of FIG. 17 comprises three portions: Product Details 115-01, Blockchain Information 115-02, and Technical Details 115-03. In an embodiment, the Product Details 115-01 portion sample verification certificate 115 of FIG. 17 comprises, but is not limited to, information such as: Issued On (when tag 10 was encoded for product 8) ("Apr. 15, 2024 at 6:42 AM (UTC)"); First Tap (when tag 10 received its first tap interaction) ("Apr. 15, 2024 at 6:42 AM (UTC)"); Total Taps (total number of tap interactions for unique individual tag 10) ("1387"); Tag ID (in an embodiment, unique product ID 95; alternatively, in embodiments, tag UID 103) ("Tag_hOBSjxOJOW8KnFa4wTyYHOQ KsYSokdjk9gDknnTYx"); Issued By (entity or party issuing verification certificate 115) ("SecureTap Authenticity Services"). In an embodiment, the Blockchain Information 115-02 portion sample verification certificate 115 of FIG. 17 comprises, but is not limited to, information such as: Creation Hash (blockchain transaction ID 97) ("67d4240173a4ac4732 eeac6d6df80615460b615a70010a65e9887c7 dc865f8da"). In an embodiment, the Technical Details 115-03 portion sample verification certificate 115 of FIG. 17 comprises, but is not limited to, information such as: Tag data 101 (PICC data 101 in the embodiment depicted, in encrypted form) ("GB1235FB4F906036303DACB16D568884") and cryptographic output 107 (CMAC data 107 in the embodiment depicted) ("541FFD6BC7DC4AA2"), both of which are specific to the tap interaction resulting in verification certificate 115. Additional information that may comprise verification certificate 115 include message authentication codes (MACs) (a secure hash generated using a shared secret key to ensure data integrity and authenticity), one-time passwords (OTPs) (a dynamically generated session-specific token to provide one-time validation and prevent replay attacks) and digital signatures (an elliptic curve digital signature). Continuing, sample verification certificate 115 of FIG. 17 further comprises various options 115-04 to end user 12 to obtain or receive additional copies of verification certificate 115, including, but not limited to, receiving a certificate via text (SMS), downloading a PDF copy of the certificate, or receiving a copy of the certificate by email.

Figure 24:
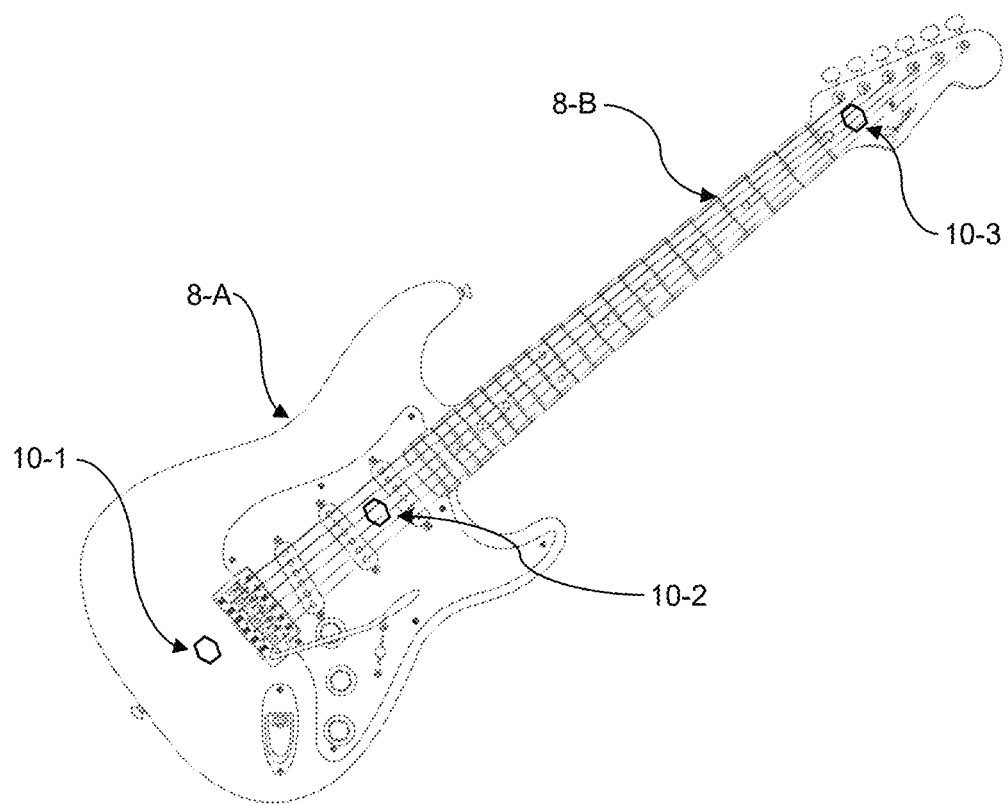
FIG. 24 depicts a perspective view of a brand electric guitar product with encoded tags embedded therein or affixed thereto.

FIG. 24 depicts an illustration of a brand product 8 with encoded tags 10 embedded within the product. Specifically, FIG. 24 depicts a brand electric guitar depicting possible placement options for encoded tags 10 to be inlayed, embedded, affixed, adhered or otherwise attached onto or within the guitar (for example, as decorative medallions or artistry) for use in accordance with embodiments described herein. For example, tag 10-1 is affixed or imbedded into a body portion 8-A of brand electric guitar 8. Tag 10-2 is affixed or imbedded in an alternative location between the neck and middle pickups of brand electric guitar 8. Since guitar necks 8-B may be replaced and present a second unique product from the guitar body 8-A (with separate and unique value), tag 10-3 is affixed or imbedded in a headstock location of the neck where it would not interfere with playing, tuning or neck truss rod adjustment by an end user 12. The example of FIG. 24 is to demonstrate the numerous placement options of tags 10 within or on products 8 to ensure the ability to verify authenticity of the product throughout its life and creating an immutable record or ledger in blockchain module 322.

In embodiments, tag 10 may comprise the NXP NTAG213. Specific information regarding the NTAG213 may be found in the product's data sheet, the contents of which are incorporated herein by reference in their entirety herein. The NTAG213 data sheet is available at https://www.nxp.com/docs/en/data-sheet/NTAG213_215_216.pdf.

In embodiments, tag 10 may comprise the emlecho-V 4425 tag by EM Microelectronic (the "EM4425 Tag"). The EM4425 Tag is a combined RAINFC based tag directed to HF, NFC, and RAIN RFID™ technologies. The 4425 microchip in the EM4425 Tag combines all functionalities on a single die, with NFC for proximity range, HF for vicinity range, and RAIN technology used for long range application purposes. The EM4425 Tag is an example of a combined NFC/RFID tag allowing for numerous embodiments of the invention.

As to additional embodiments, EPCs (electronic product codes) have become increasingly popular in retail, healthcare, supply chain, and logistics businesses as it provides a unique digital ID to various assets using small RFID labels. Unlike barcode and QR Code technology, multiple RFID-tagged items can be scanned and tracked at once, from a distance of up to 15 meters (approximately 49 feet) with a clear line of sight. NFC technology (13.56 MHz), on the other hand, is best suited for close interactions. While UHF Passive RFID technology (860 MHz-960 MHz), also known as RAIN RFID is mostly used in Business-to-Business (B2B) settings, allowing for track and trace, inventory management, order fulfillment, NFC technology/HF RFID is mostly used in close proximity, customer-centric B2C environments. A dual NFC/RFID combined tag provides for both close proximity tap interactions, as expressly disclosed herein, and longer range interactions, such as those commonly associated with EPC-RFID interactions.

The EM4425 Tag, for example, features an RFID chip that combines the features of RAIN RFID technology with NFC and HF RFID for a standalone tag. The integration of RAIN RFID and NFC technologies on a single integrated circuit chip led to the development of RAINFC, a powerful combination that offers a wide range of benefits and applications in various businesses including retail and healthcare. With RAINFC, embodiments of the invention feature RAIN RFID for long-range applications (such as inventory control), HF for vicinity, and NFC for proximity-range applications, such as those disclosed in detail herein. The EM4425 chip in the EM4425 Tag provides a seamless convergence of these two technologies, allowing for enhanced connectivity, data storage, and security. Additionally, the chip in the EM4425 Tag incorporates advanced AES-28 encryption and authentication mechanisms, ensuring the integrity and confidentiality of stored data, especially in NFC transactions.

In embodiments, the EM4425 Tag, or any other suitable combined RFID/NFC tag may be used. A combined RFID/NFC tag 10, such as the EM4425 Tag, would meet all the features of the disclosed embodiments and provide additional RFID/RAINFC based features. The applications are numerous and may be briefly summarized as follows (based on documentation concerning the EM4425 Tag):

Smart Retail. For example, RAINFC facilitates smart retail applications such as inventory management, product authentication, and personalized marketing. The EM4425 Tag, for example, enables the storage of detailed product information, including origin, expiration dates, and unique identifiers, ensuring product authenticity and traceability. NFC-enabled smartphones may interact with RAINFC tags to provide consumers with product details, promotions, and loyalty rewards, enhancing the retail experience.

Supply Chain Optimization. RAINFC may be used in supply chain operations by enabling real-time tracking, authentication, and data exchange. From warehouse management to shipping and delivery, the integration of RAIN RFID and NFC technologies enhances visibility, security, and efficiency throughout the supply chain, reducing errors and improving overall performance.

Healthcare Management. In the healthcare sector, RAINFC supports applications such as patient identification, medication tracking, and equipment management. Security features in the EM4425 Tag chip, for example, ensure the integrity of patient data, while NFC-enabled devices enable healthcare professionals to access and update medical records securely, streamlining processes and improving patient outcomes and patient care.

Access Control and Security. RAINFC technology employing the dual frequency EM4425 chip is utilized for access control systems, asset tracking, and secure authentication in various environments, including corporate offices, educational institutions, and event venues. The EM4425 IC's ability to store and protect sensitive data, combined with the seamless interaction offered by NFC, enhances security and convenience for users.

In embodiments, using a dual frequency combined RFID/NFC tag 10, such as the EM4425 Tag, tenants may tag their products 8 and assets with RAINFC tags 10, allowing end users to authenticate products 8 for counterfeiting, fraud and tampering, as disclosed herein while simultaneously providing tenants with the features and benefits of RFID/RAINFC technology.

Additional embodiments and uses of the invention are now considered.

Bulk Encoding System for NFC/RFID Tags Using Reel-to-Reel Technology. As demonstrated herein, embodiments of the invention may comprise a bulk encoding process employing a proprietary reel-to-reel machine designed for encoding large quantities of NFC and RFID tags efficiently. The system leverages an advanced configuration that synchronizes each tag's positioning with an encoding terminal, ensuring precise alignment for data encoding and verification. Each tag is programmed with a unique identifier and an encrypted tap-unique URL 93, which links to a secure database 302 and blockchain 322 containing product-specific data. In an embodiment, PCD encoding device (encoding terminal) 20 is functionally integrated within the system such that the tape passing from an origin reel to a capturing reel passes by, thereby encoding each tag affixed to the tape as it passes by PCD encoding device 20 in accordance with embodiments previously described. In embodiments, numerous tags 10 may be encoded per second. Upon completion of the bulk encoding process, the capturing reel of the tape, detachably attached to a spindle or other similar element for holding the reel, may be removed from the system machinery. With reference to the encoding interface of FIG. 14, for example, batch encoding of 5,000 tags is in process using the batch encoding embodiment.

A key innovation in the reel-to-reel embodiment of the encoding system is the integration of KMS 342 for real-time encryption. Before encoding, in embodiments, API module 220 requests encryption key 99 from KMS 342 based on the tenant's specific encryption key ID 86. The encryption process, as discussed with respect to embodiments in the disclosure, secures each tag 10 with tenant-specific credentials, thereby embedding a unique layer of security into every encoded tag 10. Additionally, the reel-to-reel machine's process control system (in an embodiment, operating via encoding module 30 on local device 40) verifies the encoded data on each tag before moving it to the next phase, ensuring high accuracy and preventing encoding errors. This approach reduces manual handling, accelerates production, and enhances the security and authenticity of each encoded tag 10 by securing encryption keys 99 directly at the point of encoding. With reference to FIG. 14, for example, the encoding status of each tag 10 in the batch encoding process is listed as either "encoded" or "failed" (or other similar term in the event a particular tag 10 failed (for any reason) to be encoding during the encoding process.

Inventory Management and Product Authentication with Dual-Frequency Tags. Dual-frequency tags (NFC and radio frequency identification or RFID enabled) enable a sophisticated system for inventory management and product authentication by combining RFID and NFC technologies within a single tag. An example of a combined NFC/RFID enabled tag is EM4425 Tag, discussed above.

The configuration of a dual and combined NFC/RFID enabled tag may be designed for seamless integration into multi-layered supply chain and retail environments. For example, in embodiments, with a dual NFC/RFID enabled tag, through the RFID interface, inventory of products may be managed efficiently across large warehouses or retail stores, with long-range reading capabilities that enable simultaneous scanning of multiple items, significantly reducing processing time.

For authentication, as demonstrated in embodiments throughout this disclosure, the NFC interface allows end-users 12 to tap tag 10 with PCD reading device 14 to access product information securely without the need for additional software such as an app. The tag's AES-128 encryption and optional digital signature support protect the encoded data, ensuring that each tag carries a verifiable authenticity marker. Another notable feature is the tag's tamper detection, as demonstrated above, which is designed to trigger an alert in response to a tap interaction if the tag has been physically compromised. This mechanism uses an impedance loop that signals a tampered state if broken. These tags may also include a shared memory accessible by both UHF and NFC interfaces, thereby allowing for streamlined data synchronization across inventory and authentication systems and simplifying the verification process for both consumer and backend systems.

Certificate Authority (CA) Account with Brand-Scoped Authentication and Tap Data Management. Embodiments of the invention may incorporate a centralized Certificate Authority ("CA") account that functions as a brand manager, overseeing the authentication process and tap data collection for multiple subordinate brands. When a tag 10 associated with a specific CA is tapped by end user 12, the CA's logo and information are automatically displayed, providing an immediate visual confirmation of authenticity tied to the CA's identity. This tap interaction triggers a secure data request (as demonstrated in embodiments in the disclosure), wherein the tag's unique identifier, authentication details, and interaction metadata may be transmitted to the CA's secure database, creating a comprehensive log for each interaction. The transmittal of tap-interaction data 113 to the CA's secure database may be direct based on the tap-unique URL 93 or it may be accomplished from API module 220. One of the proprietary elements of embodiments implementing this setup or configuration is the CA's role in isolating tap data strictly by brand. The CA system restricts data access, ensuring that only tap-interaction data 113 for the CA's registered products is accessible to them, while data from other brands remains confidential. This segmentation is achieved through encrypted URLs and blockchain-backed transaction logging, in accordance with disclosed embodiments, with each tap-interaction data 113 recorded to blockchain module 322 and generating unique blockchain transaction ID 97. This immutable record, combined with tenant-specific encryption, allows the CA to audit its products' taps securely, providing real-time insights into product interactions and ensuring that only authorized brand representatives can access detailed tap histories.

Collecting Analytical Data on the Blockchain. Embodiments of the invention leverage blockchain technology not only for secure transactions and authentication but also for the collection of comprehensive analytical data. Each interaction with an NFC/RFID tag 10, such as a tap or read event, generates a blockchain transaction that records detailed metadata 17 including timestamp, location, device type, and interaction context. This data, anonymized where necessary to protect consumer privacy, is stored immutably on blockchain module 322, creating an auditable trail that can be analyzed to gain insights into consumer behavior, product performance, and supply chain efficiency.

The integration of blockchain analytics tools enables brands and supply chain managers to query and aggregate this transactional data securely. Advanced data analytics algorithms applied to the blockchain records can uncover patterns such as peak interaction times, regional product popularity, and potential bottlenecks in distribution. By correlating tap-interaction data with product lifecycles and market trends, businesses can make informed decisions on inventory management, marketing strategies, and product improvements. The decentralized and tamper-proof nature of the blockchain ensures the reliability and accuracy of these analytics, fostering trust and transparency in data-driven decision-making.

Moreover, tenant-specific permissions and encryption ensure that sensitive analytical data remains accessible only to authorized stakeholders. Brands can configure dashboards that pull real-time insights directly from blockchain module 322, highlighting key performance indicators, consumer engagement metrics, and supply chain KPIs. This approach provides a secure, scalable, and transparent method for collecting and analyzing data across diverse products and markets without relying on centralized data repositories that may be vulnerable to breaches or manipulation.

Providing Warranties, Product Data, and Related Services. In addition to authentication and analytics, embodiments of the invention comprise the provision of warranties, detailed product data, and related services directly to consumers and stakeholders. When a consumer 12 interacts with a product tag 10 via an NFC-enabled device 14, the tag 10 can deliver up-to-date warranty information, service guidelines, and product specifications. This information is securely linked through the tag's encrypted tap-unique URL 93 to a backend database (e.g., database module 302) that holds comprehensive records, including warranty terms, manufacturing details, and maintenance history.

The use of blockchain module 322 enhances the integrity and verification of warranty claims and product data. For instance, a consumer 12 seeking to claim warranty service can initiate a verification process by tapping the tag, which triggers a secure transaction on the blockchain. The transaction confirms the product's authenticity, checks warranty status, and logs the claim request immutably. This process not only reduces fraud but also accelerates service response times by providing service centers with verified product and warranty information before the product arrives for repair or replacement.

Furthermore, tenants can update product data and warranty terms via secure blockchain transactions, ensuring that all stakeholders have access to the most current information. Manufacturers can publish updates, recalls, or service bulletins that are directly linked to the product's tag, allowing consumers to receive timely notifications and instructions.

Embodiments of the invention may incorporate mechanisms for collecting consumer data through interactive forms. For example, when a consumer 12 taps an NFC-enabled device 14 on a tagged product 8, the system may prompt the user 12 with a secure digital form requesting voluntary contact and preference information such as email addresses, phone numbers for SMS, and social media profiles. These forms may be delivered directly to the consumer's smartphone or other devices 14, leveraging secure web interfaces or native applications to capture data efficiently and in real time.

The secure collection of consumer data via these forms is integrated into the broader ecosystem of product interaction, ensuring that all submitted information is transmitted over encrypted channels and stored in compliance with data protection standards. In embodiments, API module 220 saves such information to database module 302 for further use and analysis as described herein. In embodiments, one or more of such consumer data, such as, for example, warranty information, purchase date, repair date(s) and the like may be recorded on blockchain module 322, thereby creating an immutable record of a consumer's history with unique product 8. As consumers submit their details, the data is automatically linked to their interaction history with specific products through the embedded RAINFC tag, enhancing the personalization of marketing campaigns and loyalty programs. The process includes explicit consent options and transparency disclosures, adhering to privacy regulations and best practices by allowing consumers to opt-in for communications via email, SMS, or social media platforms.

In embodiments, collected consumer data may then be utilized for targeted marketing strategies, personalized offers, and improved customer service initiatives. For example, email and SMS campaigns tailored to individual consumer preferences may be generated based on the data provided, while social media integrations allow for seamless connection between brand engagements and consumers' digital profiles. This approach not only enriches the consumer experience but also empowers brands with valuable insights derived from aggregated and anonymized consumer data, facilitating more informed decision-making and fostering long-term customer relationships.

Other features and elements of embodiments are as follows:

Tenant-Specific Key Management and Tenant Functions. In addition to the administrative controls of API module 220, each tenant using the methods, processes and systems of embodiments is provisioned with unique cryptographic key pairs, consisting of public and private keys. These tenant-specific keys empower tenants to interact with blockchain module 322 in a secure and decentralized manner. During the onboarding process, tenants receive their individual key pairs, which are securely stored and managed to ensure that only authorized tenants can access and utilize them. This key management strategy is fundamental to maintaining both security and accountability within the system. As such, according to embodiments, tenants are granted permission to access blockchain module 322 for transactions concerning their respective products 8.

In embodiments, tenants may leverage their unique keys in accordance with the above to perform several critical functions:

Creating Tags. Tenants may create tags 10 that uniquely identify and categorize tap-transactions 113 and data entries on blockchain module 322. Tags 10 are generated using the tenant's private key, ensuring that each tag is authentic and traceable back to its origin. This capability facilitates organized and efficient data management, allowing tenants to maintain clear and structured records within the blockchain.

Querying the Blockchain. Tenants are authorized to query blockchain module 220 to retrieve specific data or transaction histories recorded therein. These read operations are authenticated using the tenant's public key, ensuring that tenants can access only the data they are permitted to view. This selective access control preserves the confidentiality and integrity of the data while providing tenants with the necessary visibility to monitor and analyze their transactions on blockchain module 322.

Posting Transactions. Tenants may submit their own transactions to the blockchain for processing. Each transaction is digitally signed with the tenant's private key, providing irrefutable proof of origin and ensuring that only legitimate transactions are recorded on the blockchain. Before a transaction is accepted and recorded in blockchain module 322, in accordance with disclosed embodiments, the system verifies the digital signature against the tenant's public key, thereby validating the authenticity and authorization of the transaction. This rigorous validation process ensures that all transactions are legitimate and that the blockchain remains free from unauthorized or malicious entries.

While the invention has been described with respect to a limited number of embodiments, those skilled in the art, having benefit of this disclosure, will appreciate that other embodiments may be devised that do not depart from the scope of the invention as disclosed herein. The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, including various features and limitations of embodiments, to thereby enable others skilled in the art to best utilize the invention and various embodiments with various modifications as may be suited to the particular use contemplated.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a web browser or other remote interface.

One or more elements of the above-described systems and embodiments may be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code may be stored, temporarily or permanently, on one or more non-transitory computer readable storage media. The non-transitory computer readable storage media are executable by one or more computer processors to perform the functionality of one or more components of the above-described systems (e.g., FIGS. 1, 3 and 8) and/or flowcharts (e.g., FIGS. 7-8). Computer storage media includes volatile and nonvolatile, removable and non-removable media implemented in any method or technology for storage of information such as computer-readable instructions, data structures, program modules or other data. Computer storage media includes, but is not limited to, hard drives, flash memory, solid state drives, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Embodiments described herein may be discussed in the general context of computer-executable instructions residing on some form of computer-readable storage medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Embodiments may be implemented on a specialized computer system. The specialized computing system may include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Servers depicted in embodiments generally represent computing devices or systems, such as application servers or database servers, configured to provide various database services and/or run certain software applications. A network featuring one or more servers, for example, the embodiment according to FIG. 1, generally represents any telecommunication or computer network including, for example, an intranet, a wide area network (WAN), a local area network (LAN), a personal area network (PAN), or the Internet.

Although components of one or more systems disclosed herein may be depicted as being directly communicatively coupled to one another, this is not necessarily the case. For example, one or more of the components may be communicatively coupled via a distributed computing system, a cloud computing system, or a networked computer system communicating via the Internet.

With regard to various computer systems and schematics depicted herein, it should be appreciated that any one computer system may represent many computer systems, arranged in a central or distributed fashion. For example, such computer systems may be organized as a central cloud and/or may be distributed geographically or logically to edges of a system such as a content/data delivery network or other arrangement. It is understood that virtually any number of intermediary networking devices, such as switches, routers, servers, etc., may be used to facilitate communication.

Embodiments of the invention may be implemented on various mobile or non-mobile computing devices, regardless of the platform being used (collectively, mobile and non-mobile devices referred to as "computing devices"). In embodiments, PCD reading device 14, for example, may comprise a mobile device, and in one or more embodiments of the invention, a mobile device may include any portable device that provides a user interface. Examples of mobile devices may include, but are not limited to, cellular phones, personal digital assistants, personal communicators, tablet computers, smartphones, or any other computing device. Computing devices may include one or more processors, memory (e.g., RAM, cache memory, flash memory, etc.), a storage device (e.g., a hard disk, a solid-state drive, an optical drive such as a compact disk drive or digital video disk (DVD) drive, a flash memory stick, etc.), a wireless interface, a network interface and numerous other elements and functionalities typical of computing devices.

Computing devices suitable for use with embodiments may include various input means and output means, such as a keyboard, a receiver, and/or a touch sensitive display device (e.g., a touch liquid crystal display screen), which permits a user (e.g., end user 12) to perform gestures (e.g., drag, swipe, multi-touch, select, press and hold, etc.) and enter/display keystrokes (including numeric, alphabetic, and other characters, images, or other media types).

Computing devices may be connected to a network (e.g., a local area network (LAN), a wide area network (WAN) such as the Internet, or any other similar type of network) via an antenna, wireless interface, and/or network interface. In one or more embodiments of the invention, the network connection may be facilitated by a wireless infrastructure, including one or more transceivers cooperating to facilitate wireless communications to wireless devices. A wireless infrastructure may include one or more routers, switches, microwave links, base stations, optical fibers, or other similar networking hardware or software components.

In one or more embodiments of the invention, the network connection may be facilitated by a hardwired or other similar connection using a network interface. For example, the network connection may involve a hardwire connection or short-range wireless connectivity technology with a second mobile device. Hardwired infrastructure may include one or more routers, switches, microwave links, base stations, optical fibers, or other similar networking hardware or software components.

In the computing systems of embodiments, as depicted in FIG. 1, for example, the computing system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or microcores of a processor. The computing system may also include one or more input device(s), such as a touchscreen, keyboard, mouse, microphone, touchpad, electronic pen, or any other type of input device. Further, the computing system may include one or more output device(s), such as a screen (e.g., a liquid crystal display (LCD), a plasma display, touchscreen, cathode ray tube (CRT) monitor, projector, or other display device), a printer, external storage, or any other output device. The computing system may be connected to a network (e.g., a local area network (LAN), a wide area network (WAN) such as the Internet, mobile network, or any other type of network) via a network interface connection. The input and output device(s) may be locally or remotely connected (e.g., via the network) to the computer processor(s), memory, and storage device(s).

A portion of the disclosure may contain material that is subject to copyright, trade dress and/or trademark protection. Any such material comprising this disclosure is the express intellectual property of its respective owner, and it is understood the owner thereof reserves any and all rights in and to its respective intellectual property.

What is claimed is:

1. A method for authenticating a product, comprising:
generating a unique product identifier for the product,
generating a data structure for the product, wherein the data structure comprises the unique product identifier,
sending a request to a blockchain to record the data structure for the product, whereupon receiving the request, the blockchain records the data structure for the product on the blockchain in a transaction, generates a blockchain transaction identifier for the transaction, and transmits the blockchain transaction identifier for the transaction in response to the request, receiving the blockchain transaction identifier for the transaction, adding the blockchain transaction identifier for the blockchain transaction to the data structure for the product, thereby associating the blockchain transaction identifier with the unique product identifier, encoding a near field communication tag with an initial tap-unique URL wherein the initial tap-unique URL comprises the unique product identifier, affixing the encoded near field communication tag to the product, whereupon, when the encoded tag affixed to the product engages in a tap interaction with a proximity coupling device, the encoded tag generates a subsequent tap-unique URL on the tag, wherein the subsequent tap-unique URL comprises the unique product identifier, and a web client operating on the proximity coupling device reads and opens the subsequent tap-unique URL, receiving from the web client the unique product identifier and a one or more tap interaction data generated from the tap interaction, and verifying an authenticity of the product.

2. The method of claim 1, wherein the subsequent tap-unique URL further comprises a web host portion, a tag data, and an initial cryptographic output data.

3. The method of claim 2, wherein the tag data is encrypted.

4. The method of claim 3, wherein the initial cryptographic output data comprises one of the following: a one-time password, a digital signature, or a message authentication code.

5. The method of claim 4, wherein the step of verifying the authenticity of the product comprises:

reading the initial cryptographic output data from the subsequent tap-unique URL, decrypting the encrypted tag data of the subsequent tap-unique URL using an encryption key associated with the product to generate a decrypted tag data, generating a subsequent cryptographic output data using the decrypted tag data, a cryptographic algorithm, and the encryption key, validating the subsequent cryptographic output data by comparing it against the initial cryptographic output data, determining a verification result, wherein if the subsequent cryptographic output data is validated, the verification result is that the product is authentic, and transmitting the verification result to the proximity coupling device to be viewed by a user.

6. The method of claim 2, wherein the tag data comprises a one or more of the following: a unique tag identifier, an interaction counter data and a tag tamper detection data.

7. The method of claim 1, wherein the data structure further comprises a one or more of the following: a one or more product code, an encoding date of the tag, a name of the product, and a name of a tenant of the product.

8. The method of claim 1, wherein the blockchain is fee-less.

9. The method of claim 1, wherein the tag is a dual NFC/RFID tag.

10. A system for authenticating a product, comprising:

a computer processor, and an API module executing on the computer processor and configured to enable the computer processor to:

generate a unique product identifier for the product, generate a data structure for the product, wherein the data structure comprises the unique product identifier, send a request to a blockchain module to record the data structure for the product, whereupon receiving the request from the API module, the blockchain module records the data structure for the product in a transaction, generates a blockchain transaction identifier for the transaction, and transmits to the API module the blockchain transaction identifier for the transaction in response to the request, receive from the blockchain module the blockchain transaction identifier for the transaction, add the blockchain transaction identifier for the transaction to the data structure for the product, thereby associating the blockchain transaction identifier with the unique product identifier, encode a near field communication tag to be affixed to the product with an initial tap-unique URL wherein the initial tap-unique URL comprises the unique product identifier, whereupon, when the tag affixed to the product engages in a tap interaction with a proximity coupling device, the tag generates a subsequent tap-unique URL on the tag, wherein the subsequent tap-unique URL comprises the unique product identifier, and a web client operating on the proximity coupling device reads and opens the subsequent tap-unique URL, receive from the web client the unique product identifier and a one or more tap interaction data generated from the tap interaction, and verify an authenticity of the product.

11. The system of claim 10, wherein the subsequent tap-unique URL further comprises a web host portion, a tag data, and an initial cryptographic output data.

12. The system of claim 11, wherein the tag data is encrypted.

13. The system of claim 11, wherein the initial cryptographic output data comprises a one-time password, a digital signature, or a message authentication code.

14. The system of claim 13, wherein to verify the authenticity of the product, the API module is further configured to enable the computer processor to:

read the initial cryptographic output data from the subsequent tap-unique URL, decrypt the encrypted tag data of the subsequent tap-unique URL using an encryption key associated with the product to generate a decrypted tag data, generate a subsequent cryptographic output data using the decrypted tag data, a cryptographic algorithm, and the encryption key, validate the subsequent cryptographic output data by comparing it against the initial cryptographic output data, determine a verification result, wherein, if the subsequent cryptographic output data is validated, the verification result is that the product is authentic, and transmit the verification result to the proximity coupling device to be viewed by a user.

15. The system of claim 14, wherein the subsequent cryptographic output data comprises a one-time password, a digital signature, or a message authentication code.

16. The system of claim 11, wherein the tag data comprises a one or more of the following: a unique tag identifier, an interaction counter data and a tag tamper detection data.

17. The system of claim 10, wherein the API module is further configured to enable the computer processor to:
generate a downloadable verification certificate, and
transmit the downloadable verification certificate to the proximity coupling device.

18. The system of claim 10, wherein the blockchain module is fee-less.

19. The system of claim 10, wherein the tag is a dual NFC/RFID tag.

20. A method for creating an immutable tap interaction record for a product, comprising:
generating a unique product identifier for the product,
sending a request to a blockchain to record the unique product identifier,
whereupon receiving the request, the blockchain records the unique product identifier on the blockchain in a transaction, generates an initial blockchain transaction identifier for the transaction, and transmits the initial blockchain transaction identifier for the transaction in response to the request,
receiving the initial blockchain transaction identifier for the transaction,
encoding a near field communication tag with an initial tap-unique URL wherein the initial tap-unique URL comprises the unique product identifier,
affixing the encoded near field communication tag to the product,
whereupon, when the encoded tag affixed to the product engages in a tap interaction with a proximity coupling device,
the encoded tag generates a subsequent tap-unique URL on the tag, wherein the subsequent tap-unique URL comprises the unique product identifier, and
a web client operating on the proximity coupling device reads and opens the subsequent tap-unique URL,
receiving from the web client the unique product identifier and a one or more tap interaction data generated from the tap interaction,
identifying the initial blockchain transaction identifier for the unique product identifier received from the web client,
whereupon, based on the initial blockchain transaction identifier, sending a subsequent request to the blockchain to record the one or more tap interaction data generated from the tap interaction, and
whereupon receiving the subsequent request, the blockchain records the one or more tap interaction data on the blockchain in a subsequent transaction, generates a subsequent blockchain transaction identifier for the subsequent transaction, and transmits the subsequent blockchain transaction identifier for the subsequent transaction in response to the request, and
receiving the subsequent blockchain transaction identifier for the subsequent transaction.

21. The method of claim 20, wherein the steps commencing with the tap interaction are repeated one or more times, resulting in one or more subsequent transactions on the blockchain and one or more subsequent blockchain transaction identifiers, and wherein the initial blockchain transaction identifier as recited therein comprises a previous most recent subsequent blockchain transaction identifier.

* * * * *